US012639046B2

(12) United States Patent
Helin et al.

(10) Patent No.: US 12,639,046 B2
(45) Date of Patent: May 26, 2026

(54) INTELLIGENCE SYSTEM FOR CLOUD-BASED COMMUNICATION PLATFORMS

(71) Applicant: Twilio Inc., San Francisco, CA (US)

(72) Inventors: Charlie Helin, Murrieta, CA (US);
Amool Gupta, Berkeley, CA (US);
Aymen Naim, Walnut Creek, CA (US);
Torsten Budesheim, Mill Valley, CA (US)

(73) Assignee: Twilio Inc., San Francisco, CA (US)

( * ) Notice: Subject to any disclaimer, the term of this patent is extended or adjusted under 35 U.S.C. 154(b) by 39 days.

(21) Appl. No.: 18/083,709

(22) Filed: Dec. 19, 2022

(65) Prior Publication Data

US 2023/0350644 A1    Nov. 2, 2023

Related U.S. Application Data

(60) Provisional application No. 63/363,935, filed on Apr. 29, 2022.

(51) Int. Cl.
G06F 8/33 (2018.01)
G06F 8/20 (2018.01)
(Continued)

(52) U.S. Cl.
CPC .................. G06F 8/33 (2013.01); G06F 8/22 (2013.01); G06F 9/451 (2018.02); G06F 9/54 (2013.01);
(Continued)

(58) Field of Classification Search
CPC ... G06F 8/22; G06F 8/33; G06F 9/451; G06F 9/54; G06F 9/541; G06F 9/542; G06Q 10/0633; G06Q 30/016
(Continued)

(56) References Cited

U.S. PATENT DOCUMENTS 8,874,621 B1 * 10/2014 Goodwin .............. G06F 16/289
707/756
8,881,182 B1    11/2014 Jorgensen
(Continued)

FOREIGN PATENT DOCUMENTS

IN    202417092931    12/2024
WO    2023212627    11/2023

OTHER PUBLICATIONS

"International Application Serial No. PCT US2023 066277, International Search Report mailed Jul. 5, 2023", 4 pgs.
(Continued)

*Primary Examiner* — Bradford F Wheaton
(74) *Attorney, Agent, or Firm* — Schwegman Lundberg & Woessner, P.A.

(57)    ABSTRACT

A method of intelligently handling routing requests in a computerized customer engagement environment is disclosed. Access to an API for processing a routing request in the customer engagement environment is provided. The API includes a handler for the routing request. The handler includes parameters for specifying a routing attribute and a proficiency. The proficiency corresponds to the routing attribute. The routing attribute and the proficiency are received via the parameters of the handler. An agent in the customer engagement environment is recommended to invite to a channel associated with the routing request. The recommending is based on a matching of the agent to the routing attribute and the proficiency corresponding to the routing attribute.

20 Claims, 98 Drawing Sheets

(51) Int. Cl.

| | |
|---|---|
| *G06F 9/451* | (2018.01) |
| *G06F 9/54* | (2006.01) |
| *G06Q 10/0633* | (2023.01) |
| *G06Q 30/016* | (2023.01) |

(52) U.S. Cl.
CPC .............. *G06F 9/541* (2013.01); *G06F 9/542* (2013.01); *G06Q 10/0633* (2013.01); *G06Q 30/016* (2013.01)

(58) Field of Classification Search
USPC ......................................................... 717/111
See application file for complete search history.

(56) References Cited

U.S. PATENT DOCUMENTS

| | | | | |
|---|---|---|---|---|
| 9,813,379 | B1 * | 11/2017 | Shevade | ................ H04L 45/24 |
| 10,498,896 | B2 | 12/2019 | Ristock et al. | |
| 11,582,345 | B2 | 2/2023 | De Abreu Resenes et al. | |
| 11,609,953 | B2 | 3/2023 | Tyagi | |
| 2003/0161296 | A1 * | 8/2003 | Butler | ..................... H04L 61/00 370/352 |
| 2006/0098637 | A1 * | 5/2006 | Peltz | ....................... H04L 12/66 370/356 |
| 2011/0194684 | A1 * | 8/2011 | Ristock | ............... H04M 3/5158 379/265.02 |
| 2014/0164530 | A1 | 6/2014 | Stoertenbecker | |
| 2015/0120635 | A1 * | 4/2015 | Fischer | ................. G06Q 10/00 707/825 |
| 2021/0127011 | A1 * | 4/2021 | Veloso | ............. G06Q 10/06312 |
| 2021/0266406 | A1 * | 8/2021 | Morgan | .............. H04M 3/5233 |
| 2023/0351403 | A1 | 11/2023 | Johnson et al. | |

OTHER PUBLICATIONS

"International Application Serial No. PCT US2023 066277, Written Opinion mailed Jul. 5, 2023", 9 pgs.

"REST Hooks—Zapier", Zapier Community App XP093058473, [Online]. Retrieved from the Internet: https: web.archive.org web 20151208163843 https: zapier.com developer documentation v2 rest-hooks, (Dec. 8, 2015), 1-5.

"Reference (Full Guide)—Zapier", Zapier Community XP093058474, [Online]. Retrieved from the Internet: https: web.archive.org web 20160316083601 https: zapier.eom developer documentation v2 reference #rest-hooks, (Mar. 16, 2016), 1-115.

Cooksey, Brian, "An Introduction to APIs", XP93058297, [Online]. Retrieved from the Internet: https: cdn.zapier.com storage learn_ ebooks e06a35cfcf092ec6dd22670383d9fd12.pdf, (Apr. 23, 2014), 1-77.

Lopes, Pedro, "i2x: An Automated Real-Time Integration and Interoperability Platform (Short Paper)", IEEE 8th International Conference on Service-Oriented Computing and Applications (SOCA), IEEE, (Oct. 19, 2015), 26-30.

"International Application Serial No. PCT US2023 066277, International Preliminary Report on Patentability mailed Nov. 7, 2024", 11 pgs.

"U.S. Appl. No. 18/198,527, Non Final Office Action mailed May 14, 2025", 22 pgs.

* cited by examiner

500

700

```
{
    "type":"email",
    "initiated_by": "agent",
    "participants": [
        {
            "level": "to",
            "name": "Random Person",
            "type": "email"
        }
    ],
    "properties":{
        "type": "email",
        "from_name": "Twilio Support",
        "from": "support@twilio.com"
    }
}
```

Header/Envelope

Media Properties

| Availability | Capacity | Capability | Activity |
|---|---|---|---|
| Users | | | |
| Request | | Reservation | |
| URP | | | |
| Orchestrator | | | |

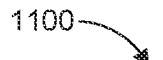
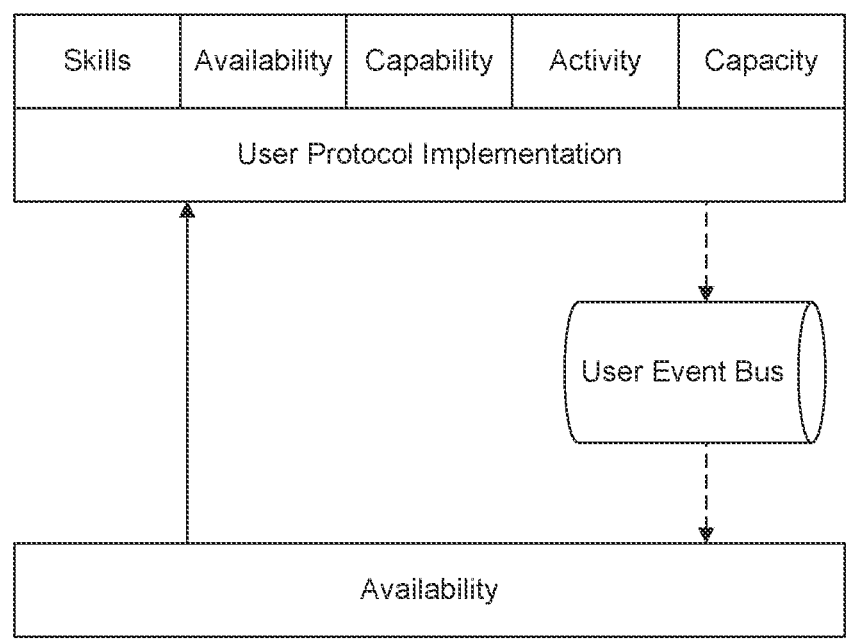
FIG. 11

1200

```
{
  "charmer":{
    "type":"email",
    •••
  },
  "routing":{
    "type":"TaskRouter",
    •••
  },
  "insights": {
    •••
  },
  "customer": {
    "name" : "John Doe",
    "customer link" : "https://crm.company.com/customer/123",
    "customer_attribute_1": "Attribute 1",
    "customer_attribute_2": "Attribute 2",
    "customer_attribute_3": "Attribute 3",
    "customer_label_1": "Label 1",
    "customer_label_2": "Label 2",
    "customer_label_3": "Label 3",
    "category" : "VIP",
    "customer_manager" : "Financial Partners Corp.",
    "email" : "john.doe@gmail.com",
    "gender" : "Male",
    "market_segment" : "Pensioners",
    "organization" : "Prosperity Inc.",
    "phone" : "4-44xxxxxxxxx",
    "year_of_birth" : "1947",
    "zip" : "ZCO00000",
    "acquisition_cost" : 150,
    "business_value" : 7500
  }
}
```

Customer Record

```
{
   "charmer":{
      "type":"email",
      "direction":"inbound",
      "initiated_by": "webform",
      "customer": {
         "name": "Random Person",
         "address": "random@person.com"
      },
      "target": {
         "name": "Twilio Support",
         "address": "support@twilio.com"
      },
      "properties":[
         "from":"support@twilio.com",
         "from_name":"Twilio Support",
         "type":"email",
         "direction":"outbound"
      },
      "participants": [
         {
            "level": "to",
            "name": "Random Person",
            "address":"random@person.com",
            "proxy_address":
   "support@twilio.com",
            "type": "email"
         }
      ]
```

Customer
Coordinates

FIG. 13

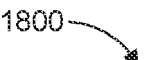
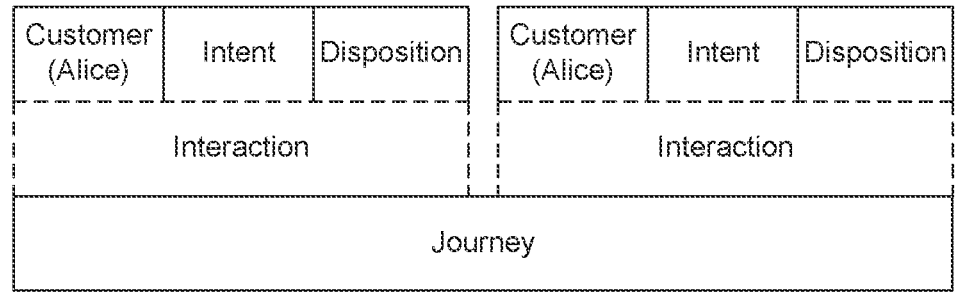
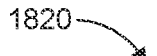
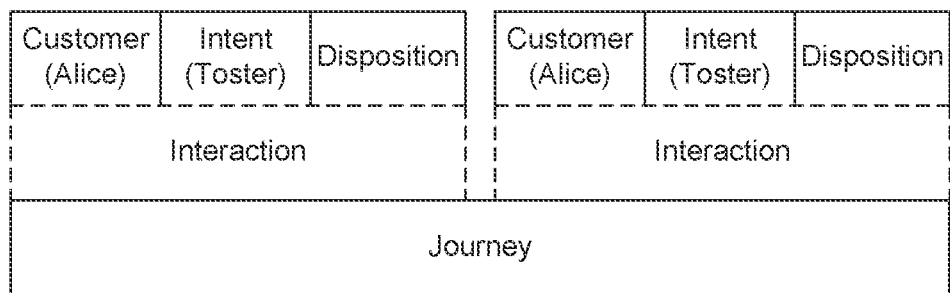
FIG. 18

API

| URI | Params | Description |
|---|---|---|
| POST /v1/interactions | ... | Create a new interaction. |
| GET /v1/interactions | ... | List all interactions. |
| | | GraphQL??? E.g. to filter by the participant, get a richer result from one request |
| | Limit | Size of the result set |
| | offset | offset to start collecting results from |
| PUT /v1/interactions/<interaction id> | ... | Modify an interaction |
| | status | One of {Active, Inactive, Closed} |

Figure 22:
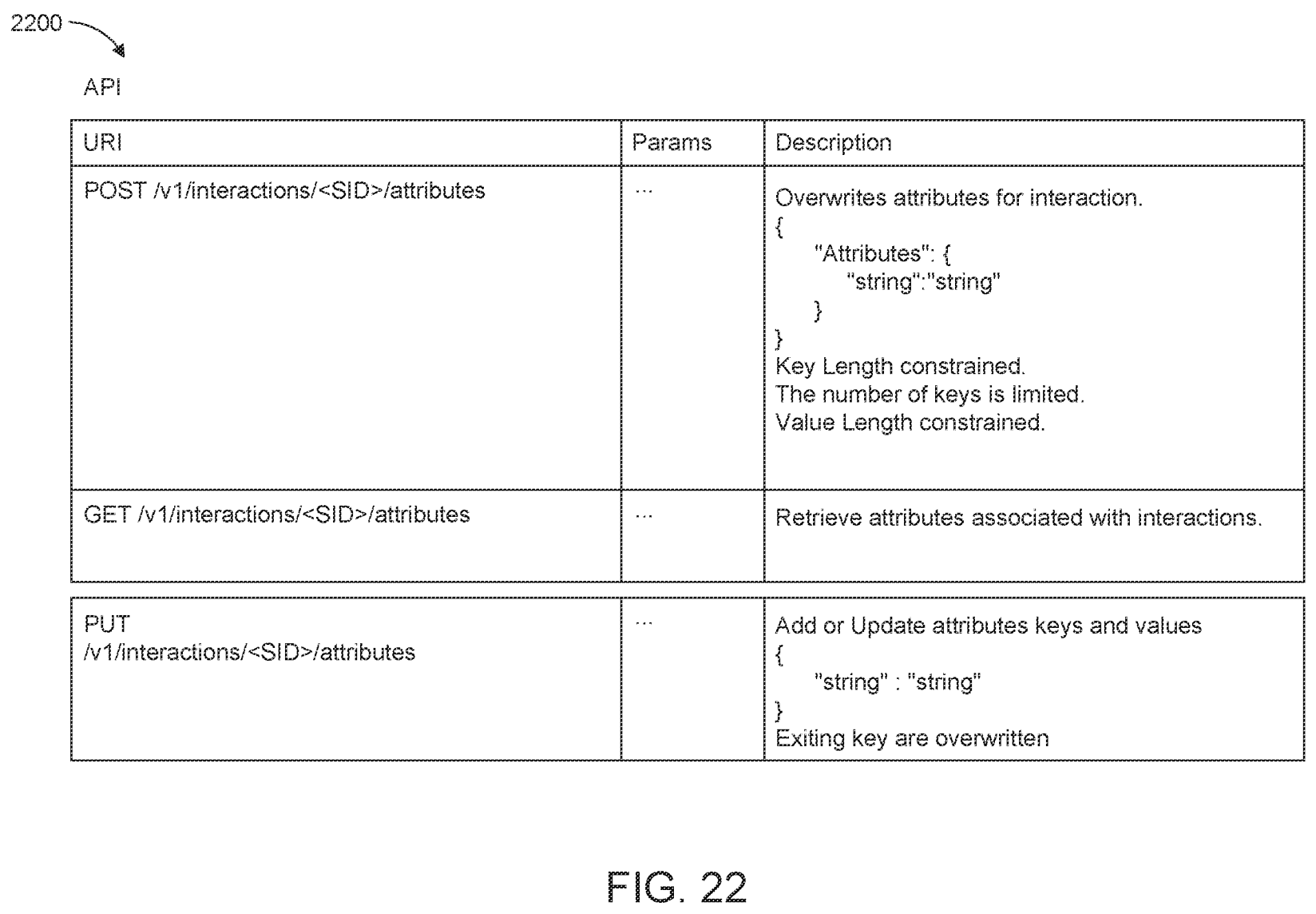

API

| URI | Params | Description |
|---|---|---|
| POST /v1/interactions/<SID>/attributes | ... | Overwrites attributes for interaction.<br><br>{<br>  "Attributes": {<br>    "string":"string"<br>  }<br>}<br>Key Length constrained.<br>The number of keys is limited.<br>Value Length constrained. |
| GET /v1/interactions/<SID>/attributes | ... | Retrieve attributes associated with interactions. |
| PUT /v1/interactions/<SID>/attributes | ... | Add or Update attributes keys and values<br><br>{<br>  "string" : "string"<br>}<br>Exiting key are overwritten |

API

| URI | Params | Description |
|-----|--------|-------------|
| POST /v1/interactions/<SID>/channels | ... | Creates a channel |
| GET /v1/interactions/<SID>/channels | ... | List all channels on the interaction |
| GET /v1/interactions/<SID>/channels/<channel sid> | ... | Get an interaction channel. |
| PUT /v1/interactions/<SID>/channels/<channel sid> | ... | Modify an interaction channel state or properties<br>{<br>   "Status" : "string"<br>} |
| DELETE /v1/interactions/<SID>/channels/<channel sid> | ... | Remove a channel from the interaction |

FIG. 23

| URI | Params | Description |
|---|---|---|
| POST /v1/Interactions/<interaction_sid>/Channels/<channel_sid>/Participants | ⋮ | Add a participant to the interaction channel. |
| PUT /v1/Interactions/<interaction_sid>/Channels/<channel_sid>/Participants/<participant_sid> | ⋮ | Modify a media participant in the interaction channel |
| DELETE /v1/Interactions/<interaction_sid>/Channels/<channel_sid>/Participants/<participant_sid> | ⋮ | Remove participants from the meeting associate to channel. Put Participants in the Left State. |
| GET /v1/Interactions/<interaction_sid>/Channels/<channel_sid>/Participants | ⋮ | Get participants from an interaction channel. |
| GET /v1/Interactions/<interaction_sid>/Channels/<channel_sid>/Participants/<participant_sid> | ⋮ | Get participants from an SID. |

| URI | Params | Description |
|---|---|---|
| POST /v1/Interactions/<interaction_sid>/Channels/ <channel sid>/Invites | ⋮ | Creates an invite for a user. offers a channel and an interaction. |
| POST /v1/Interactions/<interaction_sid>/Channels/ <channel sid>/Invite/<Invite sid> | ⋮ | Accept or Decline or Cancel. |
| GET /v1/Interactions/<interaction_sid>/Channels/ <channel_sid>/Invites | ⋮ | Get invites from an interaction channel. |
| GET /v1/Interactions/<interaction_sid>/Channels/ <channel_sid>/Invites/<interaction_sid> | ⋮ | Get invites by an SID. |
| <channel_sid>/Invites/<interaction_sid> | | |

| URI | Params | Description |
|-----|--------|-------------|
| POST /v1/Users | ... | Creates or Updates a User. |
| GET /v1/Users/<user_sid> | ... | Retrieves a user with the specified sid. |
| DELETE /v1/Users/<user_sid> | ... | Deletes the associated users record |

| URI | Params | Description |
|---|---|---|
| POST /v1/Users/<user_sid>/RoutingAttributes | :: | Creates or Updates a User. |
| GET /v1/Users/<user_sid>/RoutingAttributes | :: | Retrieves a user with the specified sid. |
| DELETE /v1/Users/<user_sid>/RoutingAttributes | :: | Removes the specified users attributes |

| URI | Params | Description |
|---|---|---|
| POST /v1/Queues/<user_sid>/Presence | ... | Create new revision of user presence. |
| GET /v1/Users/<user_sid>/Presence | ... | Get the latest value of user presence. |
| GET /v1/Users/<user_sid>/Presence/History | ... | Get the past revision of updates made to user presence. |

| URI | Params | Description |
|---|---|---|
| POST /v1/Queues | ⋮ | Creates a new Queue. |
| PUT /v1/Queues/<queue_SID> | ⋮ | Update a queue. |
| GET /v1/Queues | ⋮ | Get the list of queues. |
| GET /v1/Queues/<queue_sid> | ⋮ | Describe a given queue. |
| GET /v1/Queues/<queue_sid>/Users | ⋮ | Get a list of users participating in this queue. |

| | | |
|---|---|---|
| POST /v1/Workflows | ⋮ | Creates a workflow to handle customer contact |
| POST /v1/Workflows/<Workflow_sid> | ⋮ | Update and create a new revision of workflow. At a given time more then one revision of workflow can be in use. |
| GET /v1/Workflows | ⋮ | Get all workflows and their latest revisions associated with this system instance. |
| GET /v1/Workflows/<workflow_sid> | ⋮ | Get the latest version of Workflow by an SID. |
| GET /v1/Workflows/<workflow_sid>/Revisions | ⋮ | Get the all revision of the workflow by SID |
| GET /v1/Workflows/<workflow_sid> /Revisions/<revision sid> | ⋮ | Get the workflow by version sid. |
| DELETE /v1/Workflows/<workflow_sid> | ⋮ | Deletes the workflow by SID and deletes all its revisions. Deletion fails if there is an active execution associated with Workflow. |

| URI | Params | Description |
|---|---|---|
| POST /v1/Workflows/<workflow_sid>/executions | ... | Trigger a new execution of the latest revision of the workflow. |
| POST /v1/Workflows/<workflow_sid>/Revision/<revision_sid</executions | ... | Trigger a new execution of a specific revision of the workflow. |
| GET /v1/Workflows/<workflow sid>/executions | ... | Get list of executions associated with workflow. |
| GET /v1/Workflows/<workflow_sid>/executions/<execution_sid> | ... | Get the signal execution |
| POST /v1/Workflows/<workflow_sid>/Executions/<execution sid> | ... | End the execution. |
| DELETE /v1/Workflows/<workflow_sid>/Executions/<execution_sid> | ... | Delete the execution. |

| Key | Description | Example |
|---|---|---|
| match | Lists the routing attributes that are required to match. These are the same attributes that are automatically (hard-coded) configured on the User | ["<category sid>", "<language sid>"] |
| priority | Sets the priority of the routing request. | 100 |
| timeoutSeconds | Sets the maximum time in seconds the system can try to find a match for this request before it must time out. | 120 |
| proficiency | Specifies the proficiency criteria that an user must meet for the specified routing attribute. | { "<category sid>": { "value": 20, "relationship": greaterThen"} } |
| preferredUsers | Targets only the specified (min.) one to (max.) five users for this request. | ["<user1 sid>", "<user2 sid>"] |

```
// This is the actual definition of the block
interface BlockDefinition {
// unique is a unique id that identifies the block definition. It must start with either
`blocks.core.*` or `blocks.compound.*`
that would define whether it is a `core` or `compound` block.
type: string;
                              description: string;

// the version of this block definition
version: number;
parameters: {
// all the required/optional input parameters
input: OpenAPISpec;
// the parameters that this block provides - these will inserted into the context
output: OpenAPISpec;
};
// this is how compound blocks are made
blocks: Array<Block>;
// this is used by compound blocks to define their final context output from all the internal/
nested blocks
outputContext: object;
// the list of available transitions
transitions: Array<string>;
}
// This is the use of a given block definition
interface Block {
// this corresponds to one of the given core blocks or an existing compound block
type: string;
// this must be unique to the entire flow
id: string;
// the version of this block definition
version: number;
// the actual input to the block - this has to be parameters.input from the corresponding
block definition
input: object;
transition: {
// provides what each transition of the type block does. The key is the transition state of the
block, and the value is the id of
the next block
                        [name in string]: string;
                                     };
                                     }
```

FIG. 61

```
const setVarsBlock: BlockDefinition = {
type: 'com.twilio.blocks.core.vars.set',
description: 'The block for setting variables. Can be used to increment a counter, or a
concat two strings',
version: 1,
parameters: {
input: {
type: 'object',
required: [
'key',
'value',
],
properties: {
key: {
type: 'string',
description: 'The key/name of the variable'
},
value: {
type: 'string',
description: 'The value of the variable or a mustache expression',
},
},
},
output: {},
},
transitions: ['next'],
blocks: [],
};
```

FIG. 62

```
const ifElseBlock: BlockDefinition = {
type: 'com.twilio.blocks.core.logic.conditional,
description: 'An if/else statement. It will compare the {variable} to the {value} using the
comparison chosen',
version: 1,
parameters: {
input: {
type: 'object',
required: ['variable',
'comparison'
],
properties: {
variable: {
type: 'string',
description: 'The variable to test'
},
comparison: {
type: 'string',
description: 'The comparison/logic to apply the value to',
enum: [
'equal-to',
'not-equal-to',
'bigger-than',
'less-than',
'bigger-than-or-equal-to',
'less-than-or-equal-to',
'is-blank',
'is-null',
'regex',
'contains',
'...',
],
},
value: {
type: 'string',
description: 'the value to test the variable against. For multi-valued conditions, separate
with a comma',
},
},
},
output: {},
},
transitions: ['matched', 'not_matched'], // there will be one match per `tests` and one for no-
matched
blocks: [],
                                          }
```

FIG. 63

```
const httpBlock: BlockDefinition = {
type: 'com.twilio.blocks.core.http',
description: 'The HTTP library used for making requests',
version: 1,
parameters: {
input: {
type: 'object',
required: [
'method',
'url',
],
parameters: {
method: {
type: 'string',
enum: [
'get',
'post',
'put',
'delete'
],
},
url: {
type: 'string',
},
data: {
type: 'object',
},
headers: {
type: 'object',
},
configurations: {
type: 'object',
parameters: {
retry: {
type: 'number',
},
timeout: {
type: 'number',
}
},
}
}
},
```

```
output: {
type: 'object',
parameters: {
body: {
type: 'object',
},
statusCode: {
type: 'number',
},
headers: {
type: 'object',
},
},
},
},
transitions: ['success', 'failed', 'timeout'],
blocks: [],
};
```

FIG. 64 (Continued)

```
const forkBlock: BlockDefinition = {
type: 'com.twilio.blocks.core.fork',
description: 'The block for splitting the flow into two parallel
execution',
version: 1,
parameters: {
input: {},
output: {}
},
transitions: ['left', 'right'],
blocks: [],
                                        };
```

FIG. 65A

```
const mergeBlock: BlockDefinition = {
type: 'com.twilio.blocks.core.merge',
description: 'The block for combining two parallel executions',
version: 1,
parameters: {
input: {},
output: {}
},
transitions: ['next'],
blocks: [],
}
```

FIG. 65B

```
const webhook: BlockDefinition = {
type: 'com.twilio.blocks.core.webhook',
description: 'Waits for a webhook to continue executing',
version: 1,
parameters: {
input: {
type: 'object',
properties: {
timeout: {
type: 'number',
description: 'how long to wait before timing out'
},
},
},
output: {
type: 'object',
description: 'the payload the upstream service provides when calling this webhook'
},
},
transitions: ['next', 'timeout'],
blocks: [],
                                          }
```

FIG. 66

```
const forLoopBlock: BlockDefinition = {
type: 'com.twilio.blocks.compound.control.for',
description: 'a for-loop block',
version: 1,
parameters: {
input: {
type: 'array',
items: {
type: 'any',
},
},
output: {
type: 'object',
properties: {
entry: {
type: 'any',
description: 'the current value',
},
index: {
type: 'number',
description: 'the current index',
},
size: {
type: 'number',
description: 'the size of the input array',
},
},
},
transition: ['each', 'done'],
blocks: [{
type: 'com.twilio.blocks.core.vars.set',
id: '              _increment',
version: 1,
input: {
key: '{{parent.id}_increment_index',
value: '{% context.variables.             _increment_index %}
                        _increment_index | plus: 1 }} {%
else %} 0',
},
transition: {
next: '            _check_array',
}
}, {
```

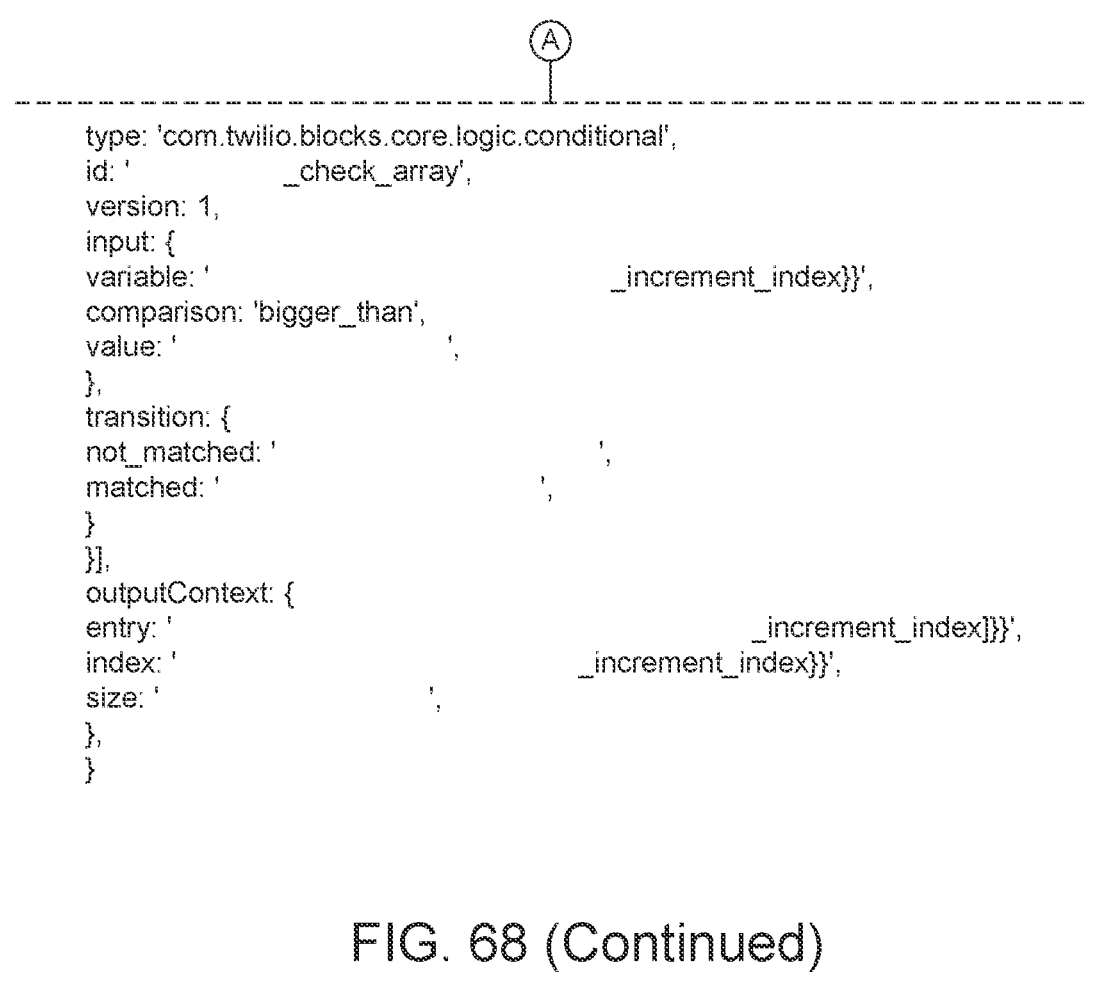

```
type: 'com.twilio.blocks.core.logic.conditional',
id: '                _check_array',
version: 1,
input: {
variable: '                              _increment_index}}',
comparison: 'bigger_than',
value: '                        ',
},
transition: {
not_matched: '                        ',
matched: '                    ',
}
}],
outputContext: {
entry: '                              _increment_index]}}',
index: '                        _increment_index}}',
size: '                  ',
},
}
```

FIG. 68 (Continued)

```
const createInteraction: BlockDefinition = {
type: 'blocks.comound.twilio.interactions.create',
description: 'A block for creating Interaction and Interaction Channel',
version: 1,
parameters: {
input: {
type: 'object',
required: [
'type'
],
parameters: {
type: {
type: 'string',
description: 'the interaction channel type',
enum: [
'email',
'sms',
'voice',
'whatsapp',
],
},
},
},
output: {
type: 'object',
properties: {
interaction: {
type: 'object',
properties: {
sid: {
type: 'string',
},
// other properties
}
},
interaction_channel: {
type: 'object',
properties: {
sid: {
type: 'string',
},
// other properties
},
},
},
},
```

Figure 69:
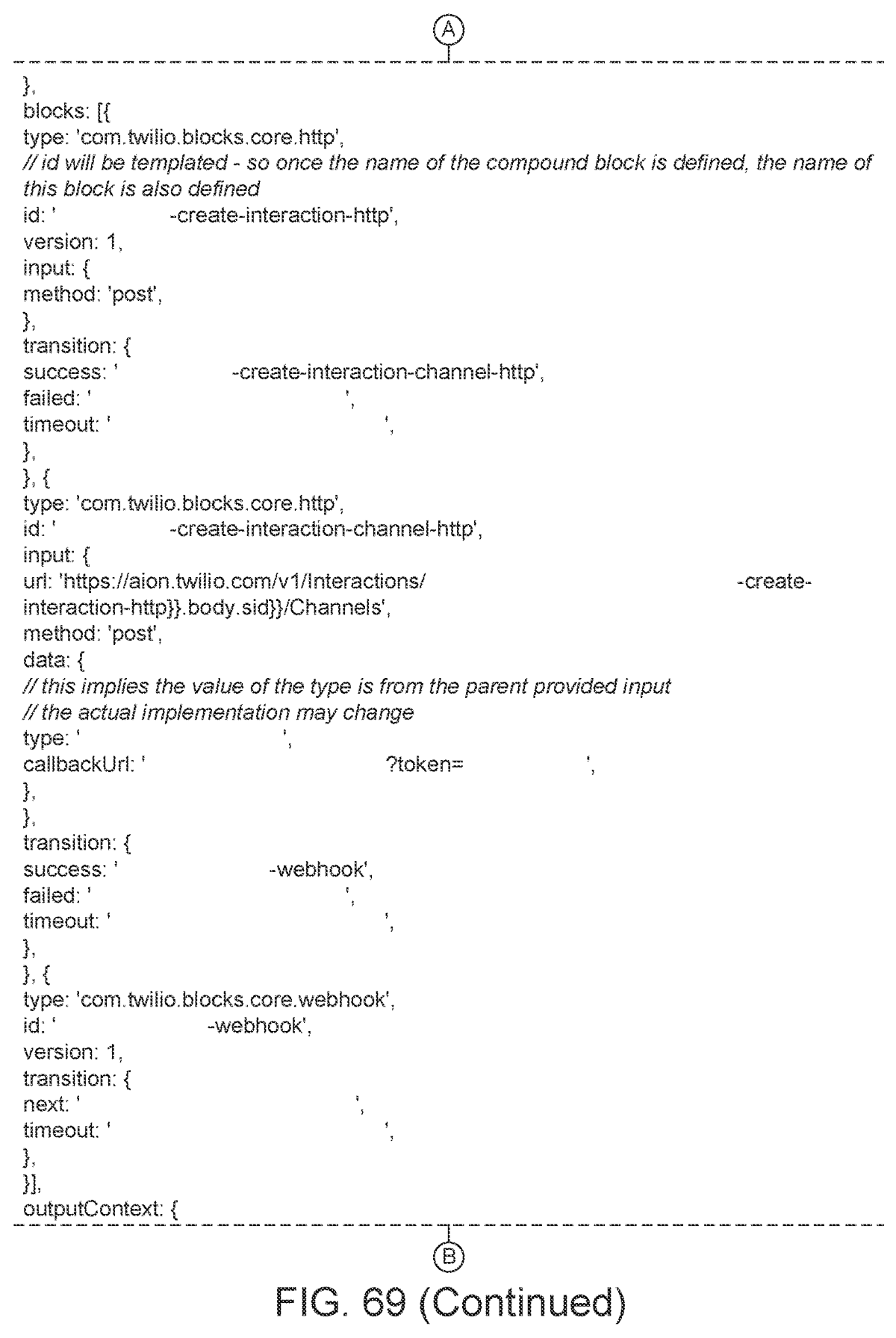

```
},
blocks: [{
type: 'com.twilio.blocks.core.http',
// id will be templated - so once the name of the compound block is defined, the name of
this block is also defined
id: '              -create-interaction-http',
version: 1,
input: {
method: 'post',
},
transition: {
success: '               -create-interaction-channel-http',
failed: '                              ',
timeout: '                              ',
},
}, {
type: 'com.twilio.blocks.core.http',
id: '              -create-interaction-channel-http',
input: {
url: 'https://aion.twilio.com/v1/Interactions/                    -create-
interaction-http}}.body.sid}}/Channels',
method: 'post',
data: {
// this implies the value of the type is from the parent provided input
// the actual implementation may change
type: '                       ',
callbackUrl: '                       ?token=            ',
},
},
transition: {
success: '               -webhook',
failed: '                      ',
timeout: '                      ',
},
}, {
type: 'com.twilio.blocks.core.webhook',
id: '              -webhook',
version: 1,
transition: {
next: '                      ',
timeout: '                      ',
},
}],
outputContext: {
```

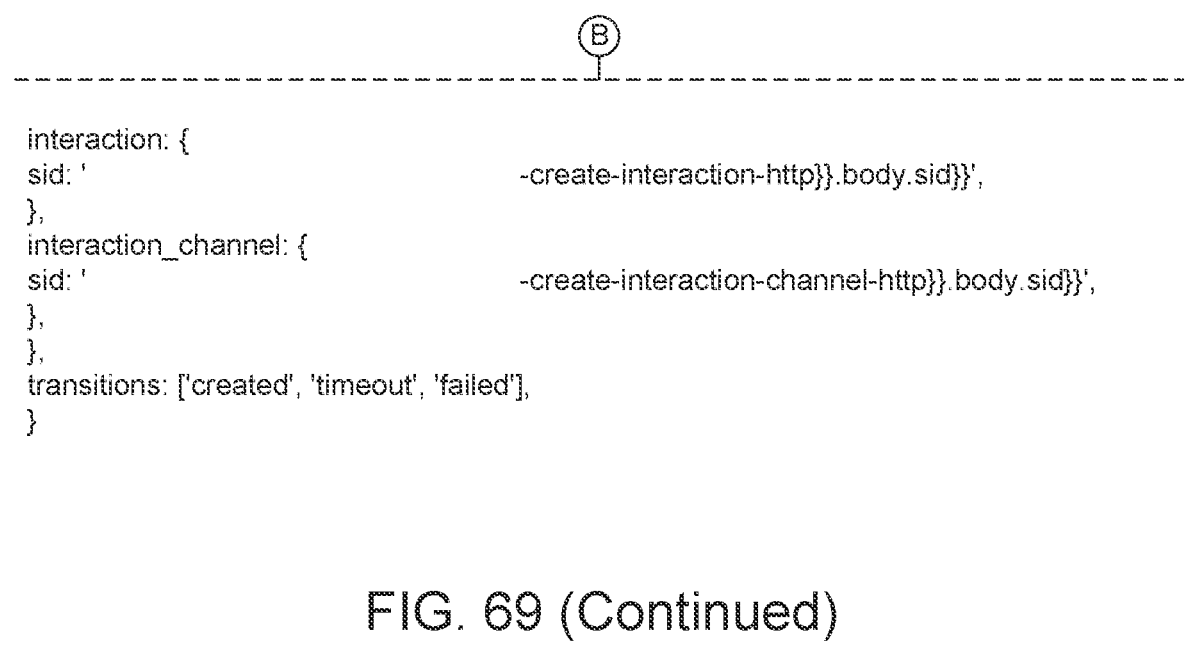

```
interaction: {
sid: '                         -create-interaction-http}}.body.sid}}',
},
interaction_channel: {
sid: '                         -create-interaction-channel-http}}.body.sid}}',
},
},
transitions: ['created', 'timeout', 'failed'],
}
```

FIG. 69 (Continued)

```
interface Flow {
name: string;
description: string;
// the flow revision number
version: number;
blocks: Array<Block>;
}
```

FIG. 70

```
const flow: Flow = {
name: 'incoming-conversation-flow',
description: 'My custom Aion Flow for handling incoming conversation flow',
version: 1,
// By definition, the first entry in the flow will be the first block to handle the incoming
request
blocks: [{
type: 'com.twilio.blocks.compound.cdp.lookup-profile',
id: 'lookup_profile_1',
version: 1,
input: {
identity: '                                           ',
},
transition: {
found: 'lookup_interaction_channel_1',
notFound: 'create_interaction_channel_1',
timeout: null,
}
}, {
type: 'com.twilio.blocks.compound.interactions.lookup',
id: 'lookup_interaction_channel_1',
version: 1,
input: {
interaction_sid: '{{context.blocks.lookup_profile_1.interaction_sid',
interaction_channel_sid: '{{context.blocks.lookup_profile_1.interaction_channel_sid',
},
transition: {
found: 'create_routing_request_1',
notFound: 'create_interaction_channel_1',
timeout: null,
}
}, {
type: 'com.twilio.blocks.compound.interactions.create',
id: 'create_interaction_channel_1',
version: 1,
input: {
type: '                             ',
},
transition: {
created: 'save_profile_1',
timeout: null,
failed: null,
}
}, {
type: 'com.twilio.blocks.compound.cdp.save',
id: 'save_profile_1',
```

```
version: 1,
input: {
identity: '                                       ',
interaction_sid: '{{context.blocks.create_interaction_channel_1.interaction_sid',
interaction_channel_sid:
'{{context.blocks.create_interaction_channel_1.interaction_channel_sid',
},
transition: {
saved: 'create_routing_request_1',
timeout: null,
}
}, {
type: 'com.twilio.blocks.compound.routing.create',
id: 'create_routing_request_1',
version: 1,
input: {
routing_behavior: 'spanish',
timeout: '20s',
},
transition: {
success: 'find_rep_1',
timeout: 'create_routing_request_2',
failed: null,
},
}, {
type: 'com.twilio.blocks.compound.routing.create',
id: 'create_routing_request_2',
version: 1,
input: {
routing_behavior: 'all',
timeout: '0',
},
transition: {
success: 'find_rep_1',
timeout: null,
failed: null,
},
}, {
type: 'com.twilio.blocks.compound.representatives.find',
id: 'find_rep_1',
version: 1,
input: {
channel_type: '                                    ',
routing_attributes: '                                                              ||
```

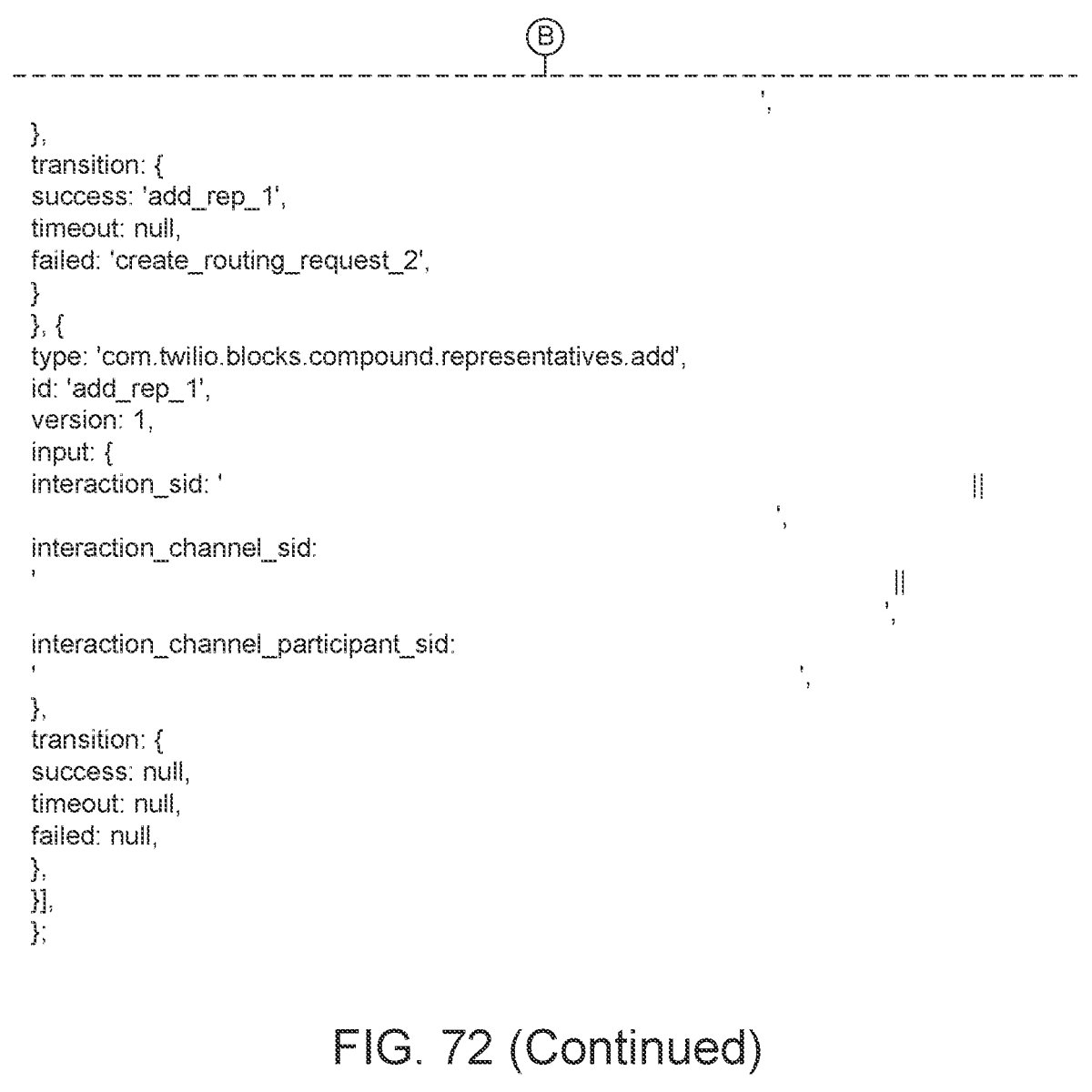

```
},
transition: {
success: 'add_rep_1',
timeout: null,
failed: 'create_routing_request_2',
}
}, {
type: 'com.twilio.blocks.compound.representatives.add',
id: 'add_rep_1',
version: 1,
input: {
interaction_sid: '                                                    || interaction_channel_sid:
'                                                               ||
                                                                , interaction_channel_participant_sid:
'                                              , },
transition: {
success: null,
timeout: null,
failed: null,
},
}],
};
```

FIG. 72 (Continued)

```
interface Context {
blocks: {
// each individual block will have its own context object
// this way there will be no collision and overwrites
// each block must have a unique id in your flow definition
[id: string]: object;
// we will store _all_ individual blocks context (including nested blocks)
// however, the customer will only have access to the context of the blocks they use
// i.e if they use blockA that uses blockA1, and blockA2, the customer has only access to
blockA context
// blockA internally will have access to blockA1 and blockA2
// similarly, if blockA1 has nested blocks blockA11 and blockA12, only blockA1 has
access to those context
// this is a special, and therefore reserved id that all contexts will have
trigger: {
// there will be a type that will include the type of trigger
type: 'voice' | 'messaging' | 'whatsapp' | 'email' | 'etc';
body: {
// it will also include the rest of the object such as CallSid, To, From, etc
};
// includes information about the execution
execution: {
                                        sid: string;
flowSid: string;
url: string;
dateCreated: Timestamp;
dateUpdated: Timestamp;
};
};
};
variables: {
// the set-variable core block is different in that it stores the variables globally
// this is to allow counters and other global variables that can be manipulated throughout
the flow
};
// This is a maybe
profiles: {
// possibly have profile information here that is for the CDP? This can, however, just be
inside the blocks as a special
block-name
// having it individually would probably be useful if we need to manipulate the same object,
similar to variables
};
                                        }
```

FIG. 74

| Name | Type | Description | Required | PII |
|---|---|---|---|---|
| Sid | sid<FL> | Unique identifier of the Flow | Yes | No |
| AccountSid | sid<AC> | The Twilio account that the Flow belongs to | Yes | No |
| UniqueName | UrlFriendlyString | A unique human legible name. Can be used in replacement of the Sid, for instance, lookup. This field is not mutable. | Yes | Maybe |
| FriendlyName | String | A friendly name of the Flow | No | Maybe |
| Revision | Number | An auto-incremented value that represents the revision of the Flow | Yes | No |
| CommitMessage | String | An-auto generated string that represents the change. For example, it can be "added find-profile block" or "deleted save-profile block" or "published revision" | Yes | No |
| Status | FlowStatus | The status of this revision. The last Published status (by DateUpdated) is considered the active revision of this Flow. | Yes | No |
| Definition | JsonString | A stringified JSON blob that describes the Flow. See above for example. | Yes | Maybe |
| DateCreated | Timestamp | Timestamp when the resource was created | Yes | No |
| DateUpdated | Timestamp | Timestamp when the resource was las updated | Yes | No |

FIG. 75

| Name | Type | Description | Required | PII |
|------|------|-------------|----------|-----|
| Sid | sid<EX> | Unique identifier of the Execution | Yes | No |
| AccountSid | sid<AC> | The Twilio account that the Execution belongs to | Yes | No |
| FlowSid | sid<FL> | The Flow that is being executed | Yes | No |
| FlowRevision | Number | The Flow Revision number to execute | Yes | No |
| Status | ExecutionStatus | An-auto incremented value that represents the revision of the Flow | Yes | No |
| EndReason | EndReason | The reason execution ended | Yes | No |
| DateStarted | Timestamp | Timestamp when the execution started | Yes | No |
| DateEnded | Timestamp | Timestamp when the execution ended | Yes | No |
| DateCreated | Timestamp | Timestamp when the resource was created | Yes | No |
| DateUpdated | Timestamp | Timestamp when the resource was last updated | Yes | No |

FIG. 76

| Name | Type | Description | Required | PII |
|---|---|---|---|---|
| Sid | sid<ES> | Unique identifier of the Execution Step | Yes | No |
| AccountSid | sid<AC> | The Twilio account that the Step belongs to | Yes | No |
| FlowSid | sid<FL> | The Flow of the Step | Yes | No |
| FlowRevision | Number | The Flow Revision number | Yes | No |
| ExecutionSid | sid<EX> | The Execution that the Step belongs to | Yes | No |
| BlockId | String | The unique id of the block from the Definition from the Flow resource | Yes | No |
| StepCount | Number | The numeric auto-incremented step count | Yes | No |
| Version | Number | The numeric auto-increment version. This is used for steps that are looped back to the same BlockId. | Yes | No |
| TransitionedFrom | String | What was the source of this transition | Yes | No |
| TransitionedTo | String | What was the destination of this transition | Yes | No |
| Context | JsonString | The Context associated with this block that got executed | Yes | Maye |

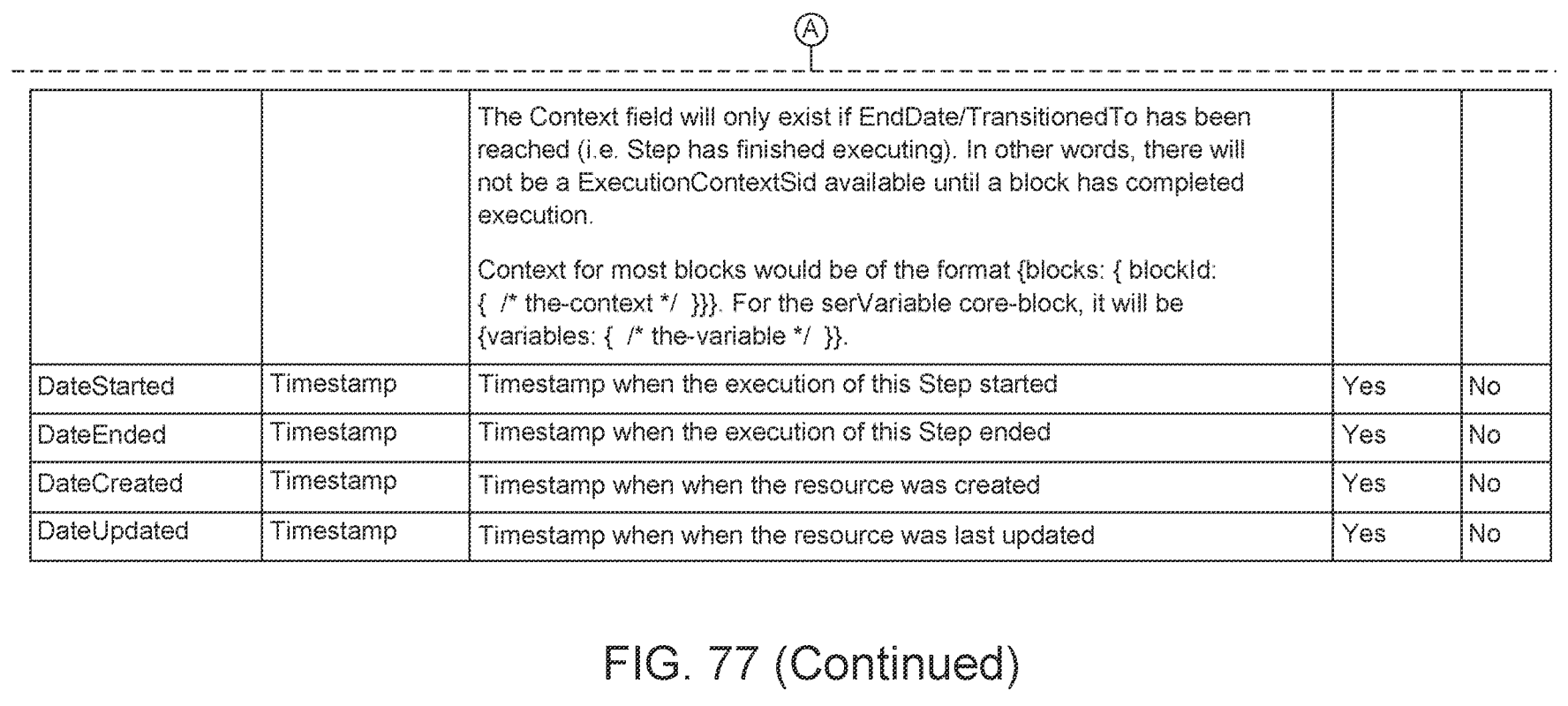

| | | The Context field will only exist if EndDate/TransitionedTo has been reached (i.e. Step has finished executing). In other words, there will not be a ExecutionContextSid available until a block has completed execution.<br><br>Context for most blocks would be of the format {blocks: { blockId: { /* the-context */ }}}. For the serVariable core-block, it will be {variables: { /* the-variable */ }}. | Yes | No |
|---|---|---|---|---|
| DateStarted | Timestamp | Timestamp when the execution of this Step started | Yes | No |
| DateEnded | Timestamp | Timestamp when the execution of this Step ended | Yes | No |
| DateCreated | Timestamp | Timestamp when when the resource was created | Yes | No |
| DateUpdated | Timestamp | Timestamp when when the resource was last updated | Yes | No |

FIG. 77 (Continued)

| Column Name | Type | Description |
|---|---|---|
| AccountSid_Sid (PK) | String | The primary key of the table, which is a concat of the AccountSid and Sid |
| Revision (RK) | Number | An auto-incremented value that represents the revision of the Flow. Will also act as the Dynamo version column and is used as the range key. |
| Sid | String | The primary identifier of this Flow |
| AccountSid | String | The Twilio account that the context belongs to |
| UniqueName | String | A unique human legible name. Can be used in replacement of the Sid for instance lookup |
| FriendlyName | String | The friendly name of this Flow |
| CommitMessage | String | An-auto generated string that represents the change. For example, it can be "added find-profile block" or "deleted save-profile block" or "published revision" |
| Status | String | The status of this revision. The last Published status (by DateUpdated) is considered the active revision of this Flow. |
| Definition | String | A stringified JSON blob that describes the Flow. See above for example. |
| DateCreated | String | A Timestamp when the resource was created |
| DateUpdated | String | Timestamp when the resource was last updated |

FIG. 78

| Column Name | Type | Description |
|---|---|---|
| AccountSid_Sid (PK) | String | The primary key of the table, which is a concat of the AccountSid and Sid |
| Version (RK) | Number | The Dynamo version key. |
| Sid | sid<EX> | Unique identifier of the Execution |
| AccountSid | sid<AC> | The Twilio account that the Execution belongs to |
| FlowSid | sid<FL> | The Flow that is being executed |
| FlowRevision | Number | The Flow Revision number to execute |
| Status | ExecutionStatus | An-auto incremented value that represents the revision of the Flow |
| EndReason | EndReason | The reason execution ended |
| DateStarted | Timestamp | Timestamp when the execution started |
| DateEnded | Timestamp | Timestamp when the execution ended |
| DateCreated | Timestamp | Timestamp when the resource was created |
| DateUpdated | Timestamp | Timestamp when the resource was last updated |

FIG. 79

INTELLIGENCE SYSTEM FOR CLOUD-BASED COMMUNICATION PLATFORMS

CROSS-REFERENCE TO RELATED APPLICATIONS

This application claims the benefit of U.S. Provisional Application No. 63/363,935, filed Apr. 29, 2022, entitled "FLEX INTERACTIONS DEVELOPER EXPERIENCE," which is hereby incorporated by reference herein in its entirety.

TECHNICAL FIELD

The disclosed subject matter relates generally to the technical field of integrated development environments (IDEs) for cloud-based software-as-service (SaaS) architectures and, in one specific example, to an IDE for implementing customer engagement applications using a software development kit (SDK) comprising one or more Application Program Interfaces (APIs).

BACKGROUND

Entities, such as public or private corporations, have unique needs for managing their customer engagement workflows. Current solutions require businesses to make significant investments in hardware and support and offer only pre-packaged implementations that are limiting.

BRIEF DESCRIPTION OF THE DRAWINGS

Some embodiments are illustrated by way of example and not limitation in the figures of the accompanying drawings.

FIG. 7 is pseudo code 700 showing an example of how to inform FO how to do its job.

FIG. 11 is a block diagram depicting an example user implementation.

FIG. 12 is pseudo code depicting an example 1200 of specifying a customer record.

FIG. 13 is pseudo code depicting an example 1300 of inferring the customer identifier from the customer participant's address field.

FIG. 18 includes a block diagram depicting an example of how a journey could be stitched to assemble a journey based on a specific user.

FIG. 19 is a block diagram illustrating an example visual representation of associates collaborating simultaneously on interactions.

FIG. 21 is a table depicting an example API for interactions.

FIG. 22 is a table depicting an example API for attributes.

FIG. 23 is a table depicting an example API for channels.

FIG. 24 is a table depicting an example API for participants.

FIG. 25 is a table depicting an example API for invites.

FIG. 26 is a table depicting an example API for users.

FIG. 27 is a table depicting an example API for routing attributes.

FIG. 28 is a table depicting an example API for presence.

FIG. 29 is a table depicting an example API for queues.

FIG. 30 is a table depicting an example API for workflows.

FIG. 31 is a table depicting an example API for workflow executions.

FIG. 37 is a table showing example routing attributes that a developer may pass to the interactions handlers from a sample application.

FIG. 61 is an example code listing of an example block definition.

FIG. 62 is an example code listing of a set variables block that can be used to increment a counter or concatenate two strings.

FIG. 63 is an example code listing of an if/else conditional block that can be used to control a flow of execution based on conditional criteria.

FIG. 64 is an example code listing of a core HTTP library for making https request.

FIG. 65A is an example code listing of a block for splitting a current execution flow into two execution flows for parallel execution.

FIG. 65B is an example code listing of a block for combining two parallel executions.

FIG. 66 is an example code listing of a block for waiting for an incoming webhook.

FIG. 68 is an example code listing of a block for a for-loop.

FIG. 69 is an example code listing of a block for creating an interaction and an interaction channel.

FIG. 70 is an example code listing for a flow definition.

FIG. 72 is an example code listing of a custom flow for handling the incoming communication depicted in FIG. 71.

FIG. 74 is a code listing of blocks for managing an execution context.

FIG. 75 is a table describing example APIs (e.g., both public and private) that may be serviced for the Flows service.

FIG. 76 is a table describing example APIs for encapsulating the execution of a particular flow.

FIG. 77 is a table describing example APIs for tracking execution steps and/or progression of a Flow.

FIG. 78 is a table that describes example information for a composer flow.

FIG. 79 is a table that describes example information for executions.

DETAILED DESCRIPTION

Figure 1:
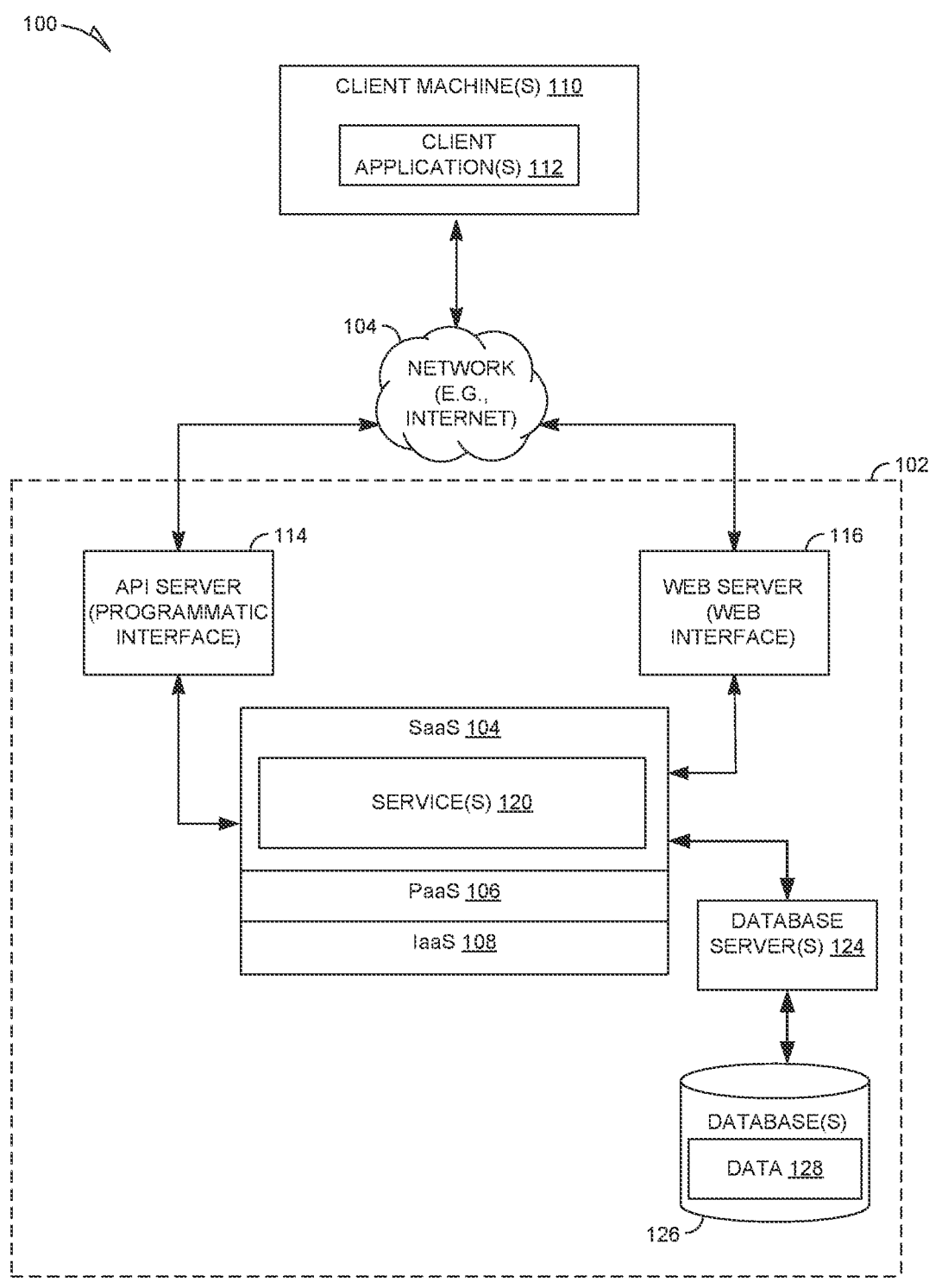
FIG. 1 is a network diagram depicting a cloud-based SaaS system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

A system, including a software development kit (SDK) (e.g., also referred to herein as "the service(s)"), is disclosed that allows user to generate/implement customized customer engagement workflows for their customers. The SDK provides a single API that allows users to leverage various development building blocks, such as communications services, customer data platform, back-end systems, Workflow Orchestration, Intelligence and Front-end Experience, and other building blocks when building the workflows.

The workflows define triggering event and corresponding next steps. For example, a workflow may define that an action, such as filling out an online form, triggers a callback from an agent. The workflow may define an agent or group of agents to perform the callback, resulting in the agents being submitted with a request to perform the action.

The workflows may also define what data to pull and present to an agent from any of the available services, including Segment data. This allows a user to customize and automate all aspects of the customer engagement workflow.

The SDK makes creating the workflows much easier for users and/or developers. Some developers may be familiar with building interaction models using separate APIs, but this is a complex process that requires significant investment to do correctly. The SDK provides the functionality through a single API. Further, is the system may be provided as a cloud service, rather than an on premise solution.

The system's Interactions SDK provides Intelligence functionality to provide recommended actions within a customer engagement workflow. For example, the system can recommend suggested next steps based on the user's interaction history, persona, etc. The system can also recommend suggested agents to which a communication is to be routed.

This allows developers to leverage their data intelligently, without having to build the intelligence system. Further, this allows for improved workflows that aren't limited to the rules initially defined when designing the workflow.

Here are some base principles of the system architecture: Downstream users of the services are not assumed. The services are designed from the perspective of openness. Things change and, in order to not affect downstream services, the services may be configured to be oblivious to where/by whom a contract has been implemented. Consistency may not be assumed and/or promised because consistency may limit availability and scalability. Immediate consistency guarantees may be required in some instances. For data that is an aggregate of other services data, it may be invalidated once data is corrupt. It may not be assumed that events or callbacks are in order, happen immediately, or are always delivered. No process takes an infinite amount of time; therefore, the services may be configured to have timeouts for most, if not all, processes (e.g., callbacks/events may not get delivered). Concurrency or Rate Limits may be configured to match upstream systems. Services may be monitored to ensure they are operating nominally at all times. Services may be configured to be operated in a degraded state (e.g., when a downstream system is unavailable). Idempotency may be supported—for example, operations may be retried and any or all resources required to be idempotent may be provided such that downstream services do not have to compensate Composable functions may be provided, rather than orchestration, except when the services are responsible for the orchestration such that, for example, testability, reusability, and overall reliability becomes easier to provide and/or side effects are avoided.

As used herein, "ACCA" refers to Availability, Capacity, Capability, Activity. In example embodiments, these are different dimensions of a User state in the system. In example embodiments, availability is somewhat redundant and could be replaced by Capability, making the proper acronym ACC.

"UOP" refers to Unified Orchestration Protocol. In example embodiments, this Protocol is used between the system's Orchestrator and various channels, including custom Channels. In example embodiments, UOP defines a common framework for orchestrating different media services, unifying each media service under the unifying concepts of Meetings, Participants, and/or Transfers. It is composed of two sets of interfaces: (1) Meeting API: synchronous API for creating, cancelling and updating meetings and participants. This API is used by the system's Orchestrator to manage the life cycle of channels via Media Orchestrator; (2) UOP Events: asynchronous events for updating the system's Orchestrator on the life cycle of channel meetings.

"URP" refers to Unified Routing Protocol. In example embodiments, this protocol is used between the system's Orchestrator and a User Selection implementation, such as TaskRouter or the system's Programmable Router.

In example embodiments, a method of managing a set of interactions is disclosed. An API for managing an interaction detail record associated with an interaction of the set of interactions is provided. The interaction detail record is stored in a persistent storage that is accessible across a plurality of client systems and a plurality of communication channels associated with the interaction. The API includes one or more event handlers for updating one or more values of one or more user-defined attributes associated with the interaction when one or more events pertaining to the interaction occur. The API also includes one or more event handlers for providing the one or more values of the one or more user-defined attributes to the plurality of client systems when the one or more values are updated. Based on one or more parameters being received from one or more client systems of the plurality of client systems via the one or more event handlers for updating the one or more values, the updating of the one or more values of the one or more user-defined attributes is performed. Based on the performing of the updating of the one or more values of the one or more user-defined attributes, the one or more event handlers for providing the one or more values of the one or more user-defined attributes to the plurality of client systems are invoked.

In example embodiments, a method of intelligently assigning agents to request pertaining to a customer issue is disclosed. Access is provided to an API for managing routing requests received in a customer engagement environment, such as an environment including a contact center and/or other engagement applications. The API includes a handler for a routing request. The handler includes parameters for specifying a routing attribute and a proficiency for the routing attribute. The routing attribute and the proficiency for the routing attribute are received via the parameters of the handler. An agent is recommended to invite to a channel associated with the routing request. The recommending is based on a matching of the agent to the routing attribute and the proficiency for the routing attribute.

In example embodiments, a method of implementing customized workflows is disclosed. Access is provided to an API for creating one or more revisions of a workflow. Each of the one or more revisions defines a flow through an environment including one or more applications for engaging a customer. In example embodiments, the one or more applications may include a contact center. One or more revisions of the workflow are created based on a calling of the API for the creating of the one or more revisions of the workflow. The API includes one or more parameters for specifying one or more payloads. The one or more payloads define one or more pathways through the environment. The one or more pathways are to be selected based on one or more criteria. Access is provided to an API for managing executions of the one or more revisions of the workflow. The API for managing the executions includes functions for triggering a new execution of the one or more revisions of the workflow and getting a list of executions associated with the one or more revisions of the workflow. The new execution of the one or more revisions is executed or the list of executions is provided based on a calling of the function for triggering the new execution or a calling of the function for getting the list of executions. The executing of the new execution including choosing at least one of the one or more pathways based on an evaluation of the one or more criteria.

In example embodiments, a method of implementing a dynamic user interface for a supervisor to monitor performance of agents or an environment of the agents is disclosed. The environment may include one or more applications used by the agents and/or one or more contact center applications. Activities of a plurality of agents are monitored in substantially real-time with respect to a plurality of queues associated with the environment. In example embodiments, each of the plurality of queues is associated with a different type of interaction and/or a different type of customer issue. A queue summary is updated based on the monitoring of the activities. The queue summary includes a performance of each of the plurality of queues and/or a performance of each of the plurality of agents with respect to the plurality of queues. In example embodiments, the queue summary is depicted in the dynamic user interface in substantially real-time. The dynamic user interface includes user interface elements for drilling down into each of the plurality of queues for one or more view containing more granular data corresponding to the queue than what is included in the summary. Examples of the one or more views include a queue detail view, a skills based view, a dialed number performance view, and/or a disposition code view.

FIG. 1 is a network diagram depicting a system 100 within which various example embodiments may be deployed. A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). FIG. 1 illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Examples of such applications include e-mail client applications executing natively on the device, such as an Apple Mail client application executing on an iOS device, a Microsoft Outlook client application executing on a Microsoft Windows device, or a Gmail client application executing on an Android device. Examples of other such applications may include calendar applications, file sharing applications, and contact center applications. Each of the client application(s) 112 may include a software application module (e.g., a plug-in, add-in, or macro) that adds a specific service or feature to the application.

An API server 114 and a web server 116 are coupled to, and provide programmatic and web interfaces respectively to, one or more software services, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications (e.g., service(s)) 120 are shown in FIG. 1 to form part of the networked system 102, in alternative embodiments, the applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and so as to allow the server applications 120 to share and access common data. The server applications 120 may furthermore access one or more databases 126 via the database servers 124. In example embodiments, various data items are stored in the database(s) 126, such as the system's data items 128. In example embodiments, the system's data items may be any of the data items described herein.

Navigation of the networked system 102 may be facilitated by one or more navigation applications. For example, a search application (as an example of a navigation application) may enable keyword searches of data items included in the one or more database(s) 126 associated with the networked system 102. A client application may allow users to access the system's data 128 (e.g., via one or more client applications). Various other navigation applications may be provided to supplement the search and browsing applications.

Figure 2:
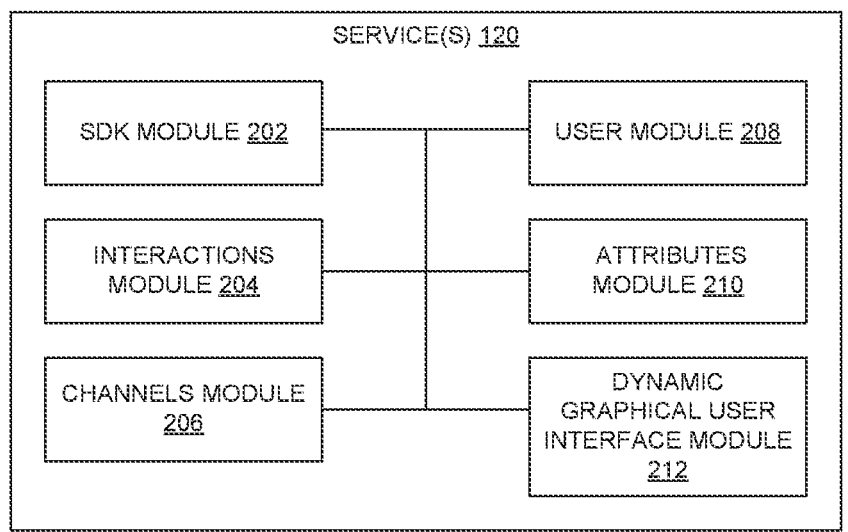
FIG. 2 is a block diagram illustrating example modules of the service(s) of FIG. 1.

FIG. 2 is a block diagram illustrating example modules of the system's service(s) 120. In example embodiment, an SDK module 202 is configured to provide access to one or more APIs for managing interactions and/or performing one or more related tasks, as described herein. An interactions module 204 is configured to manage one or more interactions, as described herein. A channels module 206 is configured to manage one or more channels, as described herein. A user modules is configured to manage one or more users, as described herein. An attributes module is configured to manage one or more attributes, as described herein. A dynamic graphical user interface module 212 is configured to generate one or more user interfaces and/or cause the user interfaces to be presented on a client device, as described herein.

Figure 3:
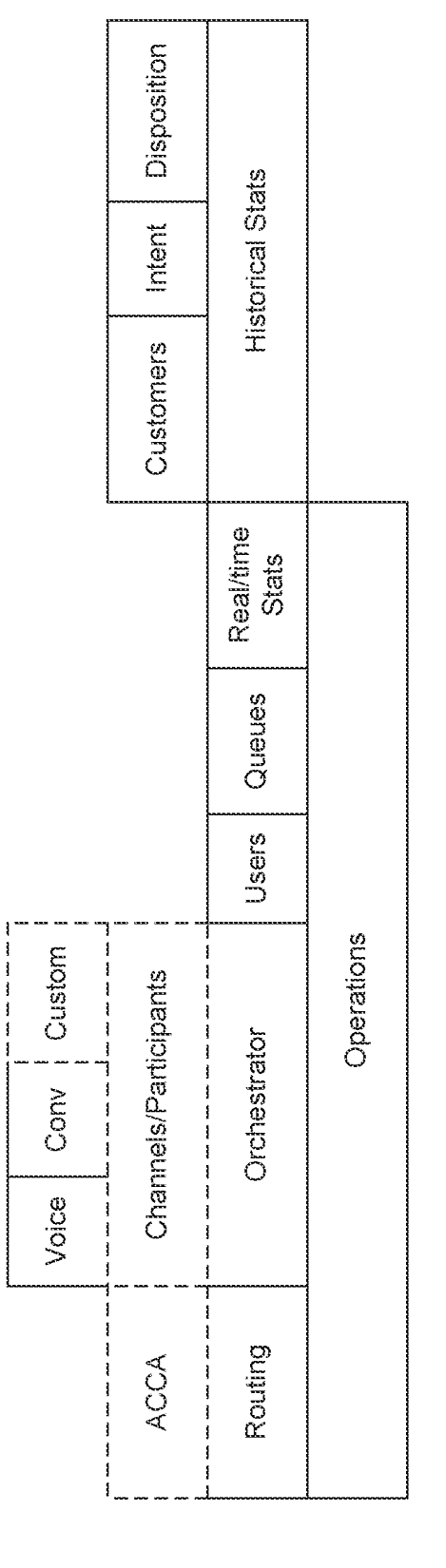
FIG. 3 is a block diagram depicting an example control plane.

FIG. 3 is a block diagram depicting an example system control plane 300. In example embodiments, the illustrated constructs are provided (e.g., on a transactional side of the system) to encapsulate and service user/developer needs. As shown, the constructs may include constructs corresponding to various communication means, such as voice, conversation, or custom communication means (e.g., each of which may be accessible via its own API). The constructs may include an ACCA construct, a "channels/participants" construct (e.g., which may be associated with the various communications means). The constructs may include routing and orchestration constructs, which may be associated with constructs for users, queues, real-time states, and historical stats. The constructs may include constructs for customers, intent, and disposition (e.g., and associated with historical stats). The constructs may include an operations construct (e.g., which may be associated with the routing, orchestration, users, queues, and realtime stats constructs).

Figure 4:
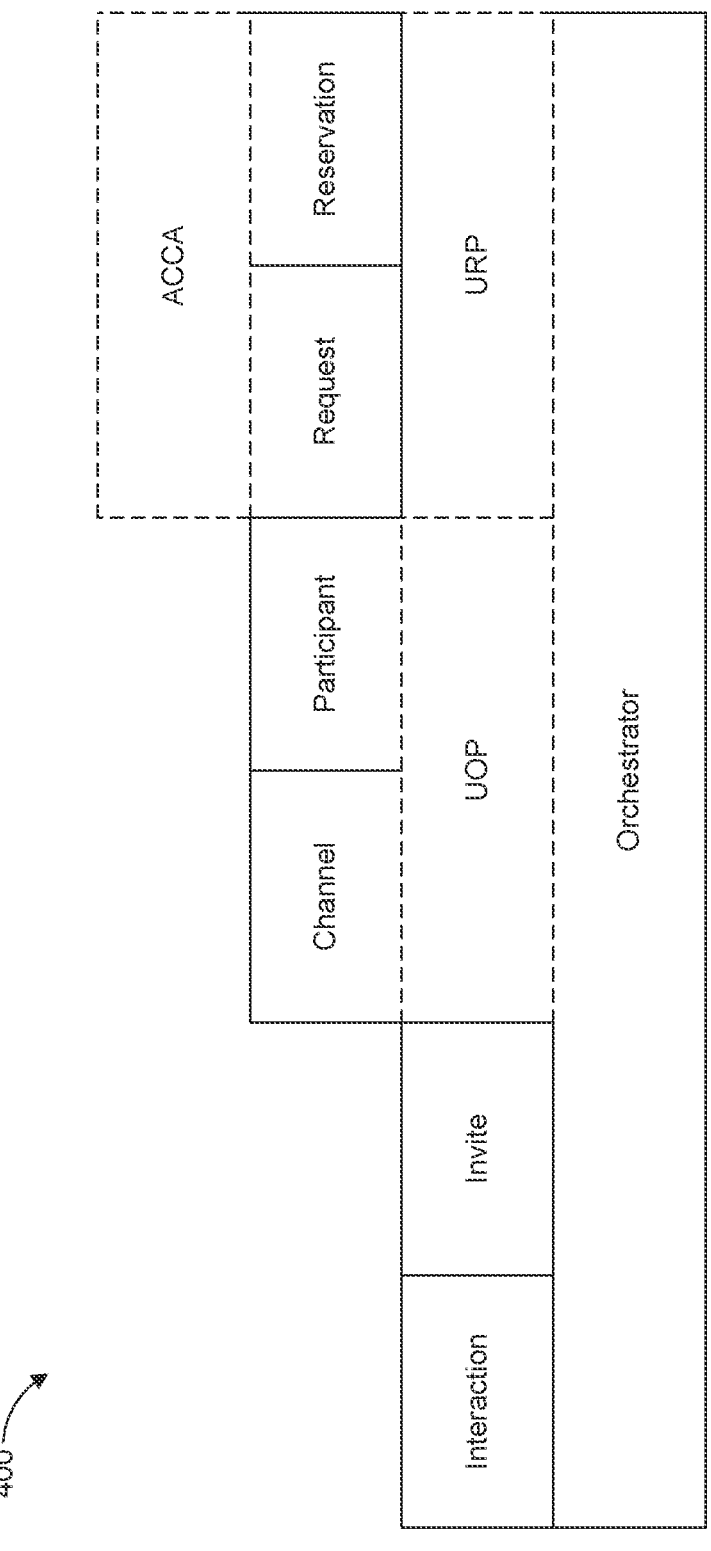
FIG. 4 is a block diagram depicting an example orchestrator component.

FIG. 4 is a block diagram depicting an example Orchestrator component. In example embodiments, interactions and related constructs may be the primary perspective through which administrators (e.g., such as an Agent/Supervisor in a contact center) understands and interacts with the system.

In example embodiments, the Orchestrator sits at the center of the system and ties together one or more resources created throughout the lifecycle. In example embodiments, an Interaction is defined as a Customer and their Intent, which may be the factors that dominate the life of an Interaction. From this definition, it may be inferred that an Interaction has an outcome and thus a point in time when the Interaction is no longer active and/or modifiable (time to live).

In example embodiments, while Customer and Intent and to a degree the Disposition of the Interaction may be fundamental to an Interaction, they may not be modeled by the Interaction itself. This class of data, due to the potentially sensitive nature (e.g., personally identifiable information or "PII"), may be correlated with the Interaction rather than a part of the Interaction Control Plane. By separating the transactional control plane, the system may reduce and/or eliminate the risk of data leakage and provide access of PII data through appropriate control mechanisms.

In example embodiments, an Interaction is a representation of any Customer with a specific Intent. It may contain some or all Channels and Routing requests for any of the Channels associated with the Interaction. In example embodiments, customers are able to add additional Channels to an interaction, submit routing requests to existing channel(s), and/or bundle a new Channel and Routing request in tandem.

In example embodiments, in order to offer a Channel to a system User, the Orchestrator sends out invitations. These Invitations can programmatically be Accepted or Rejected. And the Orchestrator can Rescind or Timeout invitations.

Invitations may be offered either using various techniques, such as webhooks or via a websocket. A side-effect of performing an operation on an Invite may be that the Orchestrator either commits or frees capacity for the corresponding User.

Figure 5:
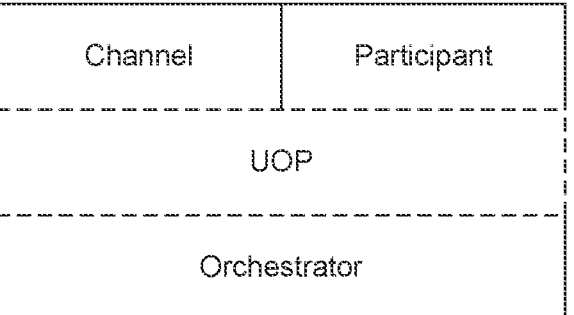
FIG. 5 is a block diagram depicting an example UOP.

FIG. 5 is a block diagram depicting an example UOP 500. In example embodiments, Interactions may be created and/ or offered as Invites by the Orchestrator (FO) In example embodiments, FO provides access to Channels (e.g., media or communication channels) and/or Participants through the Unified Orchestration Protocol (UOP). UOP is built to encapsulate and unify concerns across Channels. In example embodiments, a Channel is the Device or Leg representing an Interaction into a UOP implementation, Participants include a roster of some or all present participants of the UOP implementation.

Commands may be sent to the UOP implementation (e.g., using REST) and the UOP implementation may send out of band events back to FO (e.g., using an event bus) In example embodiments, these events (e.g., media events) include an association (e.g., an InteractionSid and an ChannelSid), which reduces the state that FO has to maintain.

Figure 6:
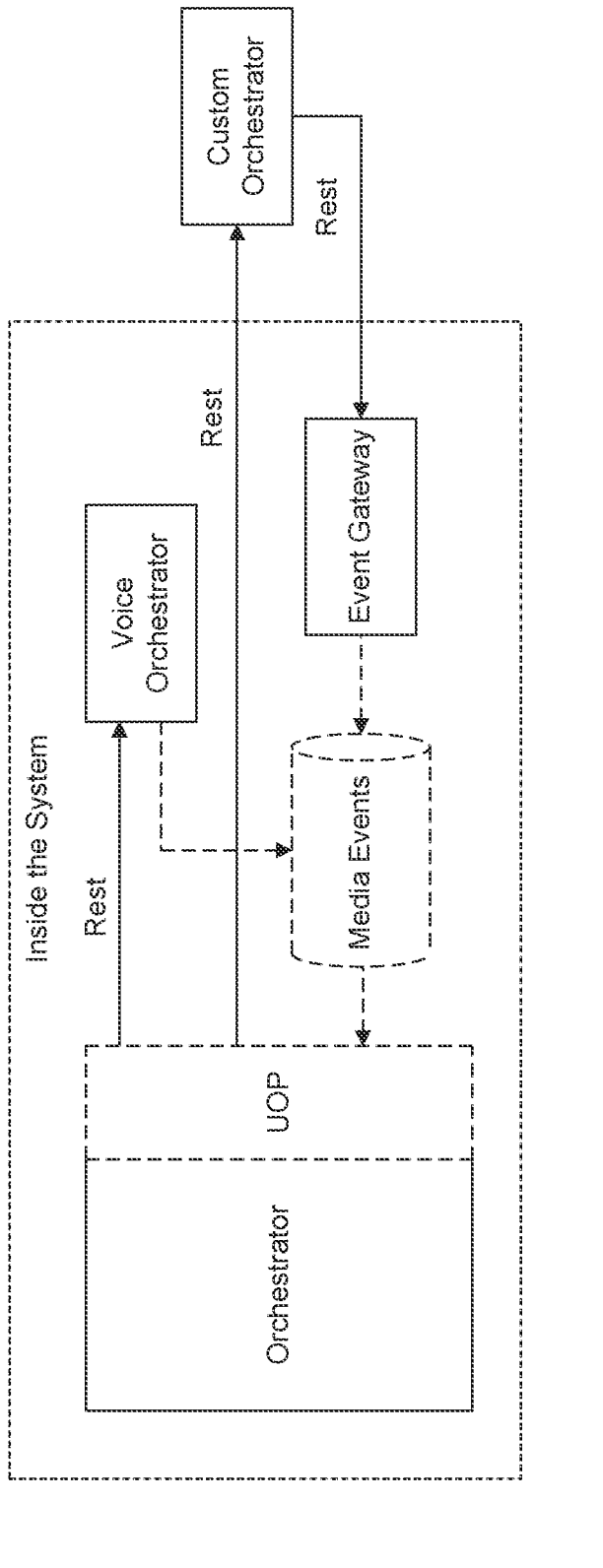
FIG. 6 is a block diagram depicting various components of the system, including a custom orchestrator.

FIG. 6 is a block diagram depicting various components 600 of the system, including a custom orchestrator. In example embodiments, the system offers the ability to tap into the Interaction ecosystem through custom Channels. Such custom channels could include, for example, Zendesk, JIRA, or Zoom channels. For example, developers may implement UOP themselves and FO may send commands to the custom orchestrator. The custom orchestrator may notify the Orchestrator through an Event Gateway.

FIG. 7 is pseudo code 700 showing an example of how to inform FO how to do its job. In example embodiments, the Orchestrator is agnostic to any "media parameters" sent from callers. In example embodiments, the Orchestrator propagates these parameters down to a pertinent UOP implementation. There are a few parameters that are needed to inform FO how to do its job that should be considered as an envelope, as shown.

Figure 8:
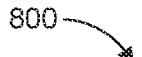
FIG. 8 is a block diagram depicting an example URP.

FIG. 8 is a block diagram depicting an example URP 800. In example embodiments, a role of a Routing engine is to reserve Users. It may do so through implicit and/or explicit predicates, such as customer-defined predicates. The implicit predicates may be managed by the state of the system and/or Availability, Capacity, Capability and Activity (ACCA) of Users in the system. But they may also include other selectors, such as Queue membership.

In example embodiments, the Routing protocol (e.g., URP) may be simpler than UOP because the set of operations may be reduced. The set of operations may include, for example. Submit new Request and/or Cancel Request. The events may include, for example, Reservation(s) created, Timeout (e.g., if the request timed out), and/or Failed (e.g., if conditions could not be met).

Figure 9:
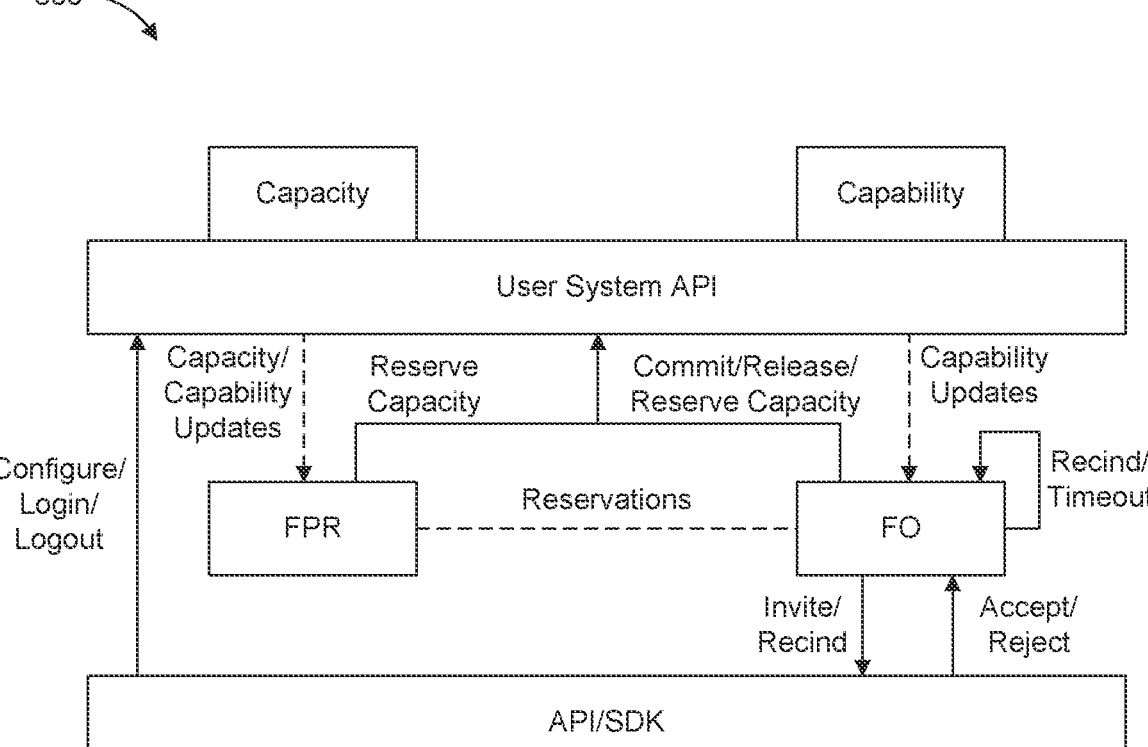
FIG. 9 is a block diagram depicting an example processing of a request.

FIG. 9 is a block diagram depicting an example processing of a request. In example embodiments, a new Request will have an envelope containing common attributes and/or a set of routing engine attributes. The latter may be opaque to FO. Similar to UOP, events may include an InteractionSid and/or ChannelSid for identifying what the request was in regards to.

Figure 10:
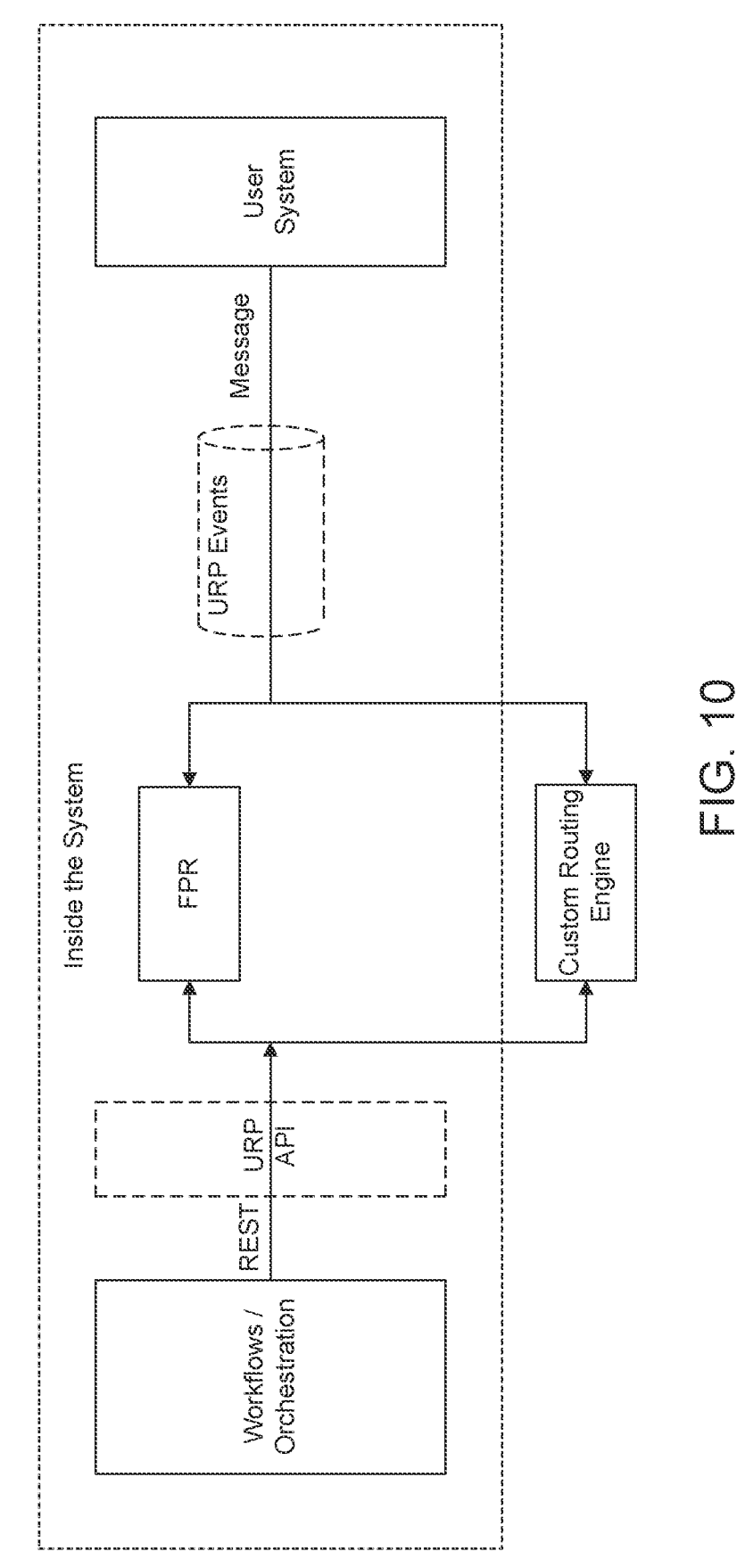
FIG. 10 is a block diagram depicting various components of the system, including a custom routing engine.

FIG. 10 is a block diagram depicting various components 1000 of the system, including a custom routing engine. In example embodiments, developers or users may supply a custom URP implementation similar to custom UOP implementation.

FIG. 11 is a block diagram depicting an example system User implementation 1100. In example embodiments, a system User is a user that can access Interactions. In example embodiments, a logical group of services is provided that manages runtime and configuration state. In example embodiments, a formalized contract similar to UOP and URP is provided for system Users. In example embodiments, similar to UOP and URP, the User system supports a command interface (e.g., through REST) that allows Creation, Updates, Listing, Deletion of resources. It may also support an event topology supporting the user resources to supply downstream consumers in a quick and timely manner.

In example embodiments, the User system may include one or more traits, which may be used by the system's control plane to perform operations, including the traits described below.

Capacity—Represents the current utilization and configured limit of the capacity of a User. Routing may reserve capacity if enough is available of a User. Depending on the outcome of an Invitation that capacity may be committed or released back to the capacity. Will be used as an implicit filter in any routing operation.

Activity—Represents the current Activity of a User Can be used as an explicit filter during routing.

Capability—Represents what kinds of channels are currently supported by the User May be used as an implicit filer by routing.

Skills—A set of attributes, defined by a schema that may be used as an explicit filter by routing.

Queues may provide one or more functions in the system, including providing a mechanism to slot work, a channel that needs to be routed, a container of system Users (A User can belong to zero or more queues), and/or a reporting construct.

Realtime Reporting may provide near real time information to users about the present state of transactions in the system. Realtime Reporting during steady state may aggregate data that flows over the bus(es) But during cold restart, data inconsistency or perhaps when no on access is made to the data for a while, the system may be configured to access upstream services to rehydrate itself. The system may provide further aggregation or filtering mechanisms for purposes of providing efficient reporting.

Operations/Workflows. In example embodiments, functions are provided that a downstream service or a user can programmatically string together in the order how they want it to behave. One such downstream service may be the system's Workflows (engine). This can be thought of as a Studio flow or AWS Connect graph. By stringing together functions, the system is configured to accomplish higher level functions, such as Transfers, Parking, TR-Workflows, and so on.

Reporting Plane. In example embodiments, the Reporting Plane is separated out from the system. In example embodiments, the blast radius of the data is reduced in a configurable manner. As mentioned herein, Interactions may be modeled as a Customer and Intent; however, an Interaction may not have any sense of who the Customer is nor what the customer's intent is. The Control Plane is and should (e.g., for PII reasons), be completely oblivious to these.

Note: It is understood that some PII like phone number, email address etc., will flow into the Orchestrator as coordinates. The system may be configured (e.g., via rules and/or policies) with respect to retention and strategies around eliminating some of the data or referring to it indirectly.

When creating a new Interaction, the system may provide the capability to either specify a CustomerRecord on the Interaction payload or have FO attempt to use the coordinate of a Channel to lookup the customer Identifier.

FIG. 12 is pseudo code depicting an example 1200 of specifying a customer record.

FIG. 13 is pseudo code depicting an example 1300 of inferring the customer identifier from the customer participant's address field.

Figure 14:
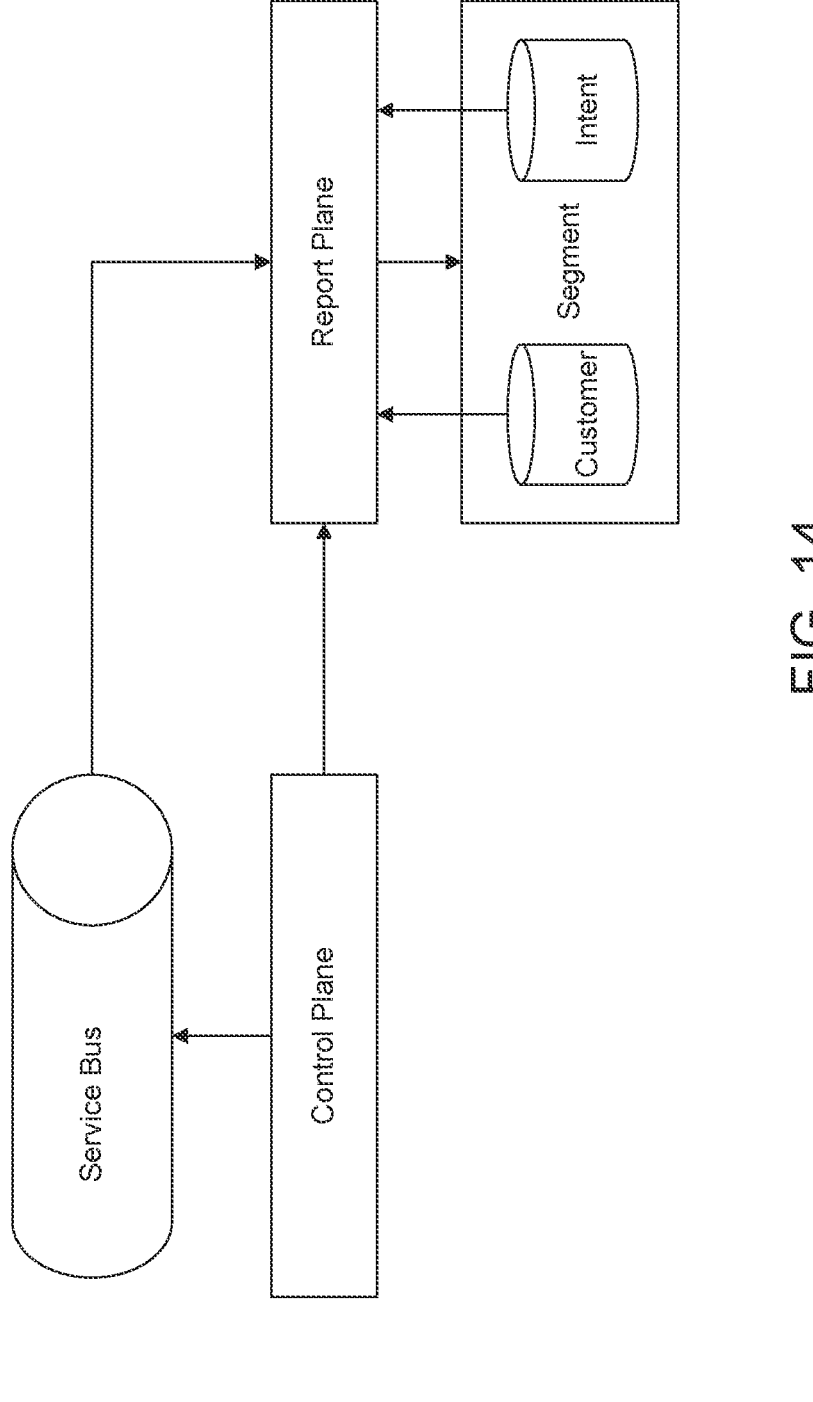
FIG. 14 is a block diagram depicting various example components of an example reporting system.

FIG. 14 is a block diagram depicting various example components of an example reporting system 1400. In example embodiments, the InteractionSid and ChannelSid are used as selector keys to the reporting system. The reporting system can use these to bucketize with and retain association with the Customer and Intent record. This keeps a loose coupling between the Control and Reporting planes.

In example embodiments, customer information can be stored in a highly protected system. To illustrate some of the functionality consider the following pseudo code signatures.

List<InteractionSid> getInteractions(CustomerSid), boolean appendInteraction(InteractionSid, CustomerSid);

boolean appendChannel(InteractionSid, ChannelSid, CustomerSid);

CustomerSid getCustomer(InteractionSid);

CustomerSid lookupCustomer(LookupRequest);

What information a real time system such as the SDK/user interface (UI) sees about the Customer may depend on the permissions of the User attempting to access it.

Figure 15:
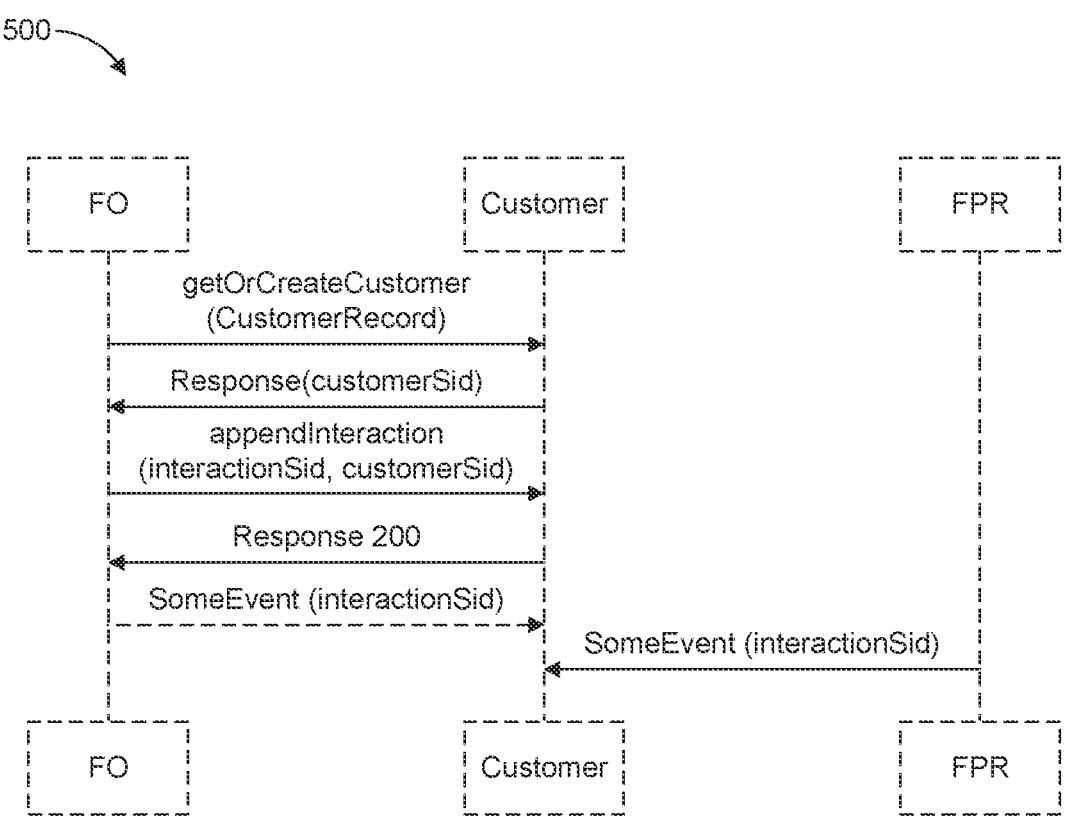
FIG. 15 is a diagram depicting example interactions between the FO, customer, and the FPR.
Figure 16:
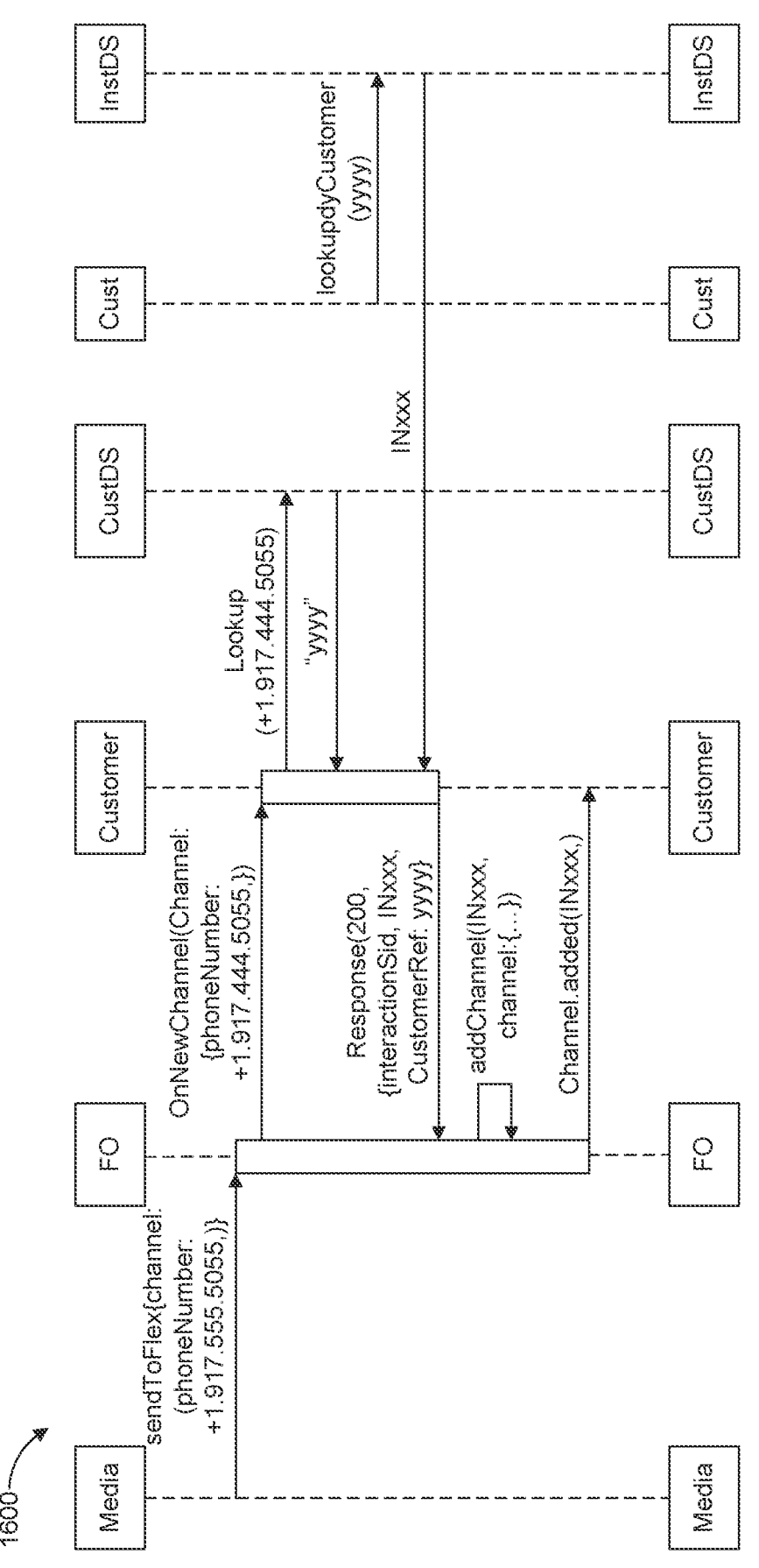
FIG. 16 is a diagram depicting example interactions between various components if the customer wants to manage customer data.

FIG. 15 is a diagram depicting example interactions 1500 between the FO, customer, and the FPR FIG. 16 is a diagram depicting example interactions between various components if the user wants to manage customer data.

Figure 17:
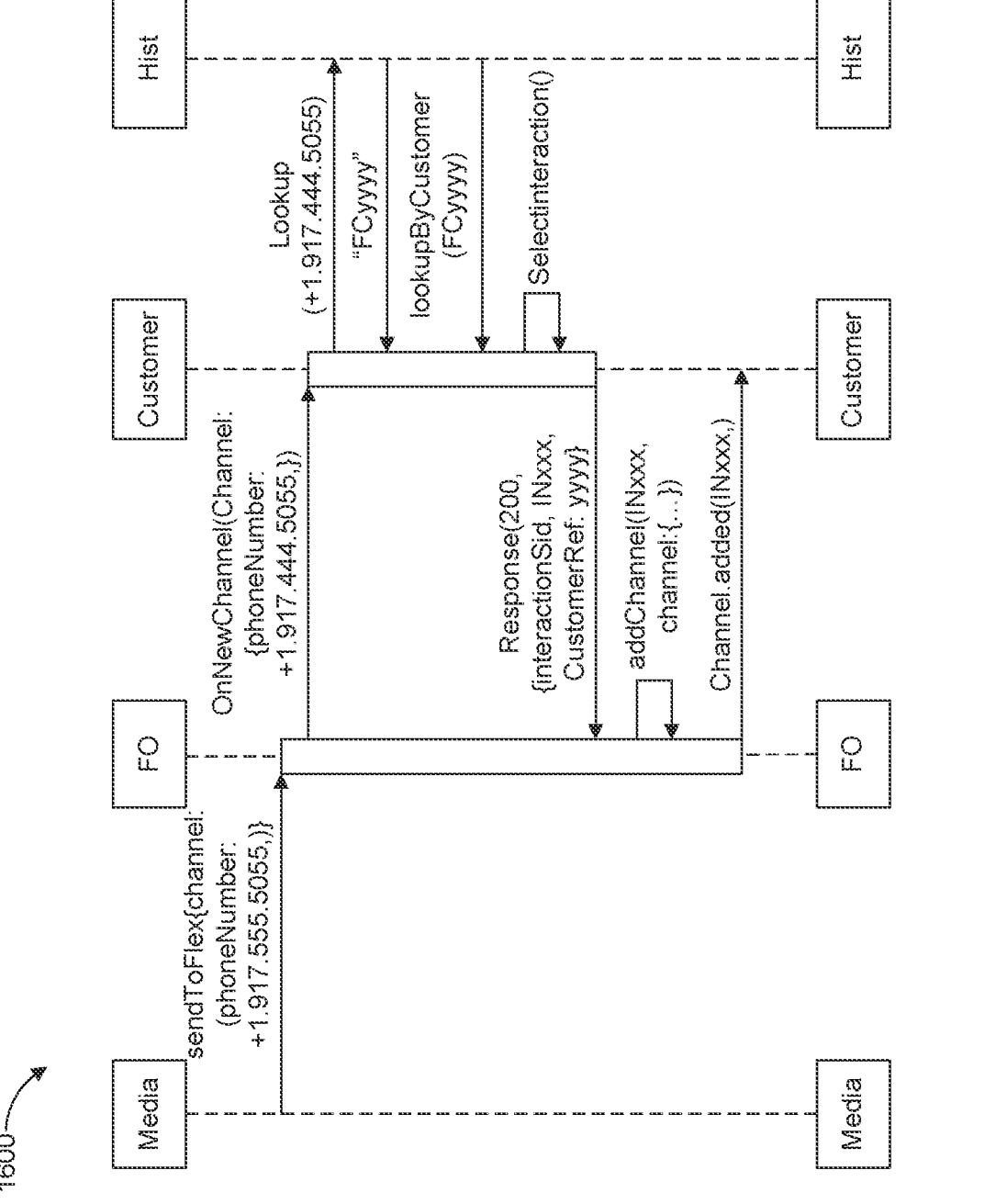
FIG. 17 is a diagram depicting example interactions between various components if a vault solution is provided to the customer.

FIG. 17 is a diagram depicting example interactions between various components if a vault solution is provided to the user.

Journeys. What about the customer Journey, how does it relate to Interactions? Interactions is the building block for presenting a Journey, which diverges from the assumption that an Interaction is time bound and has a determinable outcome. However, building on the fact that a Journey is an aggregation of many different Interactions, the Journey can be modeled based on a Customer, Product or other kind of Intent.

FIG. 18 includes a block diagram 1800 depicting an example of how a journey could be stitched to assemble a journey based on a specific user, Alice, and a block diagram 1820 depicting an example model of a journey based on a specific intent or product like a Toaster.

In example embodiments, to use the system, a developer must first create an Account. In example embodiments, services and usage get managed within the account.

In example embodiments, a User represents an individual who has access to resources within one or more accounts.

In example embodiments, a system User is a User who has access to the system's Application resources. A system User may be linked directly to and/or depend on a related unified User record.

In example embodiments, a customer (or end customer) includes people or a person who engages an entity (or business or user). For example, a customer may call their bank to speak to representatives, email their insurance company, or message with a ride-share service. Users are system Users or Systems that have been Authorized and Authenticated by the system.

In example embodiments, an Organization (e.g., an entity) provides for management of multiple Accounts.

In example embodiments, a system application is an instance of an entity's interactions and communications resources and contains one or more configurations related to the entity's particular instance of the system.

In example embodiments, an Interaction represents a customer contact.

It may be a single resource to orchestrate and/or a record for all the ongoing/past conversations over one or multiple channels between an entity's representative(s), system(s), and contact(s), and/or data needed to provide personalized and contextual customer engagement. In the context of a contact center, an interaction represents a contact center work item that needs to be processed by the contact center.

In example embodiments, a Participant is A User or System or Person that is a participant on a channel.

In example embodiments, a Channel represents an underlying media or system that is addressable through Unified Orchestration Protocol. A Channel may support a set of 0 or more Participants.

In example embodiments, an Invite is a Channel that is offered to Users. The User can then either Accept or Reject the Invite. In example embodiments, the System can Timeout an Invite but also once a User has Accepted an invite any associated Invites may be automatically be Rescinded by the System. The Invitation may be tied to the reserved capacity of a User.

In example embodiments, a Routing Request is an attempt to Reserve 1 or more Users to participate on a Channel. Routing Requests will try to make this match provided a TTL. Once the TTL expires then the Routing Request is no longer valid so that downstream systems can take appropriate actions. The outcome of reserving one or more Users may also be supported by downstream systems.

In example embodiments, a Meeting is an internal abstraction and encapsulation of a Channel.

In example embodiments, queues have two aspects of functionality one is for segmenting Routing Requests to Users, the other is for reporting purposes. A Routing Request may include Queues to provide a mapping to User(s) who can be reserved if a Routing Request targets the particular queue. In example embodiments, a Queue may be understood as a data structure that is semantically different from Queue noun. As a data type, it may provide random access; for example, RoutingRequests may be dynamically ordered and can be assigned in non-FIFO-LIFO order.

In example embodiments, Presence describes the ability to reserve a User. In example embodiments, only users that have sufficient Presence can be reserved.

Some features and advantages of Interactions are described below. Interactions provide support for new customer types. For example, some users may maintain long-term relationships with customers through a 'Book of Business' Interactions enable transformation of such customer data into customized, configurable, and manageable workflows, each of which may be associated with a different customer type, to allow better management of relationships based on customer type.

Interactions provide support for evolving customer engagement from ticket-based work to knowledge-based work. For example, some Interactions provide a more wholistic view of an end customer for addressing inbound calls to support inquiries about a product, a service, or a subject, rather than just focus on a particular ticket related to a customer issue that has been opened up in a ticketing system.

Interactions allows users to have a better focus on end customers. For example, Interactions can be configured to provide a single, consolidated view of all the end-customers touchpoints across business and system silos and throughout the lifecycle of the interaction.

Interactions provide support for better personalization with respect to the end customer. With a more complete picture of their end customers, entities can offer more personalized customer engagements by building a 360-degree view of customer context and allowing them to choose the right channel, user, and timing that suits this context best.

Interactions provide more visibility and better connectivity. For example, Interactions can be configured to optimize operations across an entity's department/organizational silos and accelerate development (e.g., by providing tools to collaborate on differentiated experiences).

Interactions provide better customer engagement over time. For example, entities may use Interactions to make asynchronous end-customer communication personal and quick to allow both the User and the end customer to resume communications within their context and history of contact and engagements.

Interactions simplify application development. For example, Interactions can be used by developers to build customer engagement capabilities into their application in a fast and flexible way (e.g., through a single framework that supports customer profiles, channels, and activities).

In example embodiments, an Interaction represents a customer contact. Interactions may comprise a single work record for some or all of the ongoing and past conversations over one or multiple channels between entity representative(s), system(s), and contact(s), and/or data needed to provide personalized and contextual customer engagement. Interactions enable developers to build structured, directed communication workflows with the capability to address reporting and audit needs. In example embodiments, in a contact center context, an Interaction may represent a contact center work item that needs to be processed by the contact center representative. The Interaction API and SDK provide developers with a single container to orchestrate contextual and data driven end-customer workflow on many channels simultaneously, as described in more detail herein.

An interaction may represent a customer engagement. In example embodiments, it maps to an end-customer. An end-customer can participate in one or more simultaneous interactions.

An interaction may be omnichannel. For example, Interactions support synchronous (e.g., voice, video) and asynchronous channels (e.g., chat, messaging, email) supported by a Communication platform.

An interaction supports custom channels. In example embodiments, this allows entities to route any piece of work in an organization while providing context and a holistic view of each touchpoint for a customer.

An interaction may be channel agnostic and/or it may be performed over 0 or more communication channels, including custom channels, and/or over a non-contiguous timeline.

Channels of an interaction may be agnostic to external, internal humans or systems as participants. At a given time, Interactions channels may have zero or more participants.

An interaction may get offered to one or many Users or Systems, and they may accept or decline the Interaction.

An interaction may have a state which includes active, inactive (similar state parked or snoozed), and closed. Once closed, Interaction cannot reactivate. It can be closed by humans or systems.

An interaction may have a well-defined start and end signal and duration with a disposition.

An interaction may include a container to log and retrieve real-time and historical conversations and events.

An interaction may serve as a source of truth for data required to derive metrics, calculate KPIs, and/or route the Interaction to the right available entity representative.

An interaction may get grouped in zero or more views. Views group interaction by attributes such as time, system state, and attached tags. Views are versioned and have a known refresh rate to support real-time and historical use cases.

An interaction may expose an interface for orchestrating customer engagement workflows such as routing, channel control operations such as hold, transfer, barge, whisper, and/or post-wrap-up actions, etc.

Figure 19:
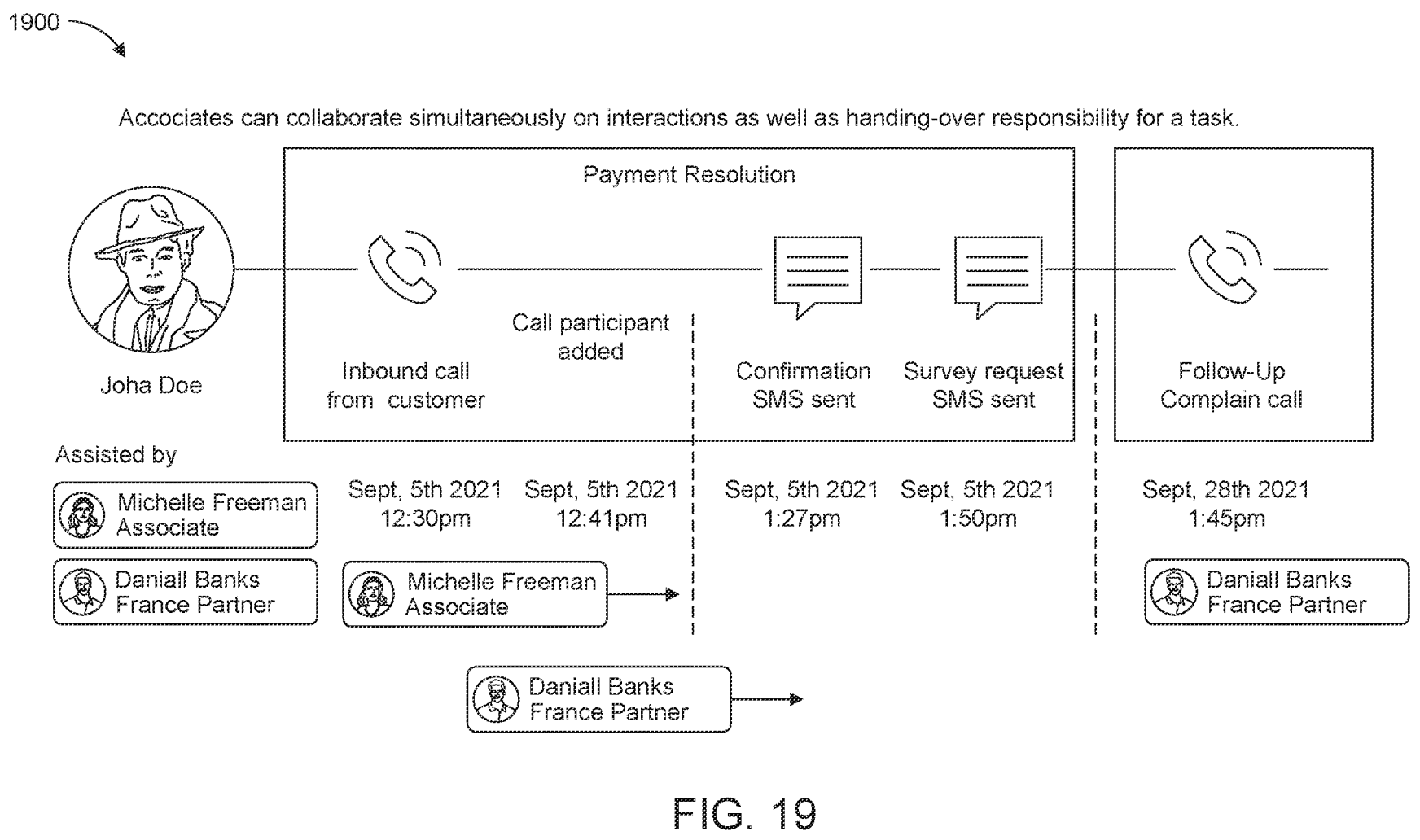

FIG. 19 is a block diagram illustrating an example visual representation 1900 of associates collaborating simultaneously on interactions.

Figure 20:
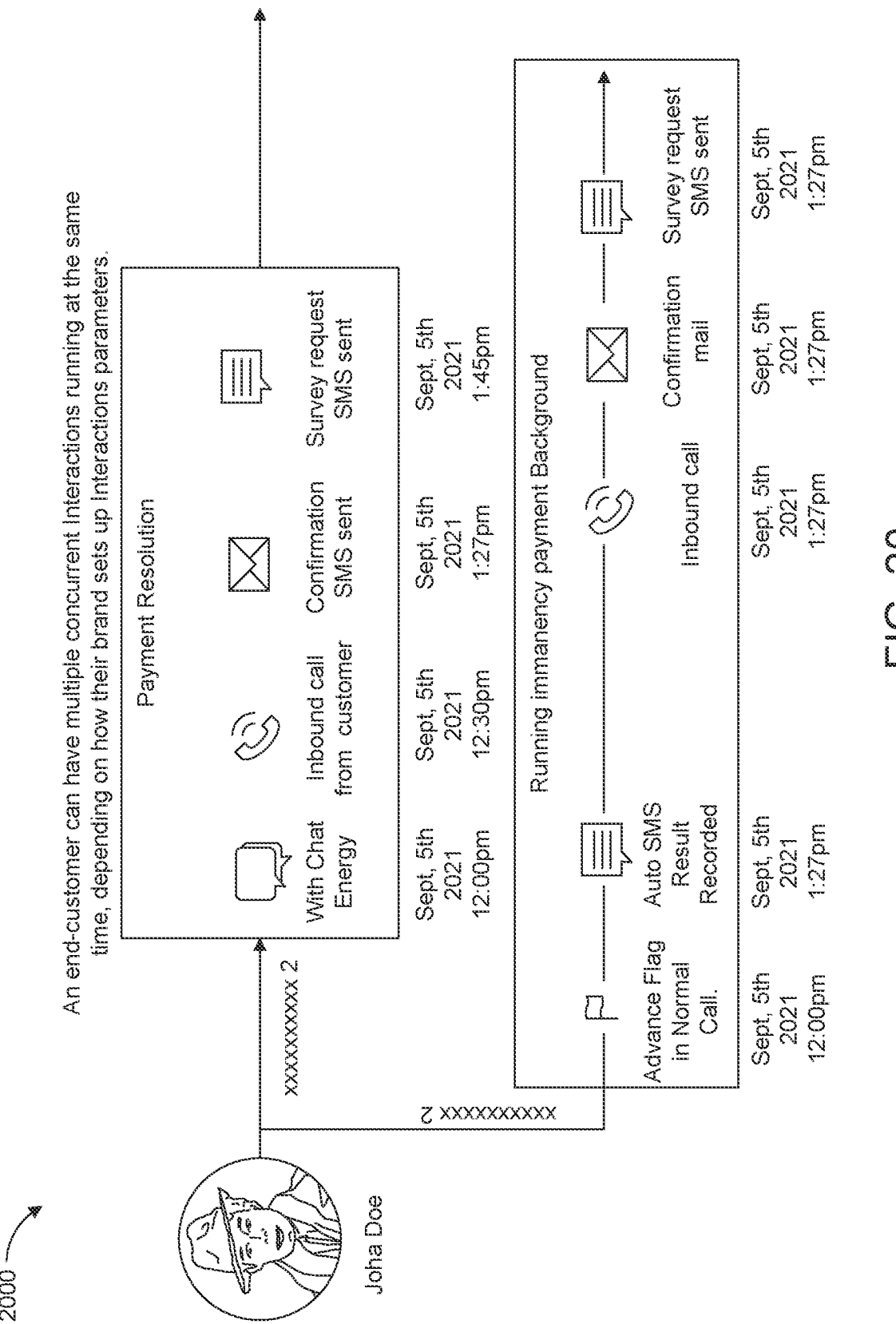
FIG. 20 is a block diagram illustrating an example visual representation of an end-customer having multiple concurrent interactions.

FIG. 20 is a block diagram illustrating an example visual representation 2000 of an end-customer having multiple concurrent interactions.

An interaction may include a resource to handle customer contact and/or a container for omnichannel conversations. In example embodiments, an interactions exposes an interface to manage Channels and Participants attached to a customer contact.

An interaction may have one or more states. These states may include any of the following states: Closed: The interaction is complete and no further activity will happen. A closed interaction cannot be reopened but additional context can be added to it. Inactive: The interaction becomes inactive if Activity pauses on it for some duration. A user or a system can put interaction in Inactive state. More activity can take place which will bring the interaction back to an active state. Active: The interaction is created in Active state.

FIG. 21 is a table depicting an example API 2100 for managing interactions. An interaction exposes an interface to manage Channels and Participants attached to a customer contact.

In example embodiments, interactions may be configured with Webhooks. Examples may include one or more of the following webhooks.

onPreCreateInteraction(Synchronous)—Triggered before the system makes an attempt to create a new Interaction for an inbound Channel. Users would check their database if an existing tuple of Customer and Intent already exists for an active Interaction.

onInteractionCreate(Synchronous)—Triggered before the Interaction has fully materialized. Allows for adding routing attributes or metadata to the Interaction. Or simply be used as a reporting endpoint.

onInteractionCreated(Asynchronous)—Triggered after the Interaction completed construction Should probably be fired once all the initial orchestration is completed as a tombstone marker for the completion.

onInteractionStatusUpdate(Synchronous)—Triggered before the Interaction status is updated, for example before an Interaction is deactivated. User code can block the deactivation through this callback.

onInteractionStatusUpdated(Asynchronous)—Triggered after the Interaction status has been updated.

In example embodiments, interactions may be associated with one or more events. Examples of such events may include one or more of the following events.

InteractionCreateRequest: Emitted on interaction request and before the interaction is materialized. Includes interaction request payload.

InteractionCreateResponse: Emitted after the interaction is materialized to a persistent store. Includes interaction response sent to the client.

InteractionUpdateRequest: Emitted on interaction POST request and before the interaction is materialized. Includes POST payload.

InteractionUpdatedResponse: Emitted after the interaction POST request is materialized to persistent store. Includes interaction response sent to the client and updated interaction object.

InteractionFetchRequest: Emitted on request to GET interactions is received and before the response is generated. Includes request payload.

InteractionFetchResponse: Emitted after request to GET interactions is processed. Includes response sent to the client.

FIG. 22 is a table depicting an example API 2200 for attributes (e.g., for attaching a custom context to an interaction). A client can create or update attributes, including customer or user-defined attributes, for active and inactive interactions. Interaction platform does not depend on this context and treats this as encrypted data.

In example embodiments, attributes may be configured with Webhooks, such as onInteractionAttributesUpdated (asynchronous): Triggered after an interaction attribute is added or updated. Webhook triggers after Attributes are saturated to persistent store.

Attributes may be associated with one or more events, such as any of the following events.

InteractionAttributesUpdateRequest: Emitted after request to update attributes is received and before it is materialized.

InteractionAttributesUpdateResponse: Emitted after response to update attributes is sent to the client and after the request is materialized.

InteractionAttributesFetchRequest: Emitted on request to GET interaction attributes is received and before the response is generated. Includes request payload.

InteractionAttributesFetchResponse: Emitted after request to GET interaction attributes is processed Includes the response sent to the client.

FIG. 23 is a table depicting an example API 2300 for channels. A channel may represent an underlying media or system that is addressable by the system through Unified Orchestration Protocol. Developers can use Channel resources to manage and orchestrate zero or more channels to interactions.

A channel may have one or more states. These states may include any of the following states:

Setup: The channel is being set up by a media plane, awaiting confirmation from media orchestrators.

Active. The channel is active and there is at least one participant connected to the channel. Voice: Hold, Ringing, Connecting Inactive: The channel is inactive and there are no participants on it. In example embodiments, the system may have a separate state to reflect a synchronous channel on which no message has been sent in a long time.

Closed: The channel is closed due to the channel being in "completed" "busy" "no answer", "not reachable" "failed" "cancelled"

A channel may be associated with one or more events, including one or more of the following events:

InteractionChannelCreateRequest: Emitted on request to create channels is received and before the channel is materialized. Includes request payload.

InteractionChannelCreateResponse: Emitted after the request to create channel materialized to persistent store. Includes the response sent to the client.

InteractionChannelUpdateRequest: Emitted after request to update channel is received and before it is materialized.

InteractionChannelUpdateResponse: Emitted after response to update channel is sent to the client and after the request is materialized.

InteractionChannelDeleteRequest: Emitted after request to DELETE channel is received and before it is materialized.

InteractionChannelDeleteResponse: Emitted after response to DELETE channel is sent to the client and after the request is materialized.

InteractionChannelsFetchRequest: Emitted on request to GET interaction channel is received and before the response is generated. Includes request payload.

InteractionChannelsFetchResponse: Emitted after request to GET interaction channel is processed. Includes responses sent to the client.

FIG. 24 is a table depicting an example API 2300 for participants. A participant may be used to manage and orchestrate user(s), contact(s), or system(s) that are added to a channel.

A participant may have one or more states. These states may include any of the following states:

Setup: The state to represent that participant is being added to the channel and awaiting confirmation from the media orchestrator.

Joined: The state to represent that participant has joined the channel.

Let: The state to represent that participant has let the channel.

Failed: The state to represent failure to add participants to the channel.

In example embodiments, participants may be configured with Webhooks Examples may include one or more of the following webhooks:

onPreCreateParticipant(Synchronous)—Triggered before a participant is created, supplied data from this webhook is coordinates used for the participant; this would allow for coalescing of participant_sids across channels onParticipantJoin(Synchronous)—Triggered before a participant is added to the Channel.

onParticipantJoined(Asynchronous)—Triggered after a Participant has been added to the Channel onParticipantLeave(Synchronous)—Triggered before a Participant is leaving the Channel onParticipantLeft(Asynchronous)—Triggered after a Participant has left to the Channel onParticipantStatusUpdated(Asynchronous)—Triggered after a Participant status has been updated onParticipantUpdate(Synchronous)—Triggered before an update is applied to the participant.

onParticipantUpdated(Asynchronous)—Triggered after an update is applied to the participant.

onParticipantDelete(Synchronous)—Triggered before a delete is applied to the participant.

onParticipantDeleted(Asynchronous)—Triggered after an delete is applied to the participant.

A participant may be associated with one or more events, including one or more of the following events:

InteractionParticipantCreateRequest: Emitted on request to create participant is received and before the participant is materialized. Includes request payload.

InteractionParticipantCreateResponse: Emitted after the request to create participant materialized to persistent store. Includes responses sent to the client.

InteractionParticipantipdateRequest: Emitted after request to update participant is received and before it is materialized.

InteractionParticipantUpdateResponse: Emitted after response to update participant is sent to the client and after the request is materialized.

InteractionParticipantDeleteRequest: Emitted after request to remove participant is received and before it is materialized.

InteractionParticipantDeleteResponse: Emitted after response to remove participant is sent to the client and after the request is materialized.

InteractionParticipantsFetchRequest: Emitted on request to GET participant is received and before the response is generated Includes request payload.

InteractionParticipantsFetchResponse: Emitted after request to GET participant is processed. Includes responses sent to the client.

FIG. 25 is a table depicting an example API 2300 for invites. An invite may offer an interaction and/or channel tuple to a user. The invitations may be tied to the capacity of the users. Note: One can use the add participant operation to add users that are not capacity constrained.

An invite may have one or more states. These states may include any of the following states:

Offered: The state to represent that invite was offered to a user. Each invite starts in this state.

Accepted: The state to represent that invite was accepted by the user.

Declined: The state to represent that invite was declined by the user.

Rescinded: The state to represent that invite was rescinded by the system. Once cancelled, invitations can't be accepted, declined, or timeout.

Timedout: The state to represent that invite met timeout. Once timed out, invitations can't be accepted or declined or canceled.

Failed: The state to represent failure to send invites to the user. Once failed an invitation can't be accepted or declined or canceled or timeout.

In example embodiments, invites may be configured with Webhooks Examples may include one or more of the following webhooks.

onInviteOffer(synchronous)—Triggered before an invite is materialized.

onInviteOffered(asynchronous)—Triggered after an invite is materialized.

onInviteStatusUpdated(asynchronous)—Triggered after status of an invite is updated and materialized.

A participant may be associated with one or more events, including one or more of the following events:

InteractionInviteCreateRequest: Emitted on request to create invite is received and before the invite is materialized. Includes request payload.

IneractionInviteCreateResponse: Emitted after the request to create an invite materialized to a persistent store. Includes responses sent to the client.

InteractionInviteUpdateRequest: Emitted after request to update an invite is received and before it is materialized.

InteractioninviteUpdateResponse: Emitted after response to update invite is sent to the client and after the request is materialized.

InteractioninviteTimeout: Emitted after the invite lease expires aka TTL expired.

InteractionInviteFailure: Emitted after the invite has failed to be offered to the user.

InteractionInviteFetchRequest: Emitted on request to GET invites is received and before the response is generated. Includes request payload.

InteractionInviteFetchResponse: Emitted after request to GET invites is processed. Includes responses sent to the client.

FIG. 26 is a table depicting an example API 2600 for users. A user may be used to control Users of the system. The User resource contains information about the User such that Interactions can be routed.

In example embodiments, users may be configured with Webhooks. Examples may include one or more of the following webhooks:

onUserCreated(asynchronous)—Triggered once new user has been created onUserUpdated(asynchronous)—Triggered once new user has been updated A user may be associated with one or more events, including one or more of the following events:

UserCreateRequest: Emitted on request to create User is received and before the user is materialized. Includes request payload.

UserCreateResponse: Emitted after the request to create an user materialized to a persistent store. Includes responses sent to the client.

UserUpdateRequest: Emitted on request to update User is received and before the user is mutated. Includes request payload.

UserUpdateResponse: Emitted after the request to update an user mutated to a persistent store. Includes responses sent to the client.

UserFetchRequest: Emitted on request to GET users is received and before the response is generated. Includes request payload.

UserFetchResponse: Emitted after request to GET users is processed. Includes responses sent to the client.

UserDeleteRequest: Emitted on request to DELETE user is received and before the response is generated. Includes request payload.

UserDeleteResponse: Emitted after request to DELETE user is processed. Includes responses sent to the client.

FIG. 27 is a table depicting an example API 2700 for routing attributes. Routing attributes represent a schematized data payload describing how a User can be routed to, i.e., skills and other routable attributes.

In example embodiments, routing attributes may be configured with Webhooks. Examples may include one or more of the following webhooks:

onUserRoutingAttributesCreated(asynchronous)—Triggered when the User attributes first are created.

ontiserRoutingAttributesUpdated(asynchronous)—Triggered when attributes are mutated.

onUserRoutingAttributesUpdated(asynchronous)—Triggered when attributes are deleted.

Routing attributes may be associated with one or more events, including one or more of the following events:

UserRoutingAttributesCreateRequest: Emitted on request to create User attributes is received and before the user attributes is materialized. Includes request payload.

UserRoutingAttributesCreateResponse: Emitted after the request to create user attributes materialized to a persistent store. Includes responses sent to the client.

UserRoutingAttributesUpdateRequest: Emitted on request to update User is received and before the user attributes has been mutated. Includes request payload.

UserRoutingAttributesUpdateResponse: Emitted after the request to update user attributes mutated to a persistent store Includes responses sent to the client.

UserRoutingAttributesFetchRequest: Emitted on request to GET users attributes is received and before the response is generated. Includes request payload.

UserRoutingAttributesFetchResponse: Emitted after request to GET users attributes is processed. Includes responses sent to the client.

UserRoutingAttributesDeleteRequest: Emitted on request to DELETE user attributes is received and before the response is generated Includes request payload.

UserRoutingAttributesDeleteResponse: Emitted after request to DELETE user attributes is processed. Includes responses sent to the client.

FIG. 28 is a table depicting an example API 2800 for presence. A participant may be used to manage and orchestrate user(s), contact(s), or system(s) that are added to a channel. Presence may be used to define a custom status for agents. As Interactions supports omni channel communication channels presence is not binary. A user can be present on (Chat but not present for voice.

In example embodiments, presence may be configured with Webhooks. Examples may include one or more of the following webhooks:

onUserPresenceUpdate(synchronous)—Triggered before a new revision of user presence is materialized.

onUserPresenceUpdated(asynchronous)—Triggered after a new revision of user presence is materialized.

Presence may be associated with one or more events, including one or more of the following events:

UserPresenceUpdateRequest—Emitted on request to update user presence is received.

UserPresenceUpdateResponse—Emitted after response to update user presence is generated i.e. a new revision of users presence is materialized.

UserPresenceGetRequest—Emitted on request to get user presence is received.

UserPresenceGetResponse—Emitted after a response to get user presence is generated.

UserPresenceHistoryRequest—Emitted on request to get history of user presences is received and before a response is sent.

UserPresenceHistoryResponse—Emitted after response to get history of user presences is generated.

FIG. 29 is a table depicting an example API 2900 for queues. A queue may provide a mapping to User(s) who can be reserved if a Routing Request targets the particular queue.

A queue may have one or more states. These states may include any of the following states:

Active. The state to represent that queue is active and receiving routing requests A queue starts in this state.

Draining. The state to represent that queue is not taking any new routing requests but may have some inflight requests.

Inactive. The state to represent that queue is not-active, not receiving routing requests nor does it has any inflight requests.

In example embodiments, queues may be configured with Webhooks Examples may include one or more of the following webhooks.

onQueuesCreated(asynchronous)—Triggered when a new queue is created and gets materialized.

onQueuesUpdated(asynchronous)—Triggered when a queue is updated and gets materialized.

ontUserQueuesUpdate(synchronous)—Triggered before an update to users queue gets materialized.

onUserQueuesUpdated(asynchronous)—Triggered after an update to users queue is materialized.

onQueuesDrain(synchronous)—Triggered before a request to drain the queue is processed.

A queue may be associated with one or more events, including one or more of the following events:

QueueCreateRequest—Emitted on request to create queue is received and before the queue is materialized. Includes request payload.

QueueCreateResponse—Emitted after the request to create a queue materialized to a persistent store. Includes responses sent to the client.

QueueUpdateRequest—Emitted on request to update queue is received and before the update is materialized. Includes request payload.

QueueUpdateResponse—Emitted after the request to update a queue materialized to a persistent store. Includes responses sent to the client.

QueueGetRequest—Emitted on request to get queue is received and before the response is materialized. Includes request payload.

QueueGetResponse—Emitted after the response to get a queue is sent. Includes responses sent to the client.

QueueUsersFetchRequest—Emitted on request to get users participating in queues is received and before the response is materialized. Includes request payload.

QueueUsersFetchResponse—Emitted after the response to get users participating in a queue is sent. Includes responses sent to the client.

QueuesFetchRequest—Emitted on request to fetch a queues list and before the response is materialized. Includes request payload.

QueuesFetchResponse—Emitted after the response to fetch list of a queues is sent. Includes responses sent to the client.

UserQueueUpdateRequest—Emitted on request to update a user's queue. Includes request payload.

UserQueueUpdateResponse—Emitted after a request to update a user's queue is processed. Includes response payload.

FIG. 30 is a table depicting an example API 3000 for workflows. The workflow resource governs how end-customers experience contact centers. It allows entities to customize contact centers workflows and serves as the point of entry and the first line of communication with customers initiating contact. A workflow controls the flow of interaction, invokes Interactions API, routes to the appropriate agent, emits real-time events, accesses data from 3rd party systems and records interaction activity. A contact center is shipped with a few basic workflows which users can edit or create a completely new one. For example a basic workflow is responsible for creating an interaction, routing to an agent until the invite gets accepted.

A workflow may be associated with one or more events, including one or more of the following events:

WorkflowsCreateRequest—Emitted on request to create workflow is received and before the workflow is materialized. Includes request payload.

WorkflowsCreateResponse—Emitted after the request to create a workflow is materialized to a persistent store. Includes responses sent to the client.

WorkflowsRevisionRequest—Emitted on request to update workflow is received and before the workflow revision is materialized. Includes request payload.

WorkflowsRevisionResponse—Emitted after the request to update a workflow is materialized as a new revision to a persistent store. Includes responses sent to the client.

WorkflowsFetchRequest: Emitted on request to GET workflows is received and before the response is generated Includes request payload.

WorkflowsFetchResponse: Emitted after request to GET workflows is processed. Includes responses sent to the client.

WorkflowsRevisionFetchRequest: Emitted on request to GET workflows revision is received and before the response is generated Includes request payload.

WorkflowsRevisionFetchResponse: Emitted after request to GET workflow revision is processed. Includes responses sent to the client.

WorkflowsDeleteRequest: Emitted on request to delete workflow is received and before request is processed. Included delete payload.

WorkflowDeleteResponse: Emitted on request to delete workflow is processed and materialized. Includes response body.

FIG. 31 is a table depicting an example API 3100 for workflow executions. A workflow execution represents a customer contact through a Workflow.

A workflow execution may have one or more states. These states may include any of the following states:

Active: The state to represent that execution is currently active.

Ended: The state to represent that execution was ended.

Finished: The state to represent that execution completed.

A workflow may be associated with one or more events, including one or more of the following events:

WorkflowsExecutionsCreateRequest—Emitted on request to create execution is received and before the execution is materialized. Includes request payload.

WorkflowsExecutionsCreateResponse—Emitted after the request to create an execution is materialized to a persistent store. Includes responses sent to the client.

WorkflowsExecutionsUpdateRequest—Emitted on request to update execution is received and before it is materialized. Includes request payload.

WorkflowsExecutionsUpdateResponse—Emitted after the request to update an execution is materialized to a persistent store. Includes responses sent to the client.

WorkflowsExecutionsFetchRequest: Emitted on request to GET executions is received and before the response is generated. Includes request payload.

WorkflowsExecutionsFetchResponse: Emitted after request to GET execution is processed Includes responses sent to the client.

WorkflowsExecutionDeleteRequest: Emitted on request to delete execution is received and before request is processed. Included delete payload.

WorkflowExecutionDeleteResponse: Emitted on request to delete execution is processed and materialized. Includes response body.

Figure 32:
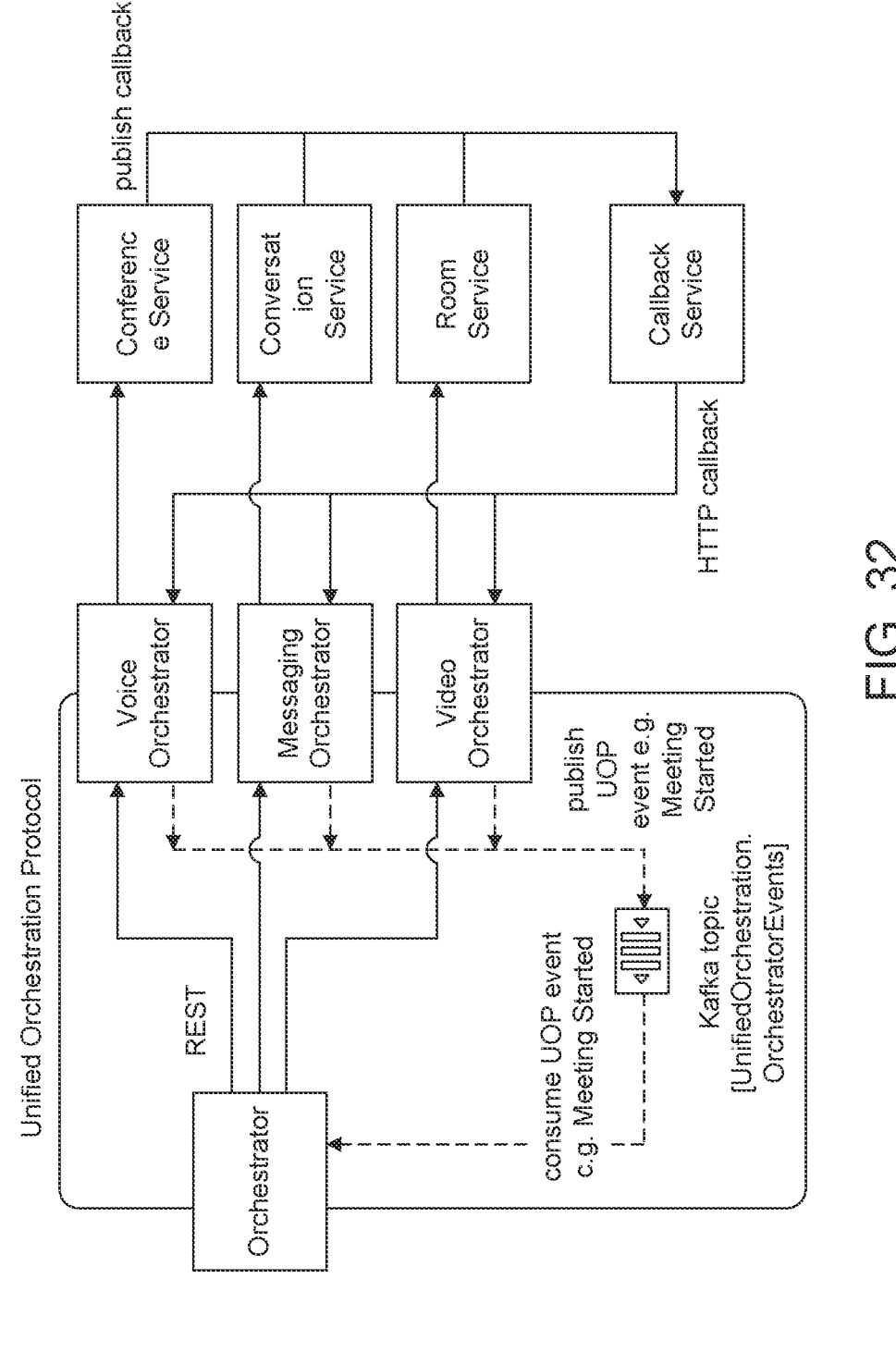
FIG. 32 is a block diagram illustrating an example usage of the UOP in a conference service context.

FIG. 32 is a block diagram illustrating an example usage of the UOP in a conference service context.

In example embodiments, a Unified Routing Request Interface (URRI) is provided. URRI defines a general purpose interface to match an interaction to users. It is composed of three sets of interfaces: (1) Routing API—synchronous API for creating, cancelling, and getting Routing Requests; (2) Routing Events—asynchronous event Routing publishes on completing a Routing Request (successfully or not); (3) User Events—asynchronous events Routing consumes for keeping track of User state.

Figure 33:
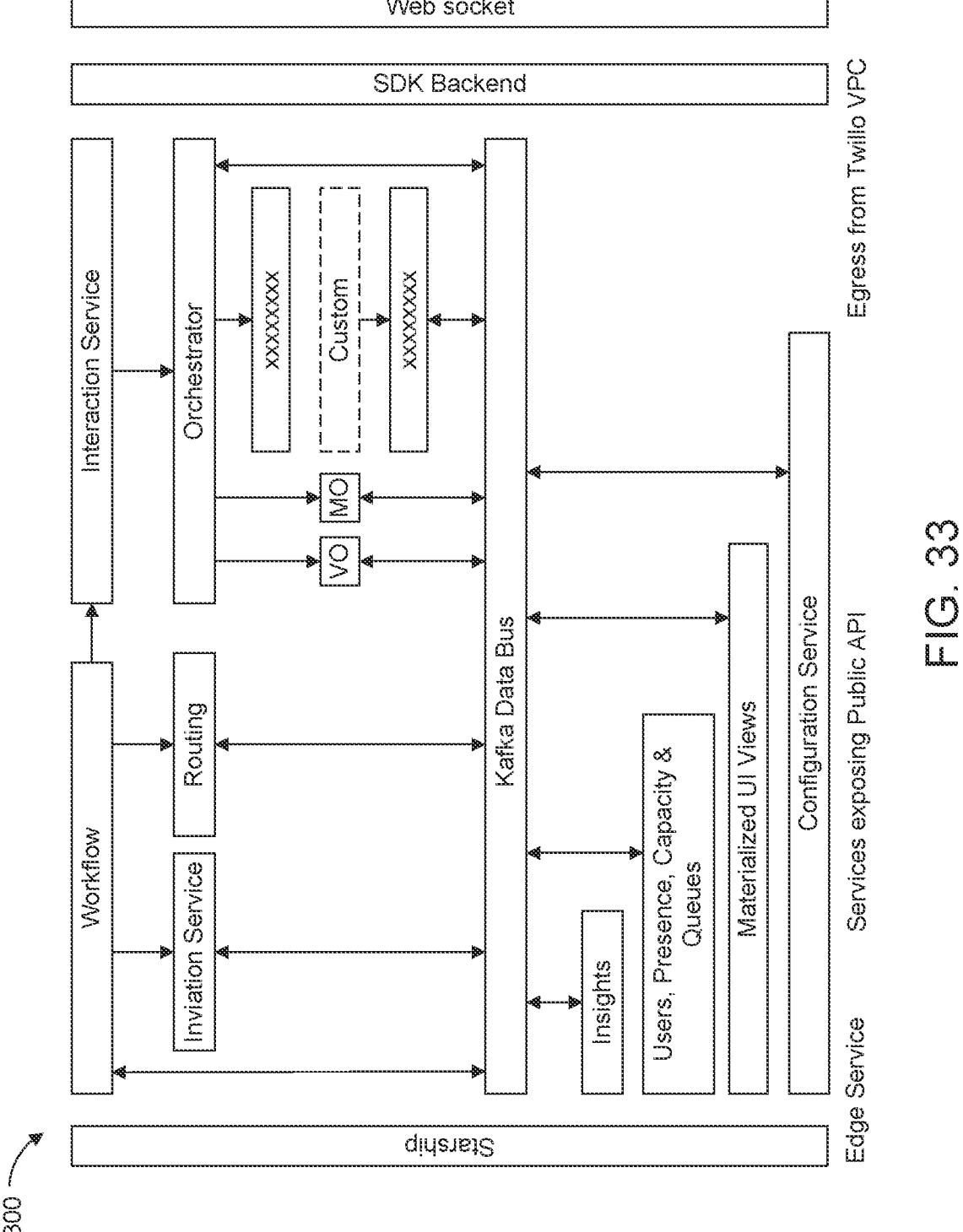
FIG. 33 is a block diagram depicting an example system architecture.

FIG. 33 is a block diagram depicting an example system architecture.

An Orchestrator (FO) manages a Media Control Plane for the system by invoking unified orchestrator protocol, is Stateless, and/or manages system relevant details about media channels.

A Router is a source of truth for Routing Requests. It receives requests to route interactions via a unified routing request interface; manage the state of Routing Request and provides updates; and/or manages a route optimized view of Users (activity, capacity & capability) by consuming User Configuration Updates and User Activity events.

A Workflow is a source of truth for Structured Workflow Definitions, Workflow Executions, and/or a Workflow Execution State Machine. It maps Interactions with a workflow. If configured to do so, it finds an optimal match (of a user) to handle interactions by creating a routing Request; reserves Capacity via User Update commands, offers interactions to a User via Invitation Service: and/or adds Participants to Channel via Interaction Service.

An Interaction Service manages an Interactions Control Plane. It is a source of truth for Interaction, Channel, Participant Resources. It is stateful and saturates state in persistent storages. It receives media operations via a Channel and Participant Resource and delegates them to the FO.

An Invitation Service is a source of truth for Invite Resources and manages its state machines. It dispatches invites to Flex Users via an SDK backend. It releases User Capacity.

Users Service is a source of truth for Flex Users, Queues, Capacity. and/or Presence. It is stateful and saturates state in persistent storages. It accepts command to reserve user capacity and provides updates on user activity.

Materialized Data Views are a source of truth for data views shown on UI. They may aggregate events to generate versioned data views to support personas such as Agent, Admin, Supervisors, etc. These views may include an interaction timeline view, an interaction history view, supervisor view, and/or an admin view.

A Configuration Service is a source of truth for system Resources, including account level configurations.

Figure 34:
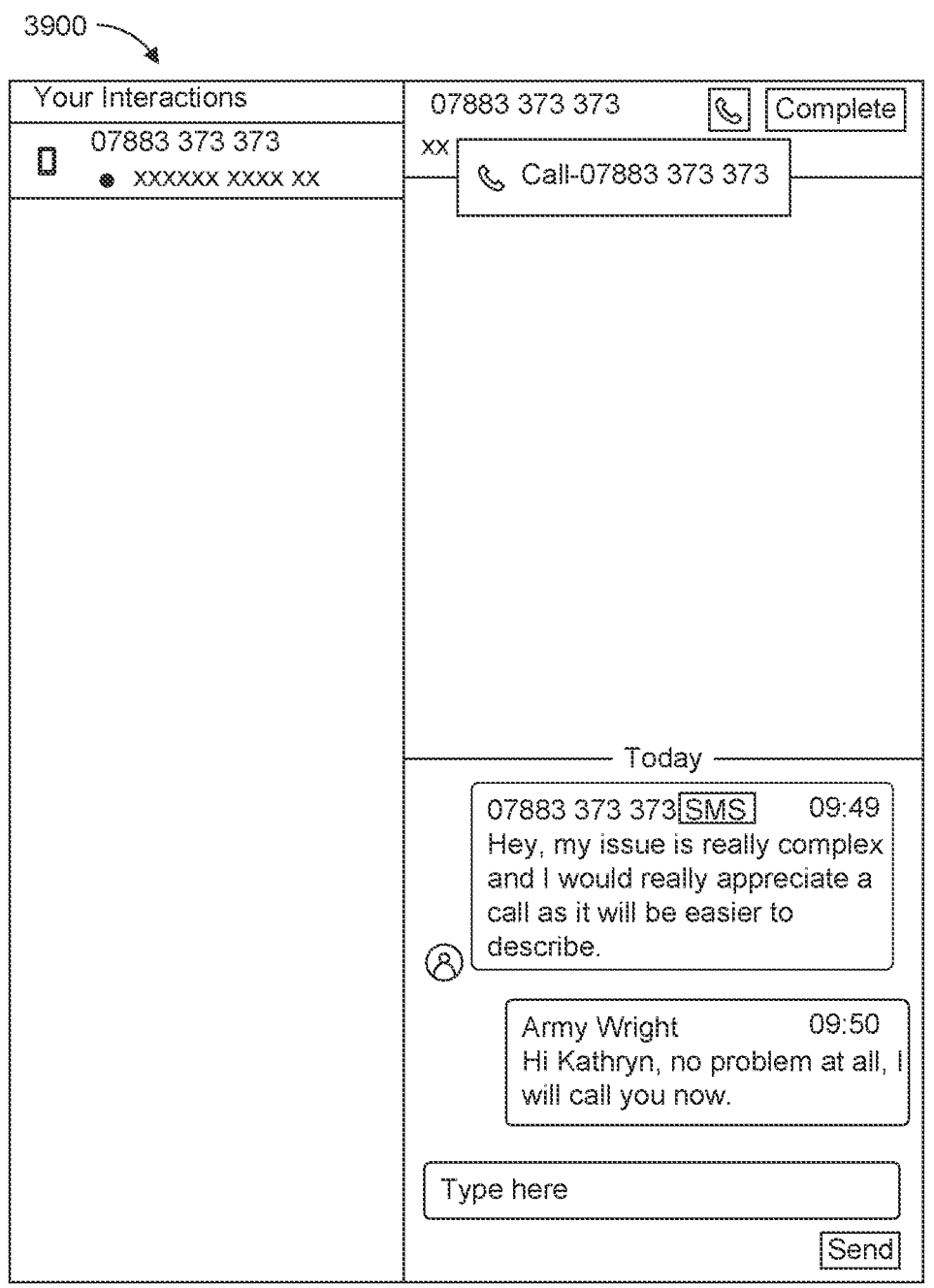
FIG. 34 is a block depicting an example screen of a user interface of a sample application that invokes functions of the system's SDK.

FIG. 34 is a block depicting an example screen of a user interface 3400 of a sample application that invokes functions of the system's SDK. In this screen, the time indicates how long since the invite was created. The number is the customer's phone number. The icon represents an SMS channel. This may derived from an invite attribute that indicates the type of this channel as SMS.

The reject button is disabled. The accept button shall invoke the accept inbound interaction handler through the SDK.

When waiting for the accept to complete, the UI shows a progress spinner until either accept was successful or not.

If the invitation is rescinded at any time for any reason, the channel may be removed immediately and nothing will be shown to the user.

The user interface includes a communication canvas where an agent an communicate with an end customer via text and voice.

1. When a user hangs up a voice call, the close voice channel interaction handler is invoked.
2. The UI shall receive an update indicating that the voice channel was closed
3. When the user clicks the "Complete" button, the close messaging channel interaction flow is invoked
4. The UI shall receive an update indicating that the messaging channel was closed
5. Once the last channel is closed, the associated interaction is removed from the view via a state change from its connection to FDV and may not happen immediately (but within seconds as the upper bound.

6. Complete button should be disabled when the user is on an active call

7. The agent's name "Amy Wright" is obtained from the User object.

Here, the phone number used to place the voice call is the same number as the one the system received the SMS from.

Figure 35:
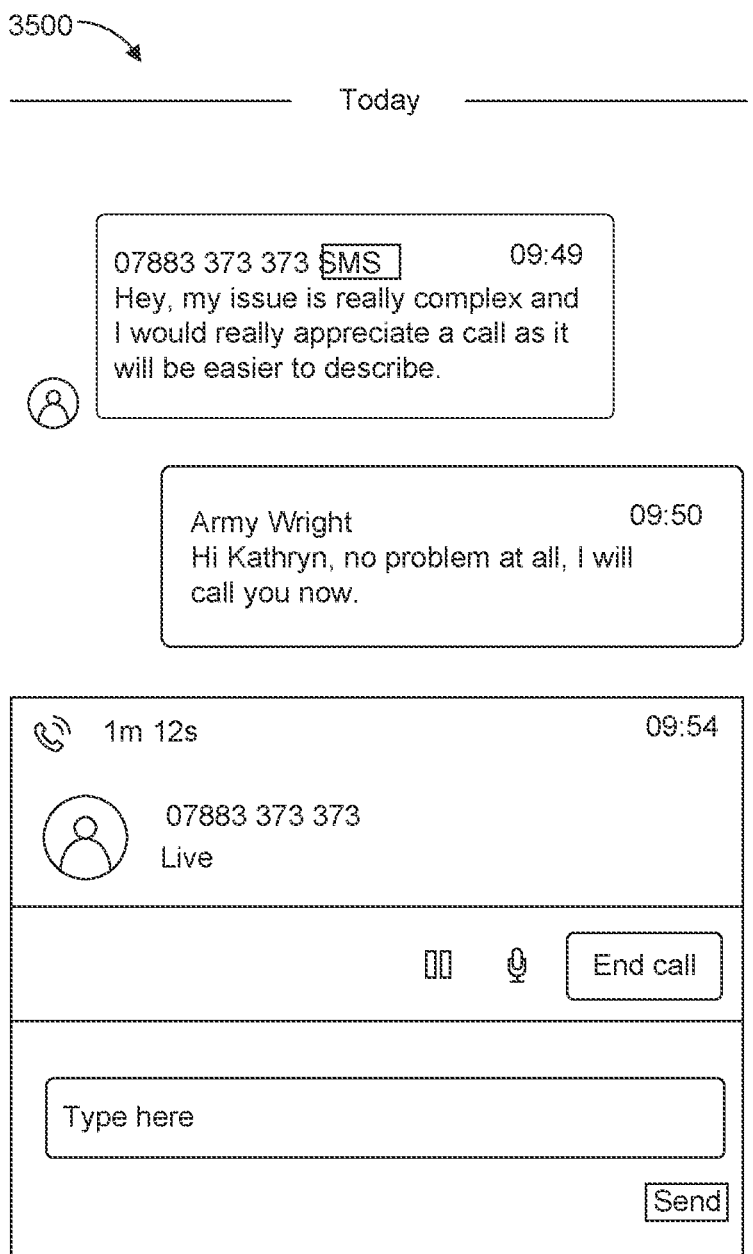
FIG. 35 is a block depicting an example screen of a user interface of a sample application that invokes functions of the system's SDK.

FIG. 35 is a block depicting an example screen of a user interface 3500 of a sample application that invokes functions of the system's SDK. Here, the End customer and User can communicate via text during and after the voice call.

In the outbound calling screen:

"Live" is based off the agent ParticipantAdded event.

The duration is the time since the customer was added.

The timestamp indicates when the call was started as per the channel created timestamp.

The In-call bubble will scroll as more messages are sent/received. Better handling of this planned beyond the pilot.

Figure 36:
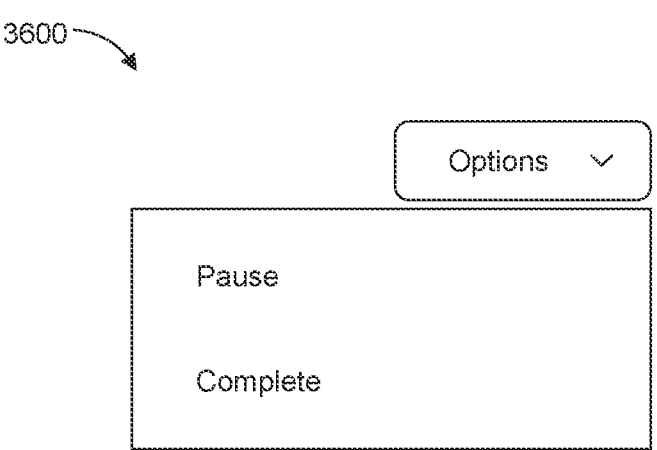
FIG. 36 is a block depicting an example screen of a user interface of a sample application that invokes functions of the system's SDK.

FIG. 36 is a block depicting an example screen of a user interface 3600 of a sample application that invokes functions of the system's SDK. Here, the user can complete or pause or complete a channel associated with an interaction.

Agent/User has an option dropdown that will have two options (Complete and Pause).

Complete:

1. When the user clicks the "Complete" button, the close messaging channel interaction flow is invoked 2. The UI shall receive an update indicating that the messaging Interaction channel was closed 3. Once the last channel is closed, the associated interaction is removed from the view Pause:

1. When the user clicks on Pause option, the user is removed from the channel and the system gives back capacity.

2. The channel's state is set to Inactive.

3. Once the user pauses a channel, if the interaction only has one channel, it is removed from the communication canvas view.

4. Refer to the API Section for details on the API

5. When a user/agent pauses an interaction because the end customer hasn't responded and when the end-customer responds after some time, the channel's state is set to Active and the interaction will follow the same routing behavior for a new interaction. Support for Pilot where the interaction will be routed to the same agent who paused the channel is out of scope.

6. When a user/agent is on a voice call, the Options button is grayed and the agent cannot click on pause or complete.

Routing Features (P0)

A sample application implemented with the system's SDK may operate with the following principles and assumptions:

Capacity: Users may not be able to customize/configure capacity.

Consuming capacity: when an interaction is accepted by a user, that interaction will consume the full capacity. For the pilot, this means the user can be on one interaction at a time.

Releasing capacity: when the user closes all the channels of the interaction, the user's capacity will be released.

Users are sorted by the longest idle time, from longest to shortest. Longest idle time, the time since the last channel they were removed from the channel or since the agent logged in, whichever is shorter.

Interactions that need to be routed are ordered by age of the interaction.

A routing request has a hardcoded timeout of 10 mins

A routing request has a hardcoded priority of one (1)

The available routing attributes must match the predefined User routing attributes configured on the user see Example User Routing Attributes.

Routing requests that utilize proficiency will execute as 'greater or equal', meaning that for a user to match they may need to have the same or higher value proficiency for the routing attribute in question. In example embodiments, the relationship between the proficiency associated with an interaction and the proficiency required of an agent to handle the interaction may be specified as a parameter of an event handler for managing the routing request (e.g., see FIG. 37).

FIG. 37 is a table showing example routing attributes 3700 that a developer may pass to the interactions handlers from a sample application. The Routing Request may identify the best matching system User to handle the Interaction.

Figure 38:
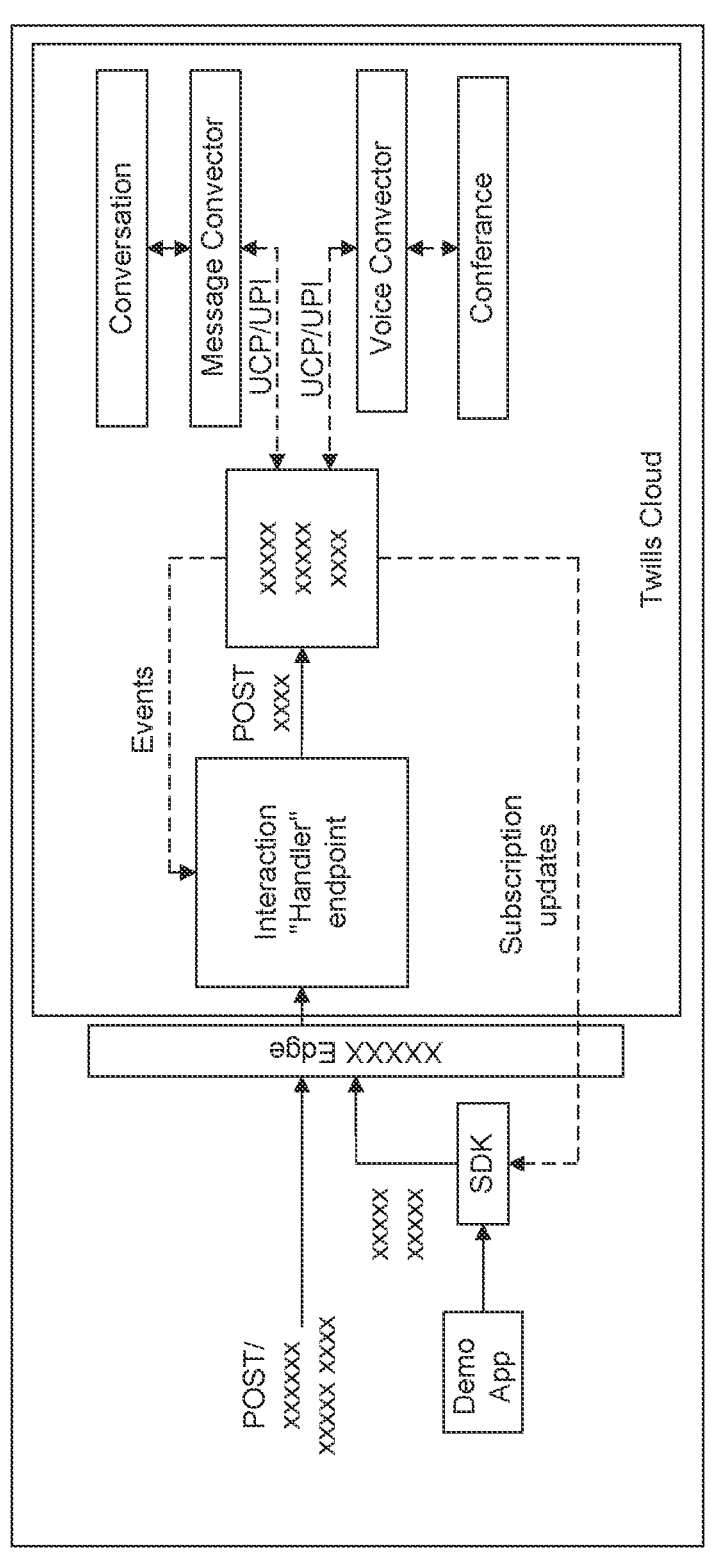
FIG. 38 is a block diagram depicting a high-level view of an example orchestration endpoint.

FIG. 38 is a block diagram depicting a high-level view of an example orchestration endpoint. In example embodiments, the system includes a set of out-of-the-box invokable orchestrations to demonstrate how to compose real world contact workflows to handle customer interactions. These orchestrations may use one or more of the Interactions, User, Routing, and Invites APIs, and events, to perform the desired operations for an account. These orchestrations may later be replaced by Workflows (also referred to herein as "Flows").

The system may discover patterns in how to string API calls together, how to handle and report errors and exceptions, and how to propagate and pass the context needed to invoke all the operations based on analysis of the system's SDK usage by one or more users.

At a high level, an orchestration can be thought of as a function or endpoint that performs the necessary logic to accomplish a goal such as connecting a customer to a representative.

The following summarizes the orchestrations that may be provided:

Handle inbound messaging contact—When a customer messages the entity, this orchestration will always create a new Interaction and perform everything needed to invite a system User. This orchestration completes when a user is invited. In example embodiments, this orchestration will handle a reject from users and until a user accepts.

Accept Invite to an Interaction channel—This orchestration will be invoked when a user accepts a channel invite. Its job is to add the user and ensure capacity is allocated.

Initiate an outbound call—When a user wishes to place an outbound call, the system can use this orchestration to do so. If failed, the failure code will be included to indicate the nature of the failure. For example, invalid number, not allowed country, busy, or no answer (timeout). This orchestration only supports placing calls within a existing interactions.

User or Customer Hangups call/Close voice channel—a sequence that hangs up the ongoing call between user and customer. In example embodiments, the system may use the same sequence regardless of who hung up the call.

Close messaging Channel—When a user is done with a messaging, this orchestration may be invoked to close the channel.

Reject Invite to an Interaction channel—This orchestration will be invoked while the inbound orchestrator is still executing. This should trigger the inbound orchestrator to invite the next user in its matched list User pauses an Interaction Messaging Channel. A user may need to pause an interaction because they are blocked from completing it. This allows the user's capacity to be relinquished End Customer triggers an unpause on an Interaction Channel User unpauses an Interaction Channel Wrap-up—With this orchestration, the system may be configured to achieve wrap-up or after call work.

Figure 39:
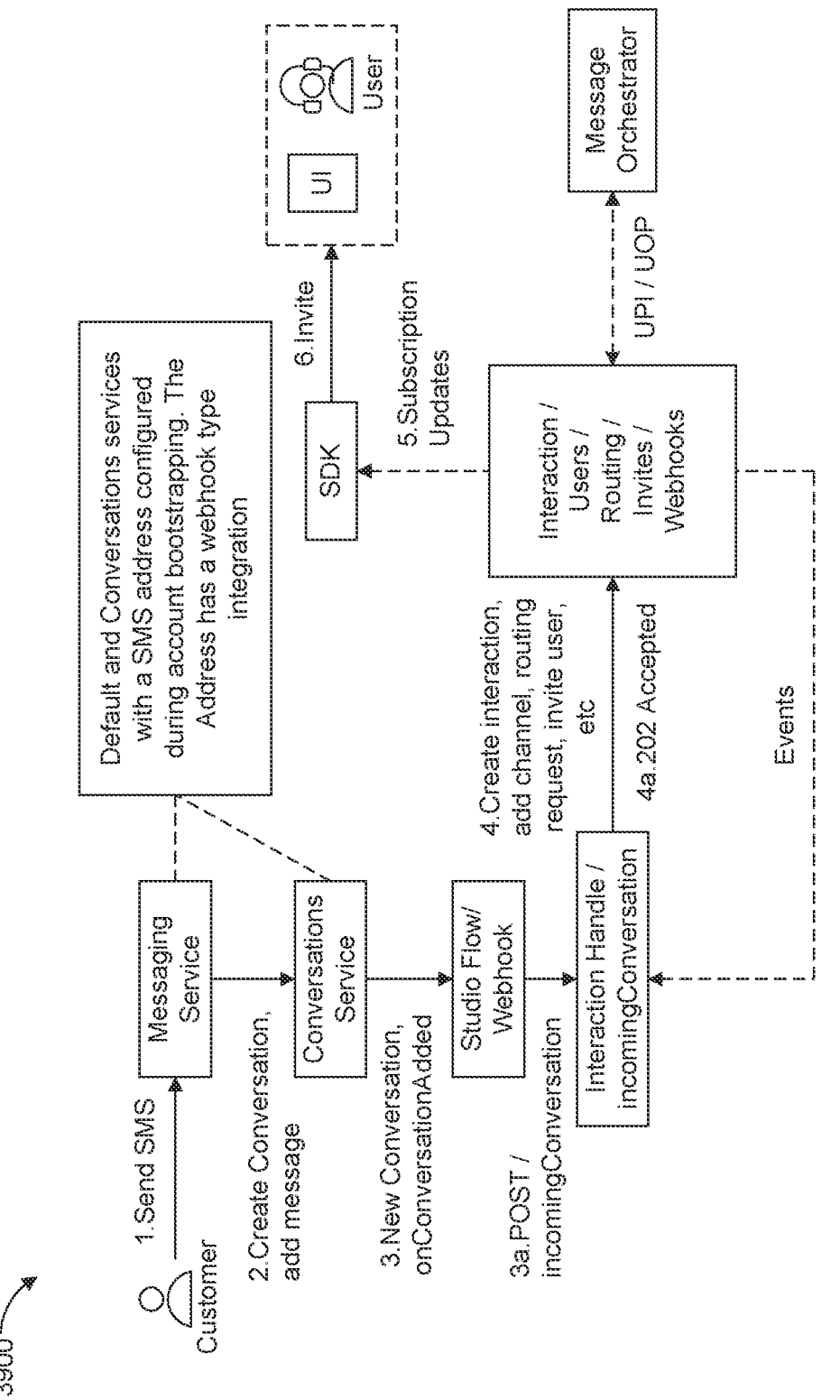
FIG. 39 is a block diagram depicting an example orchestration for handling an inbound messaging contact.

FIG. 39 is a block diagram depicting an example orchestration 3900 for handling an inbound messaging contact.

In example embodiments, this orchestration can be configured to handle inbound SMS engagements. The job of this orchestrator is: to connect a customer that is contacting the entity over SMS to a suitable logged in User. It may try several users (sequentially) until one of them successfully accepts the invite. An accept is successful when the agent is added to the channel. It may generate routing request for more than one user (parallel routing). This handler may also handle when a user rejects the invite by sending an invite to the next available user.

1. A customer sends an SMS to the entity (e.g., business) number
2. Messaging service creates a new Conversation and sets it up as per the configured Address. In this case, it's a webhook to our/incomingConversation endpoint
3. Invoking the orchestrator
A. Conversation service will invoke the configured Studio Flow
B. The studio flow will now invoke/IncomingConversation endpoint and pass all the necessary parameters to perform the orchestration
4. (Steps 4-6)/IncomingConversations is responsible for orchestrating this inbound contact, it will
A. Create a new interaction. In example embodiments, the system will create a new interaction on new contact.
B. Set up the channel with the Conversation SID and customer participant
C. Request a user which will be invited to this channel
D. Invite the user (Step 5)

The orchestrator will receive events that relate to the various operations it invokes. It needs to process these events to determine when the orchestration is complete.

Figure 40:
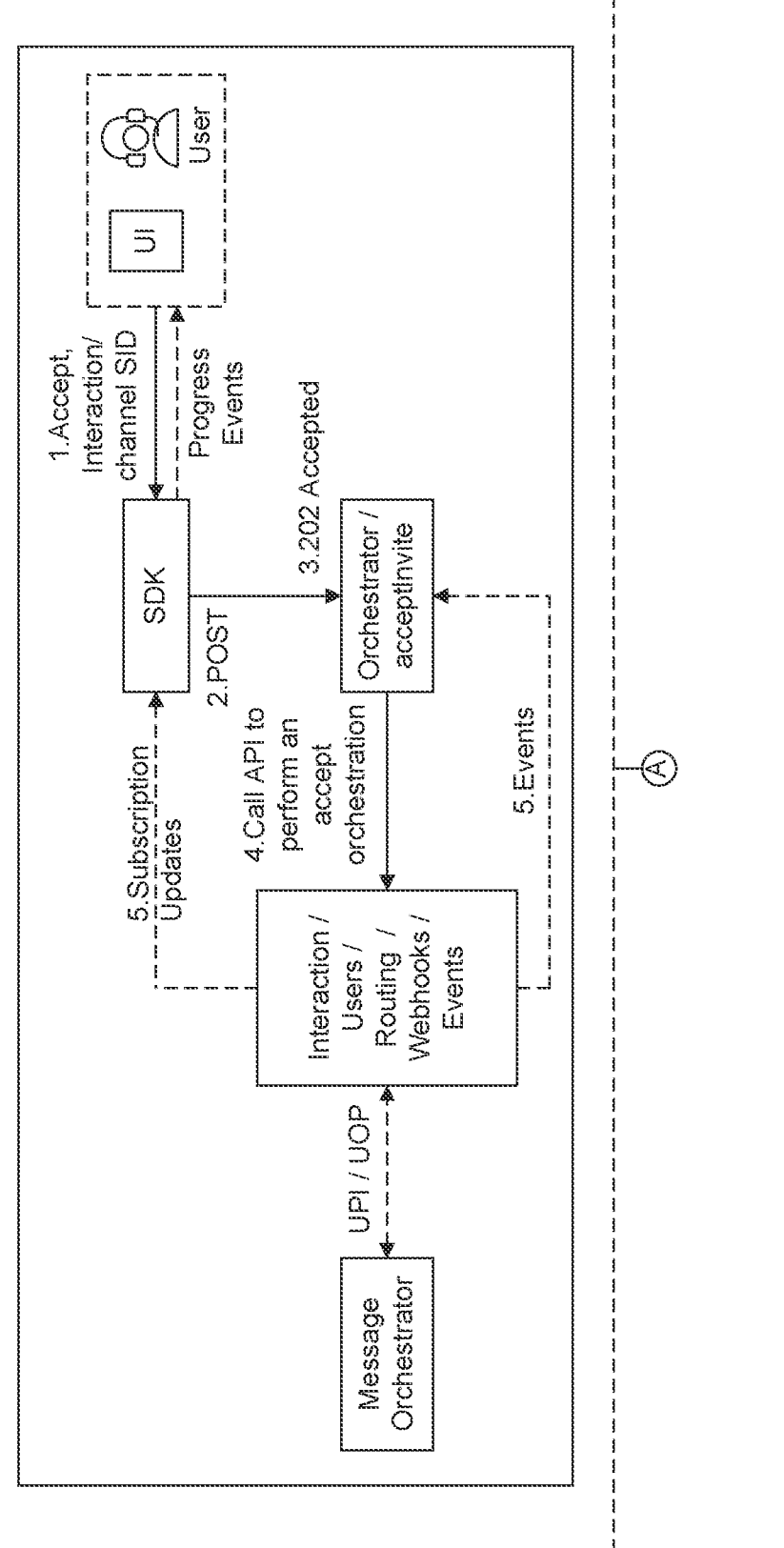
FIG. 40 includes block diagrams for depicting example orchestrations 4000, 4020, and 4040 for accepting an invite to an interaction channel, initiate an outbound call, and closing a messaging channel respectively.
Figure 40:
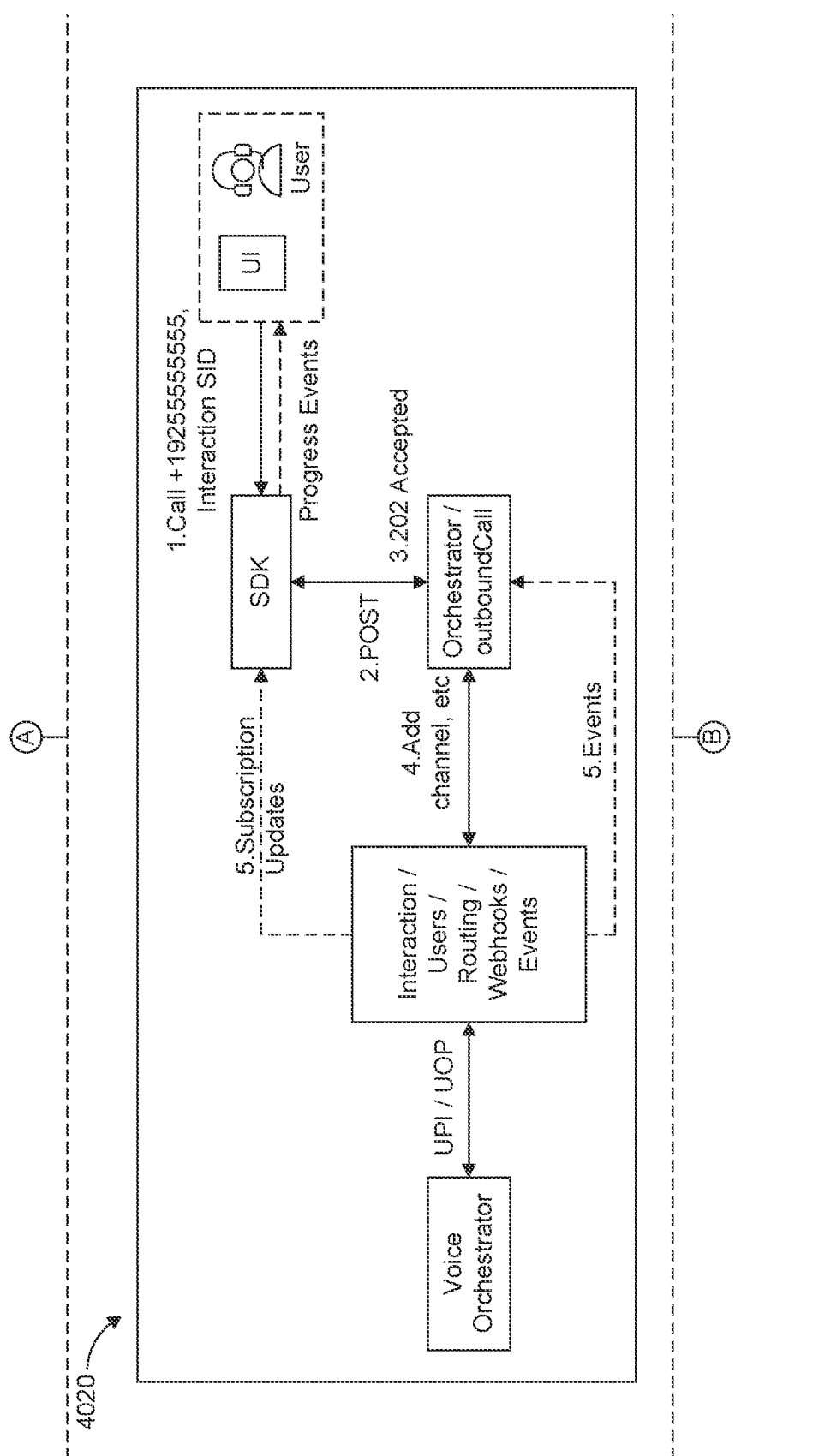
Figure 40:
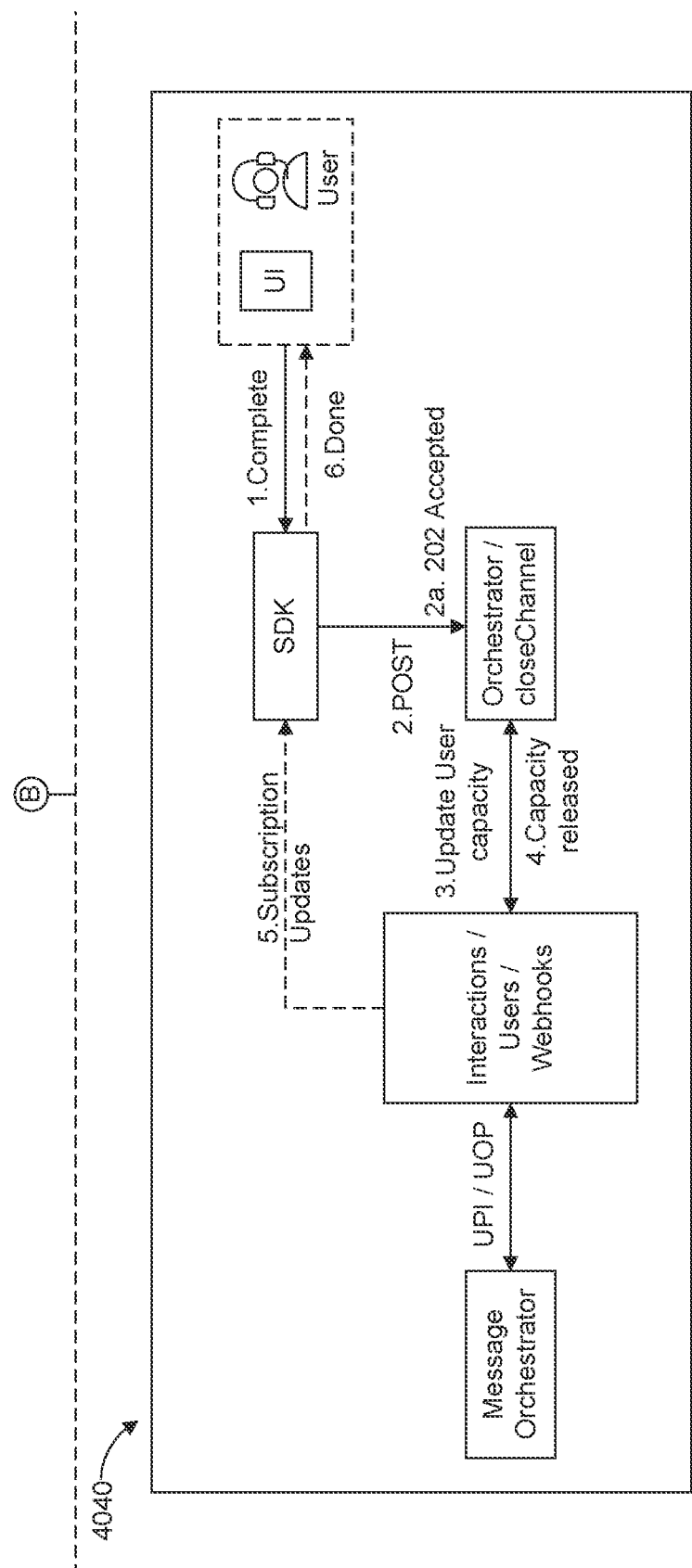

FIG. 40 includes block diagrams for depicting example orchestrations 4000, 4020, and 4040 for accepting an invite to an interaction channel, initiate an outbound call, and closing a messaging channel respectively.

With respect to orchestration 4000, (1) The user clicks accept interaction which invokes the system's SDK accept functionality; (2) The system's SDK has a pre-configured URL to invoke the acceptInvite orchestrator endpoint; (3) the system may return a code (e.g., 202) to indicate that this an asynchronous operation and the accept invite is in progress; (4) The acceptInvite orchestrator invokes the API to accept invite, add the user to the interaction channel and request capacity to be reserved for the user; (5) Events will be sent to the system's SDK and the acceptInvite orchestrator to report progress; (6) This handler ends when the result of the add participant operation is available. The user and customer can start messaging once the user gets added to the channel.

With respect to orchestration 4020, (1) The user wishes to place a call in the context of an interaction; (2) The SDK, with a preconfigured outbound call orchestration endpoint URL, requests a call to be placed; (3) The orchestrator indicates to the SDK that it is processing the request, (4) The orchestrator invokes Interactions and Users API and listens to events to track the results of the invocations.

With respect to orchestration 4040, this orchestration demonstrates how a complete may be implemented. In example embodiments, the system releases capacity and removes the User from the channel. In example embodiments, the system may not alter the interaction state.

(1) The user, through the UI, clicks on "complete interaction"; (2) The SDK, with a preconfigured "complete interaction endpoint", invokes the endpoint; (3)/completeInteraction performs all the orchestrations required. In this case, it needs to remove the user from the channel and release capacity. (4), (5), and (6) Response back to the user.

Figure 41:
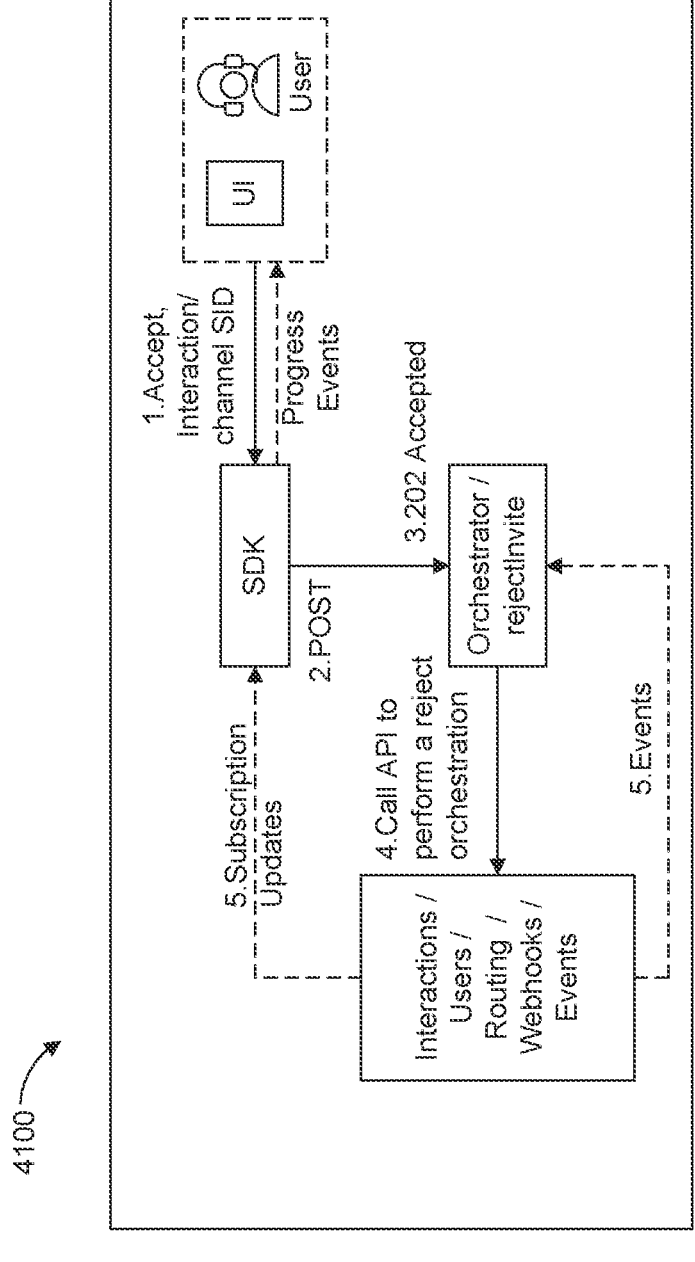
FIG. 41 is block diagram depicting an orchestration for rejecting an invite to an interaction channel.

FIG. 41 is block diagram depicting an orchestration 4100 for rejecting an invite to an interaction channel. This handler is invoked to reject a Channel Invite. This handler will decline the invitation which should cause an invite reject event to be sent to the Inbound Handler. The Inbound Handler will now be responsible for finding another user to invite.

Other orchestration include:

User pauses an Interaction Messaging Channel. When a user pauses a channel, the system may remove the user from the channel and give back capacity. The channel is set to Inactive. The GET/Channels endpoint will include the status of the channel and indicate it's "Inactive". This handler may set a hardcoded URL as the webhook handler on the Conversation and set the filter to onMessageAdded. This hardcoded URL should call the Customer Unpauses Interaction Handler. No additional data needs to be persisted for this phase. E.g. Which user paused it.

End Customer triggers an unpause on an Interaction Channel A customer that sends a message to an inactive Conversation will cause the Unpause Interaction channel handler to be invoked. In example embodiments, this handler will be very similar to the "Handle inbound messaging contact" except it will not need to create a channel. It will keep on trying to find a user until one accepts.

User or customer hangs up a call—closes voice channel. This orchestration ends when the user participant remove completes successfully.

Figure 42:
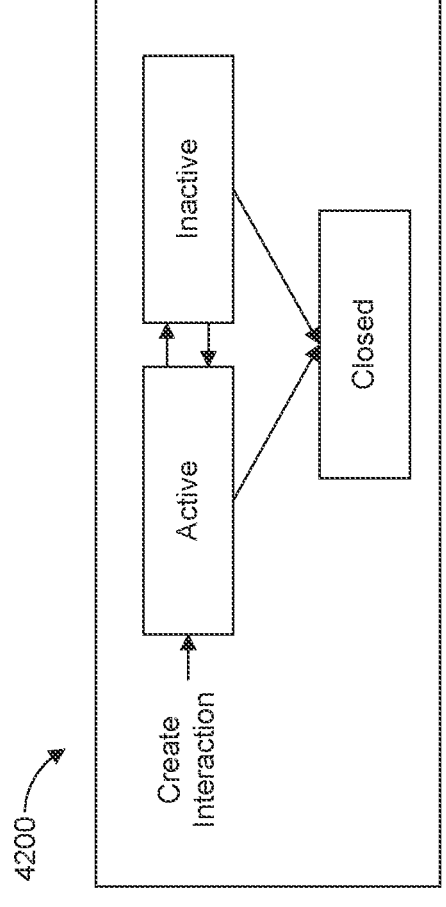
FIG. 42 is block diagram depicting example states and transitions for interactions.

FIG. 42 is block diagram depicting example states and transitions for interactions.

Closed: A closed interaction is an interaction that can no longer be modified. The interaction is locked.

Active: An interaction always starts in an Active state and remains to be in the active state until an actor (system or human) sets to closed or inactive. An Interaction cannot be closed if there is an active channel. All channels must be closed before closing an interaction.

Inactive. Inactive state indicates that the interaction is not yet complete but the user is blocked or is waiting for either the customer to respond or for more information from elsewhere. A user or a system may move the interaction into an inactive state to release the user's capacity. This is typically referred to as parking or pausing an interaction. An interaction cannot be set to inactive if: There's an active voice channel and/or there are more than 1 user on one or more channels.

Wrap-up, also known as "After Call Work" (ACW) is a time which a user may enter once they have finished attending to a customer's request or they are blocked waiting for more input from either the customer or backoffice. During this time, the user may for example, add a note, update a CRM, set a disposition code, or send a follow up on another channel.

During wrap-up, a user occupies a configurable amount of capacity. This capacity may depend on the type of channel, the customer, or the nature of the queue from which they are handling work from. By default, the system may occupy the full capacity.

Furthermore, Wrap-up may be set to be optional or mandatory. A contact center may not require users to enter wrap-up or they could leave it up to the user to decide if after call work is needed or not.

Also, wrap-up may be configured with a time limit i.e. how long a user is allowed to stay in wrap-up. The user may get a warning as they approach the time limit and when it is exceeded, they are automatically removed from wrap-up.

A user may be performing wrap-up simultaneously on various interactions. This may occur because the system may allow the user to be on multiple interactions.

The time a user takes to wrap-up is reported as it reflects the occupancy time of a user and affects average handle time. These are measures that are typically used to forecast resourcing and/or to re-allocate which queues users are logged into.

Multiple users may wrap-up on the same interaction. An example of this might be user 1 transfers an interaction to user 2. User 1 may now enter wrap-up time. User 2 may also wrap-up once they complete servicing the customer.

Contact on the same interaction during wrap-up may and can occur. This is especially true for asynchronous channels like SMS where the customer has a "one more thing". In this case, a contact center may want to ensure this "one more thing" is routed to the last user, (the one wrapping up). In this case, the user may either cancel the wrap-up or decide that this new contact is a new interaction and move the new channel to another interaction.

A supervisor is able to see the users that are performing wrap-up on an interaction and may be able to monitor the wrap up.

Contact centers evolved from the need to address inbound calls to support inquiries about a product, a service, or a subject. Use cases relied on a structured, directed workflow.

Today, as entities such as businesses try to redefine these use cases they lack tools, platforms, and services to build personalized relationships with their customers and are stuck with transactional models for point-in-time connections Businesses expect a single, consolidated view of all the touch-points their end-customers have across both business and system silos and throughout the life-cycle of the engagement in order to offer:

Personalized customer engagements

Integrated view of context that a business representative needs to support the end customer.

Optimized operations across the silos of the business.

Accelerated development using tools to create unique differentiated experiences.

In example embodiments, interactions are represented as a single work record for all the ongoing conversations over one or multiple channels between a business representative (s) or a system (such as IVR, chatbot, etc.) and the end customer, data needed from different systems/applications to support the topic or from other business backend operations that can bring information to help provide personalized, contextual customer engagement Interactions may allow businesses to build structured, directed communication workflows with capability to address reporting and audit needs. It will support all voice+digital channels including email as asynchronous channels, with messaging and email channels through unified omni-channel Conversations API model. Interactions will also support custom channels allowing businesses to route any piece of work in an organization while providing context and a holistic view of each and every touch point for a customer.

The system provides a single source of truth about anything that has happened during or after the life-cycle of an Interaction. It includes a single data source for all real-time and historical data to derive metrics, calculate KPIs, and to route the Interaction to the right available business representative. Real-time data aggregation provides businesses with actionable insights into their operation. Workflows drive business outcomes and operational optimization through unified metric and/or deliver additional intelligent experiences to support customer's unique use cases.

User Experience

In example embodiments, there may be various differences between Interactions and Conversations. For example, there may be different user experiences for different personas. Some of these differences are described below with respect to a basic contact center focused interaction flow.

Agent & Customer

Customer: Initiating a New Interaction

Figure 43A:
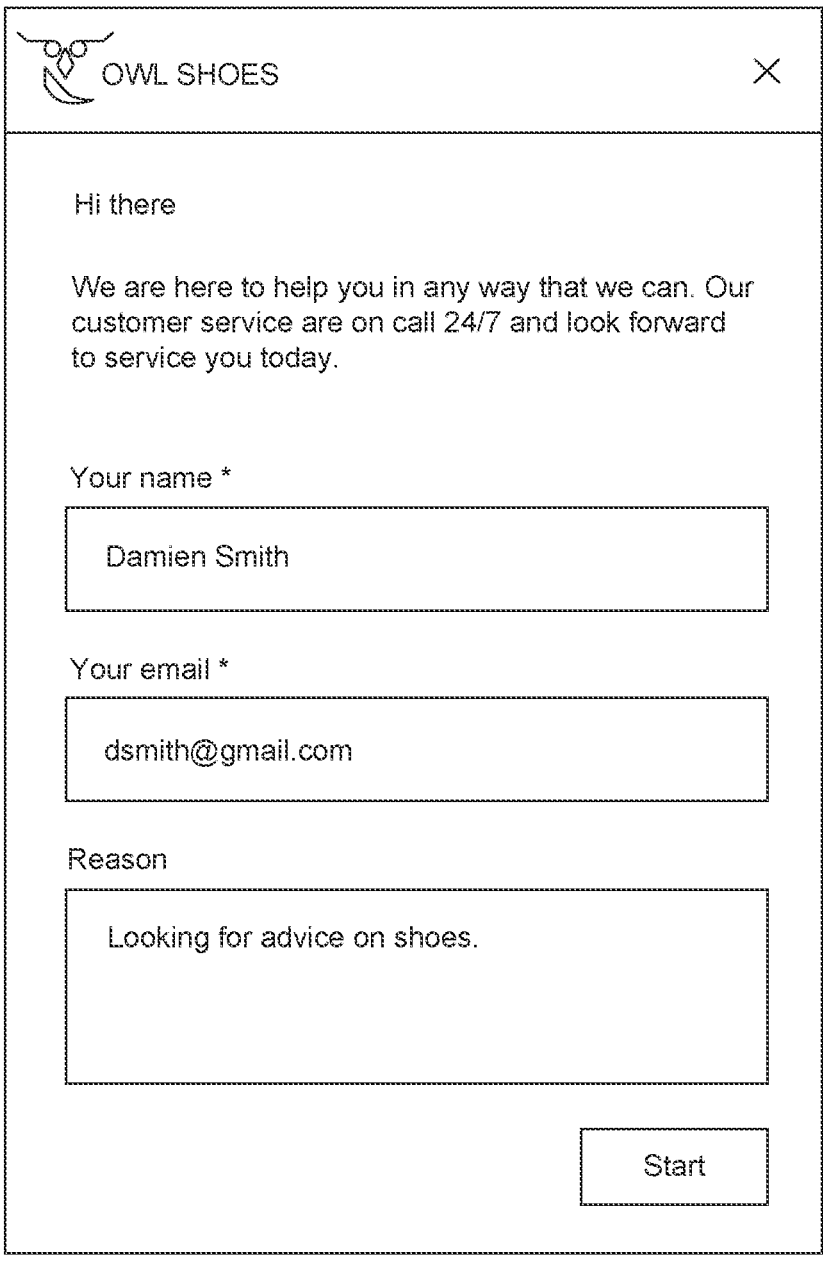
FIGS. 43A, 43B, 44, 45A, 45B, 46A, 46B, 47, 48, 49A, 49B, 50, 51A, 51B, 52A, 52B, 53A, 53B, 54, and 55 are block diagrams depicting various user interfaces that may be presented in one or more client devices to implement one or more aspects of a contact center.

As depicted in FIG. 43A, Damien Smith is a customer of the Owl Shoes company. Damien has been browsing the Owl Shoes website and would like to buy a new pair of shoes but needs advice from a salesperson. On the website Damien can start a chat session with a sales representative by first filling out the online form.

Figure 43B:
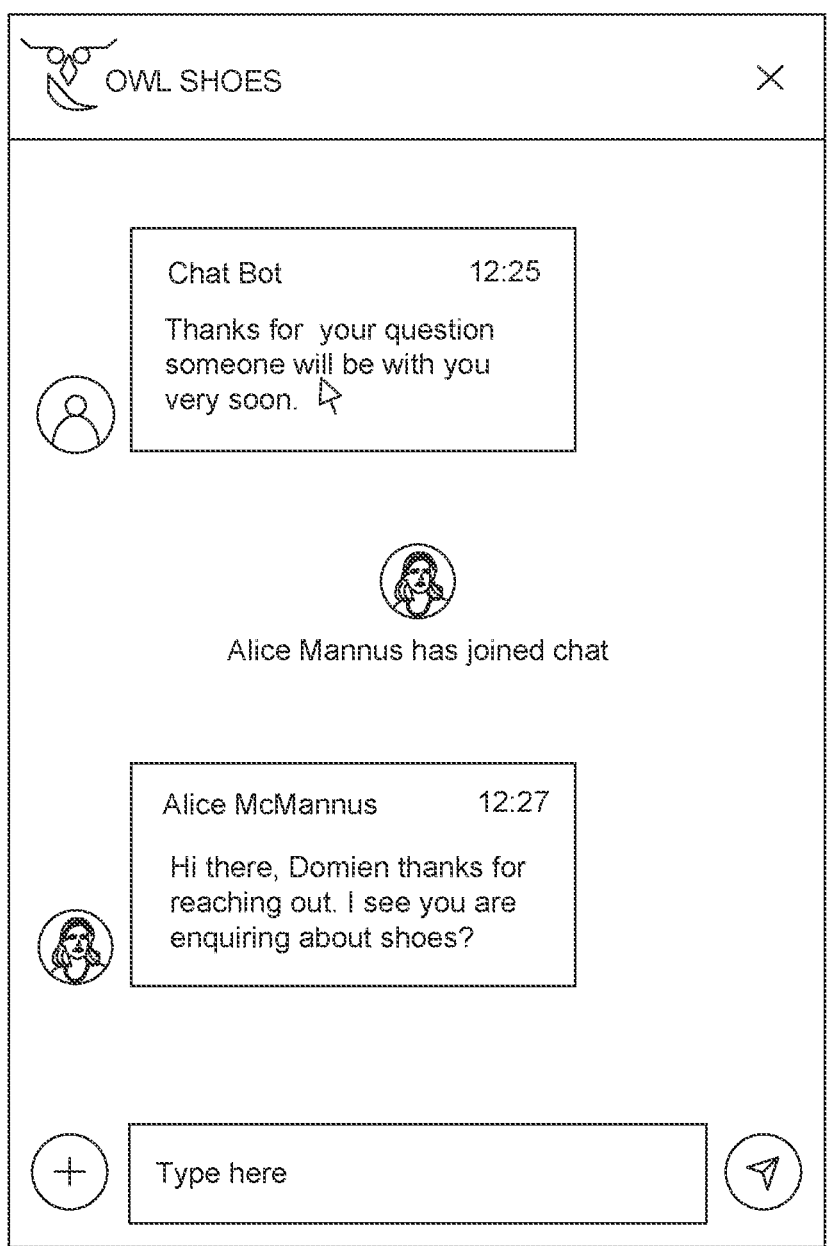

As depicted in FIG. 43B, Once Damien has submitted the request, an Interaction is created. Owl Shoes has set up a simple flow which transfers the incoming Interaction into an ACD (Automatic Call Distributor) Queue to get it routed to the next available agent. Once queued, the system will route the Interaction to the next available agent. Damien will be notified when an agent joins the conversation.

Agent: Alerts and Joins the Interaction

Figure 44:
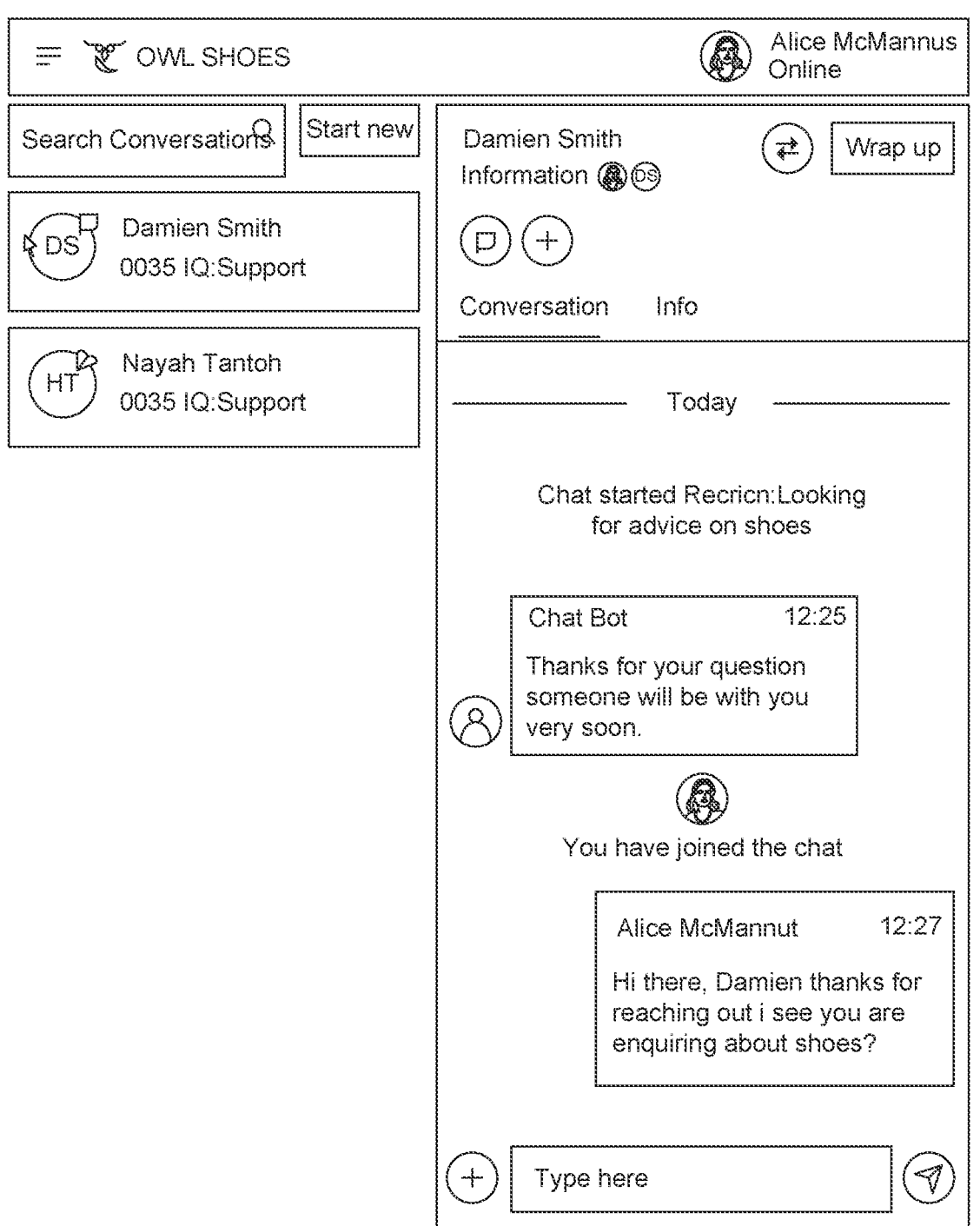

As depicted in FIG. 44, Alice is a sales representative with the Owl Shoes department. Alice is a general sales representative and her skills in the ACD are set as such. Alice is capable of handling multiple interactions at once based on her current capacity settings. So even though Alice is already on a Chat Session she is being alerted by a new incoming Chat from Damien.

As this is a new Interaction from Damien, there is no history to show to Alice. However she does get access to the "Reason" information provided by Damien so that she gets an idea of what he is looking for. Damien explains that he is in for a pair of running shoes as he is planning to run a marathon. Since Alice is not an expert in this area she offers Damien to get transferred to a colleague that has experience.

Figure 45A:
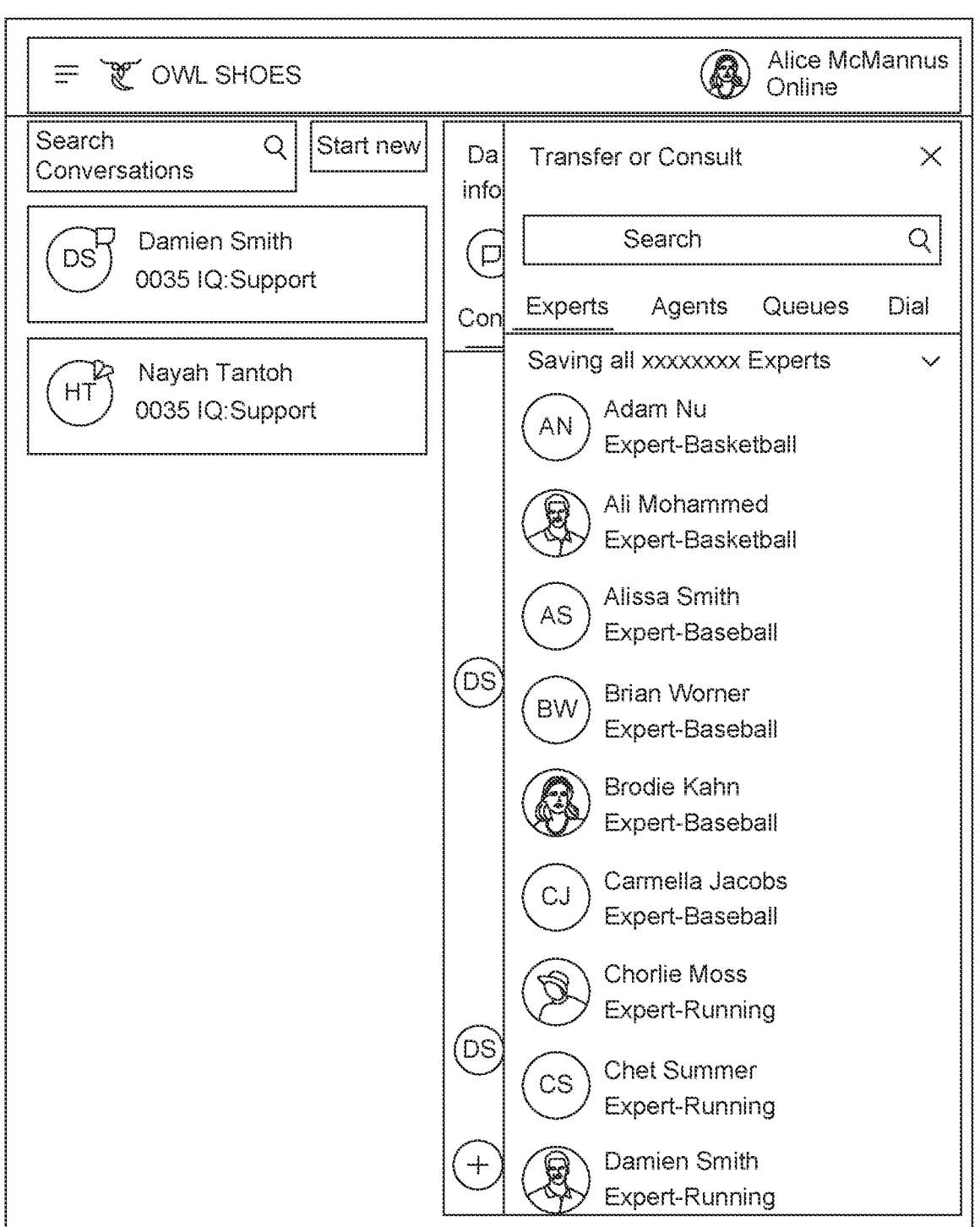
Figure 45B:
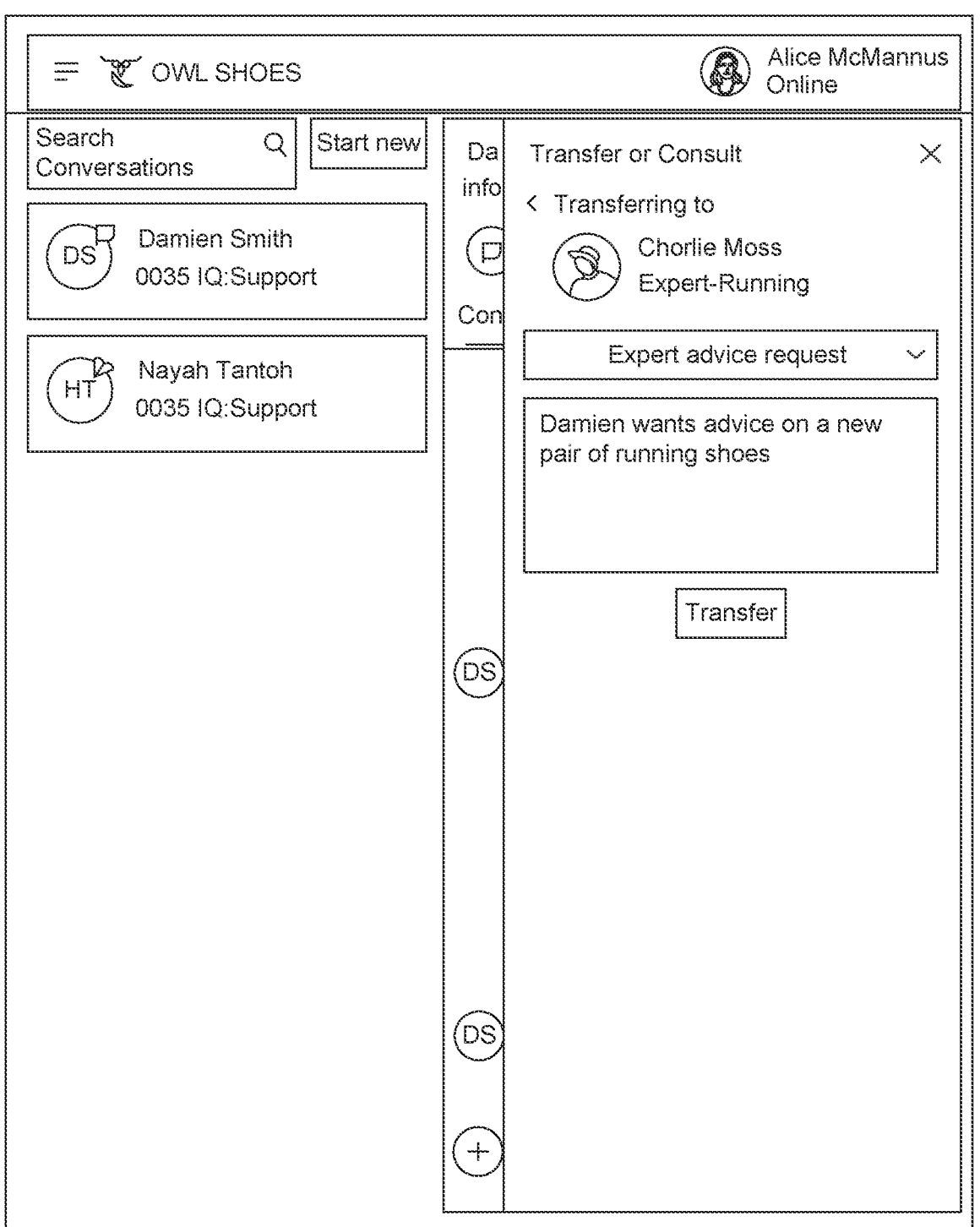

Agent: Transfer the Interaction:

As depicted in FIGS. 45A and 45B, Alice opens the transfer directory and searches for a colleague with expertise in "Running" shoes. In this scenario she transfers to a specific user (Charlie) but she could also have chosen to transfer to another queue or a group of people targeting a specific skill. Once Alice has picked a colleague, she provides the transfer reason information and notes to inform Charlie about the Interaction.

Figure 46A:
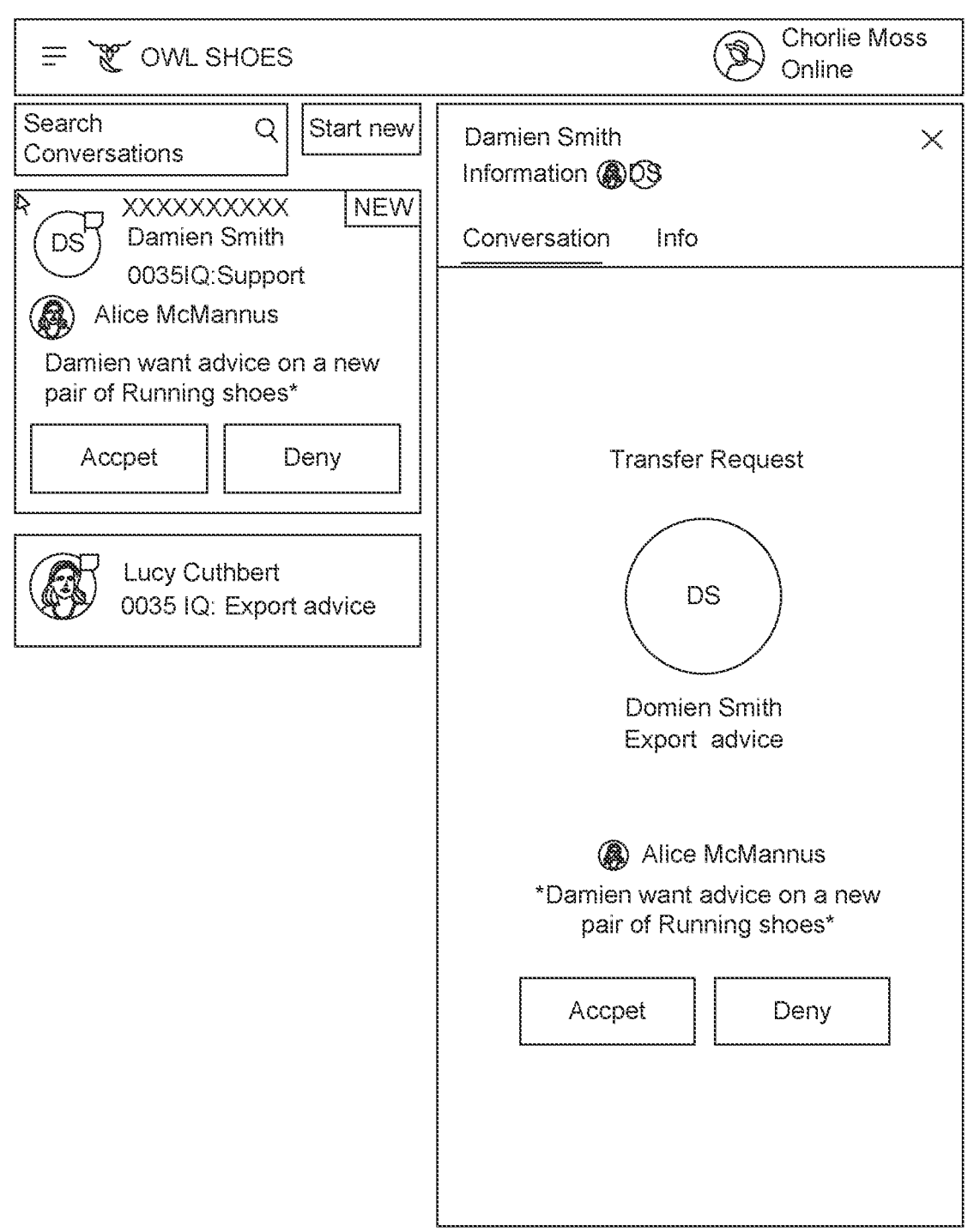
Figure 46B:
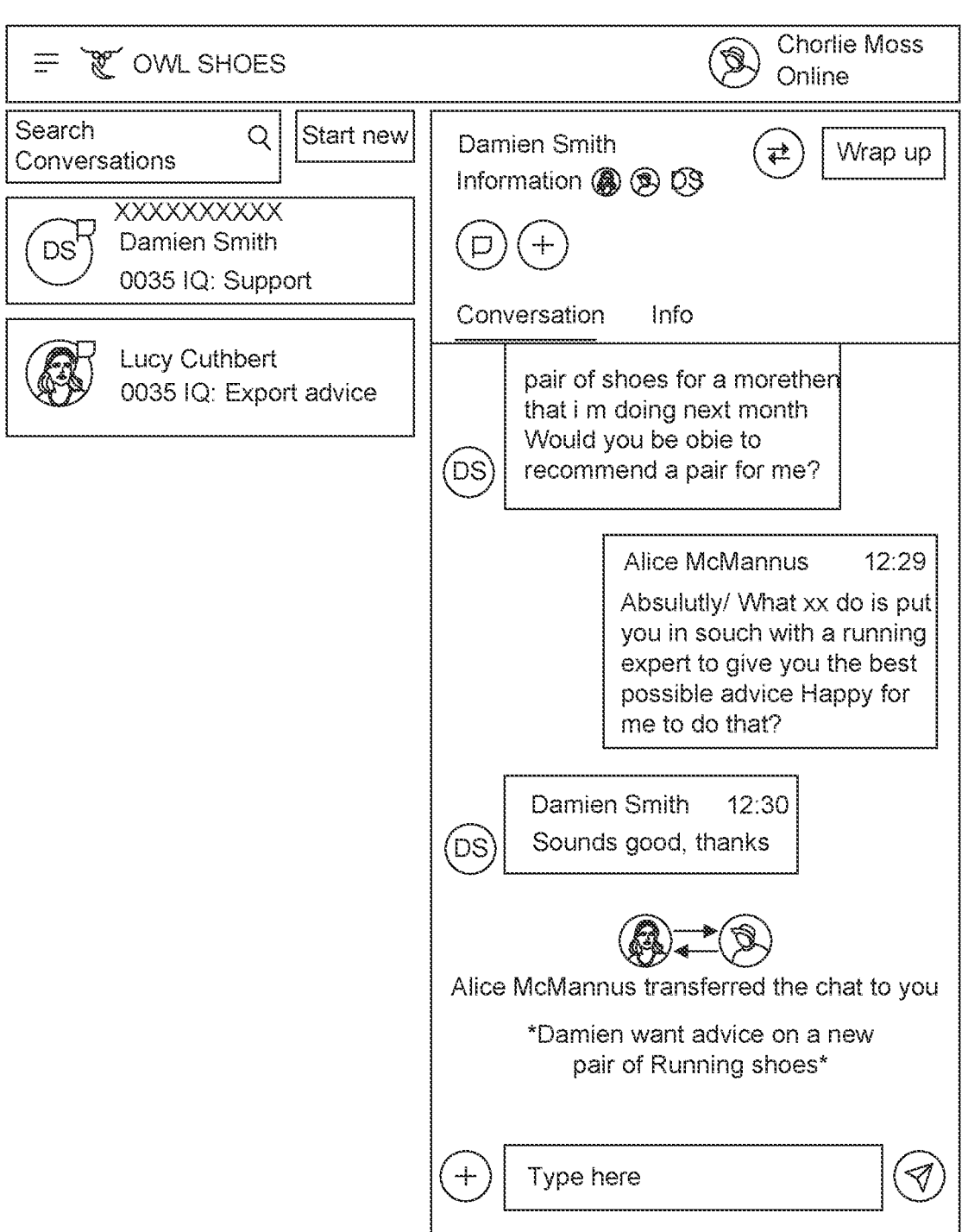

Agent: Receiving a Transferred Interaction:

Agent Charlie is a running expert and is alerted to the incoming transferred interaction from Alice. Charlie is presented with some details about the interaction when being alerted so that he can prepare to answer it. Once he has accepted the Interaction, he gets full access to the history of the Interaction including the Transfer Notes left by Alice, as depicted in FIGS. 46A and 46B.

Figure 47:
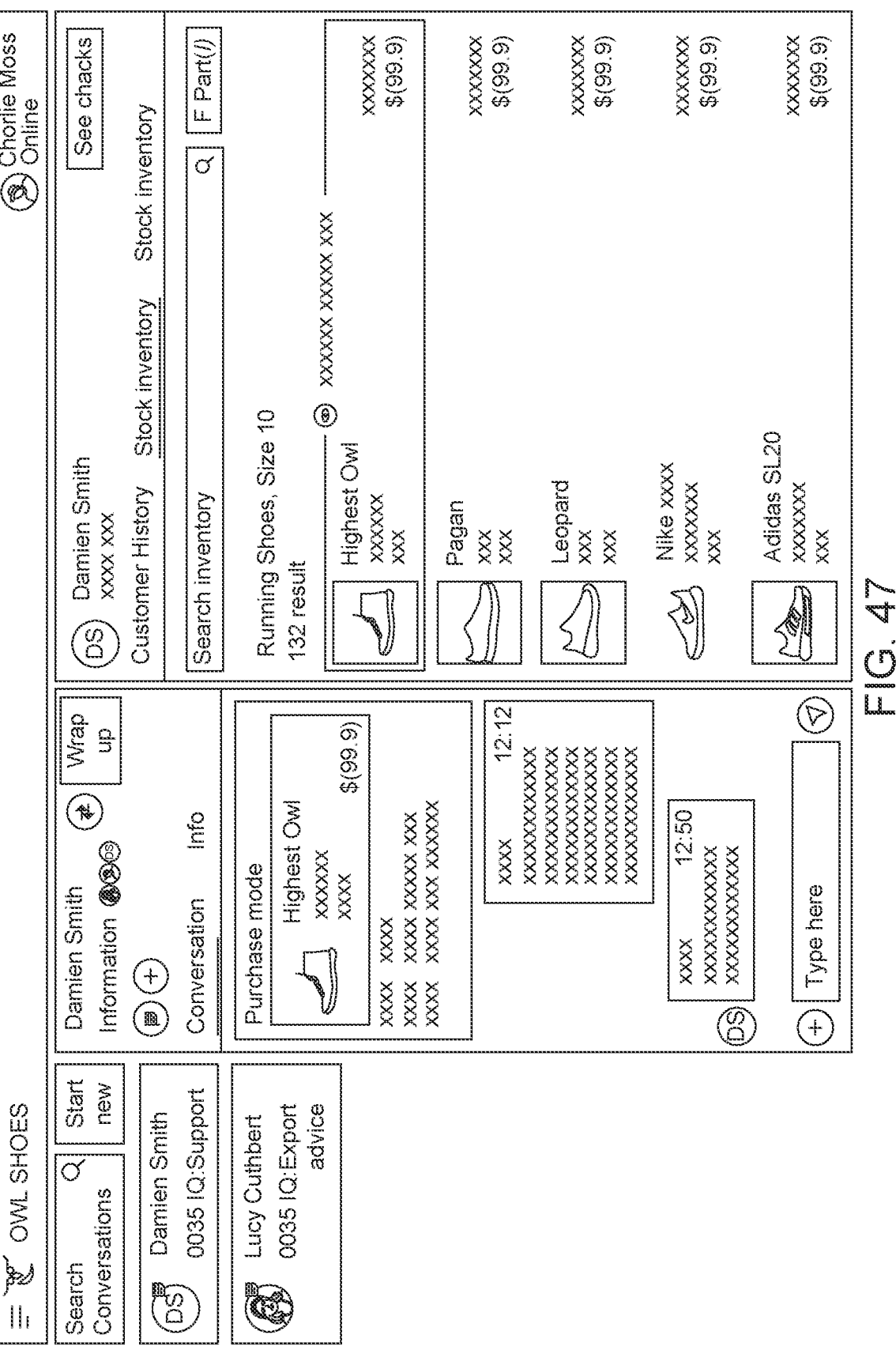

As depicted in FIG. 47, Charlie exchanges several messages with Damien and helps Damien to find the best shoes based on what he is looking for. Charlie has an integrated inventory system in his User Interface and has the ability to simply close the sale of a new shoe within a couple of clicks Once the sales has gone through Charlie and Damien end the Interaction. Charlie now goes into wrap-up and has to provide a disposition code, Charlie in this case sets the disposition code to "Sale" This disposition code is mainly used for reporting/categorization of each interaction.

Customer: Receiving an Email and Calling Owl Shoes

Damien receives an email from Owl Shoes indicating a delay with the shipment of his shoes He decides to immediately contact Owl Shoes by calling them. The IVR prompts Damien with a couple of options. Damien selects that he is calling about an existing order. The system matches his call with an ongoing Interaction and associates them together. As Charlie Moss, the representative he spoke with before is currently not available the Interaction gets queued to be routed to the next available agent in the contact center.

Agent: Receiving an Incoming Interaction.

Figure 48:
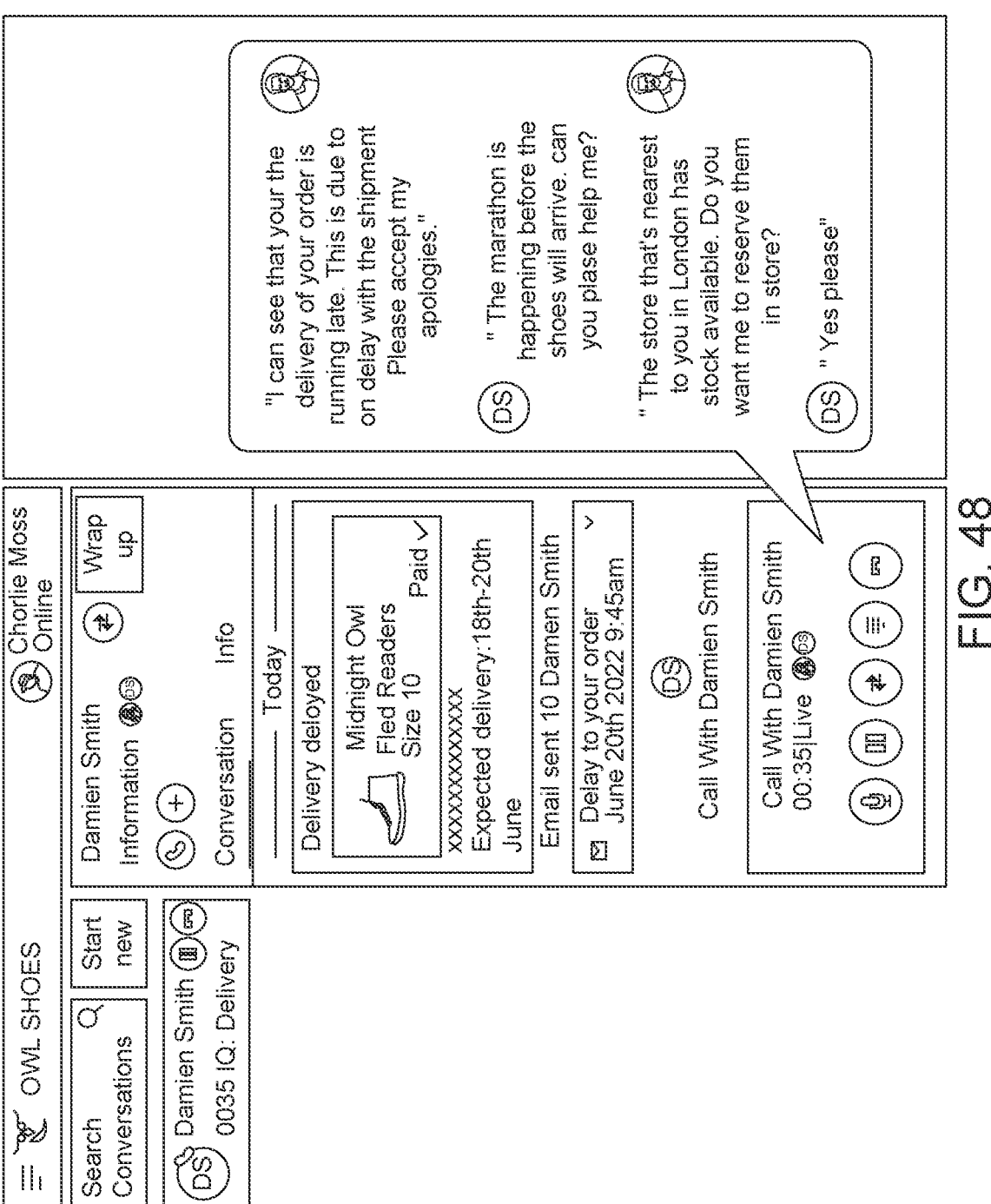

As depicted in FIG. 48, Agent Michelle is available in the system to take voice interactions. The Interaction from Damien that just got queued alerts Michelle. As soon as Michelle accepts the incoming interaction she is presented with all history of the Interaction. This includes chat history, transfer notes as well as the details on the email that Damien received due to the delayed delivery. As Michelle has all details available she can empathize and quickly work with Damien and offer him to make a reservation for the shoes.

Agent: Placing an Outbound Call to Reserve the Shoes.

Figure 49A:
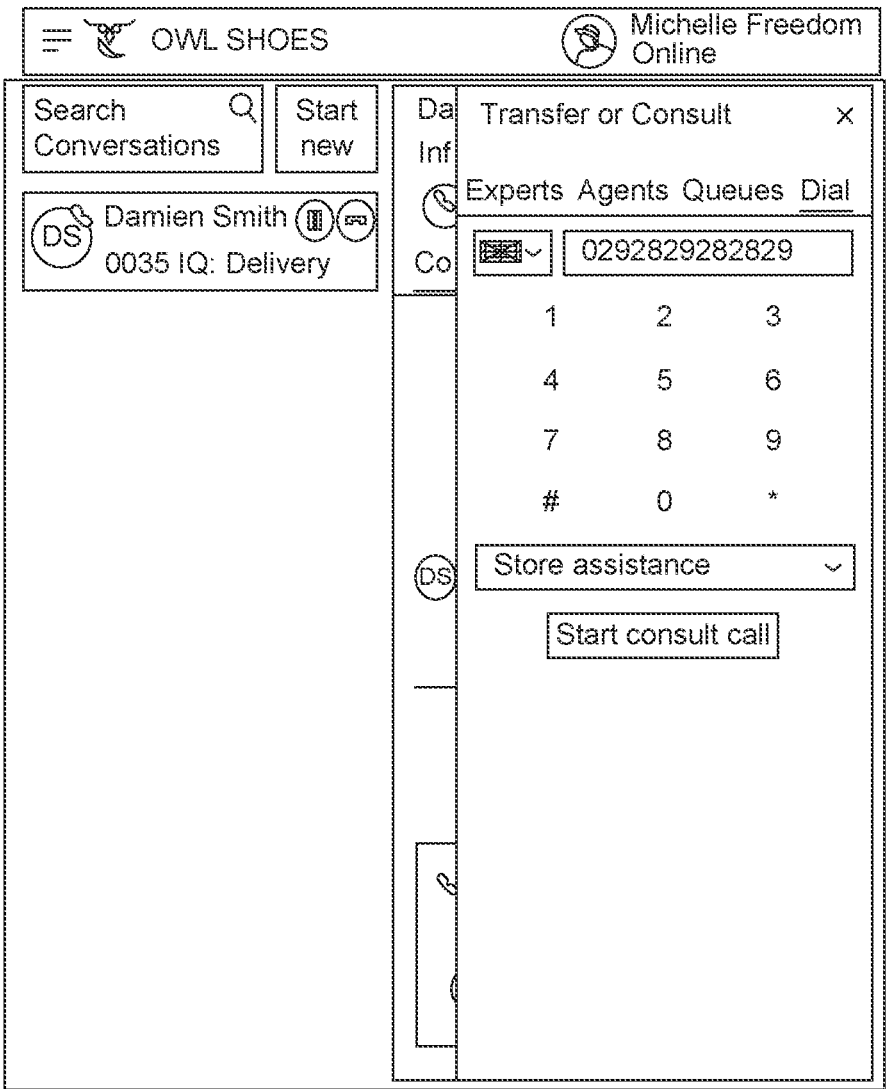
Figure 49B:
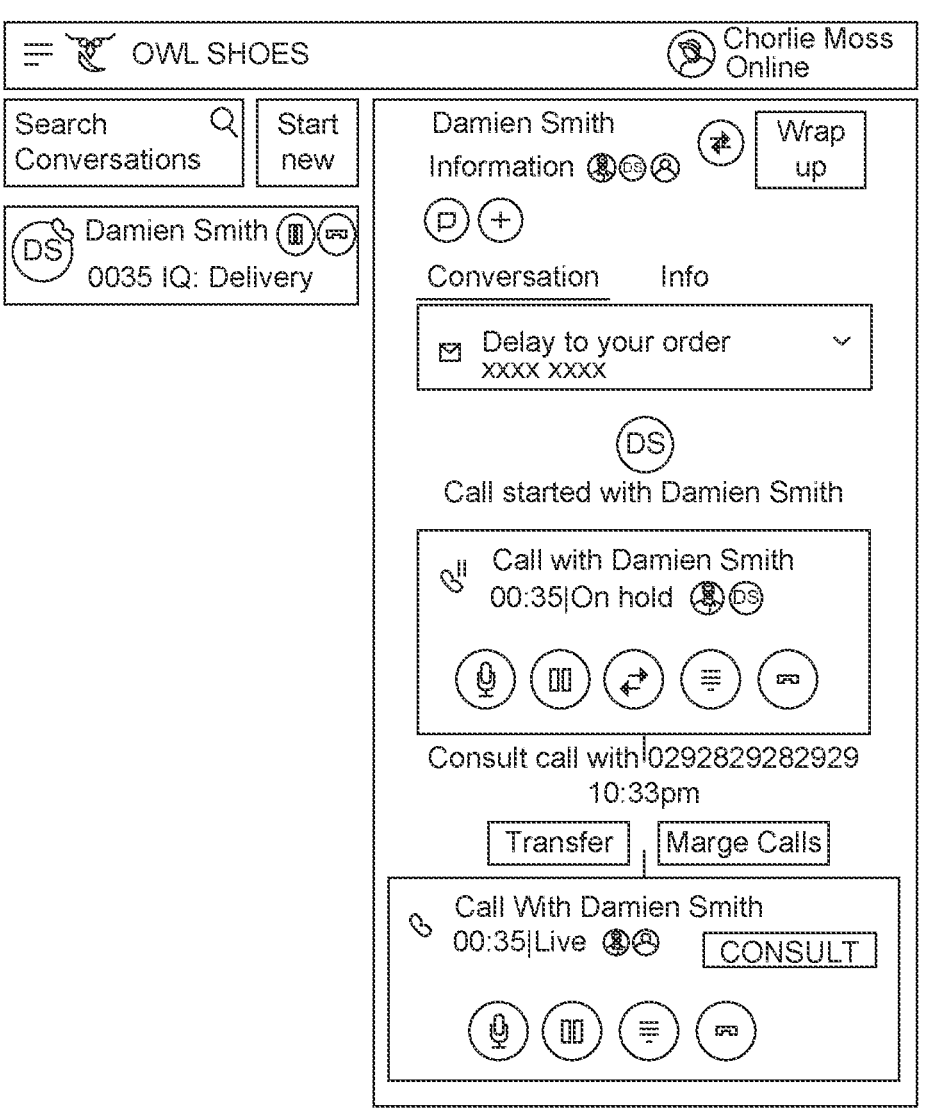

As depicted in FIGS. 49A and 49B, Michelle puts Damien on hold so that she can place an outbound call to a nearby store to make a reservation for the shoes. Michelle uses the system's Dialpad (or a directory with store numbers) to phone the nearest store. Michelle works with the store employee to reserve the shoes for pickup later by Damien.

Figure 50:
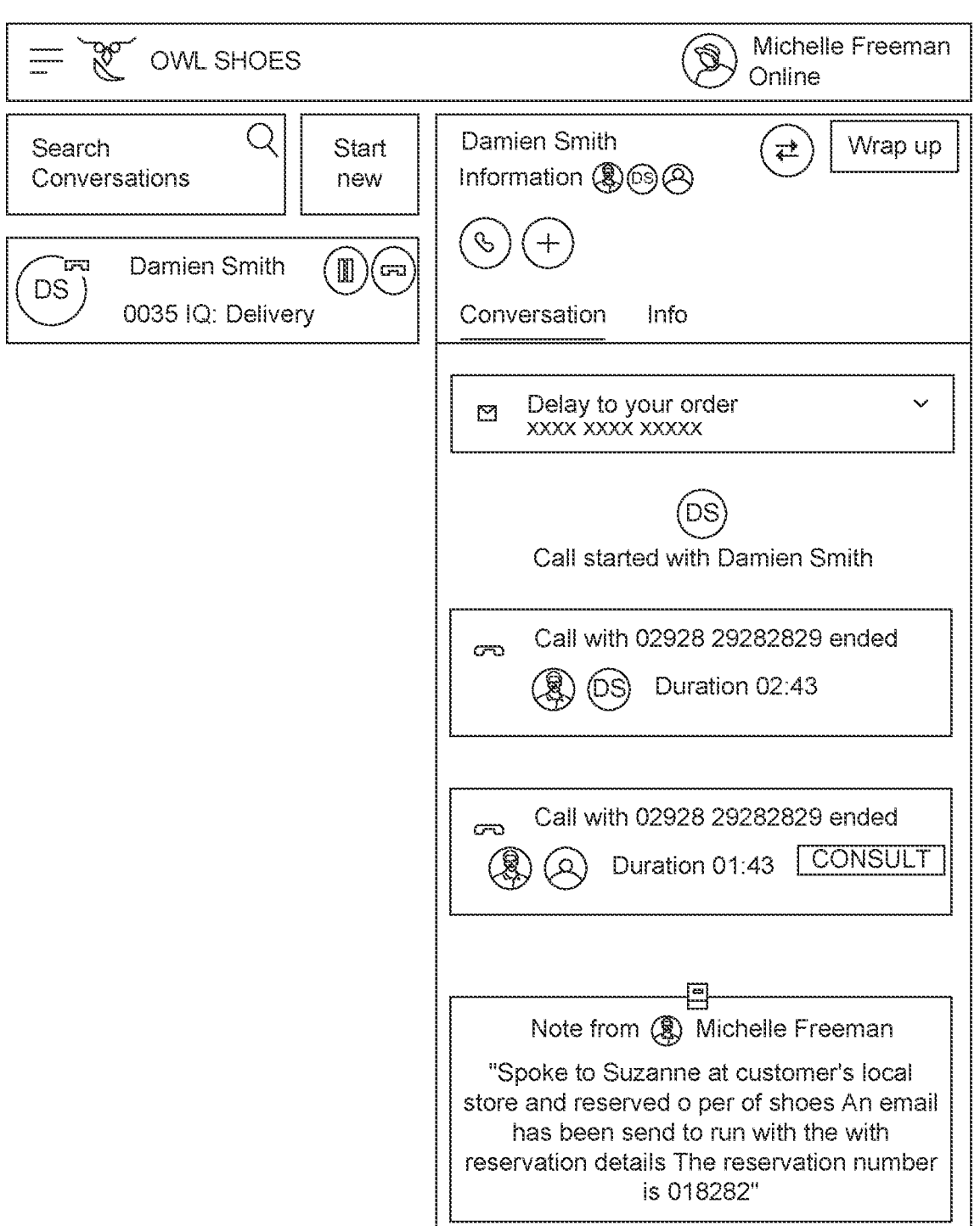

As depicted in FIG. 50, Michelle disconnects the call with the Store and un-holds Damien to inform him about the shoes that can be picked up later in the store.

Figure 51A:
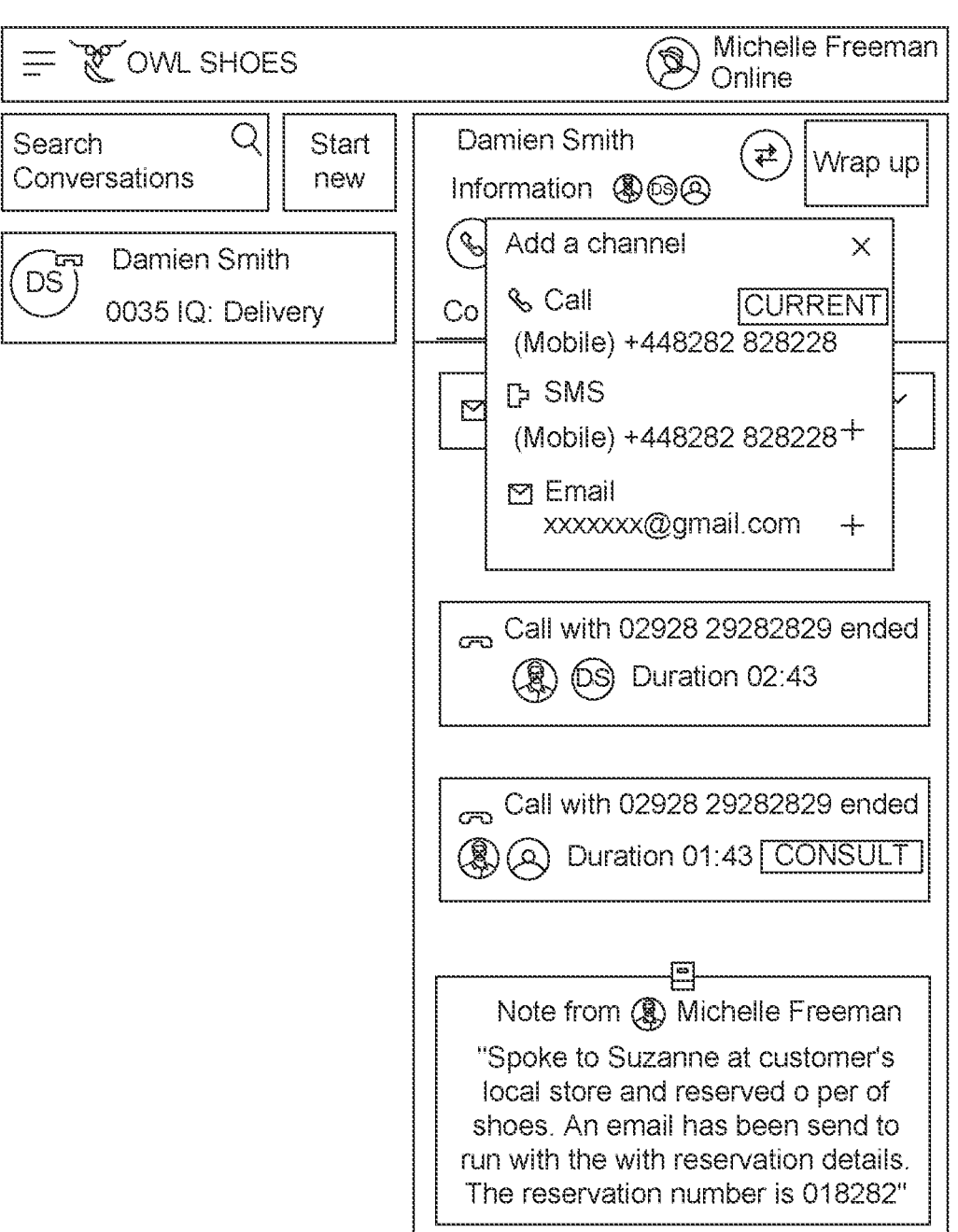
Figure 51B:
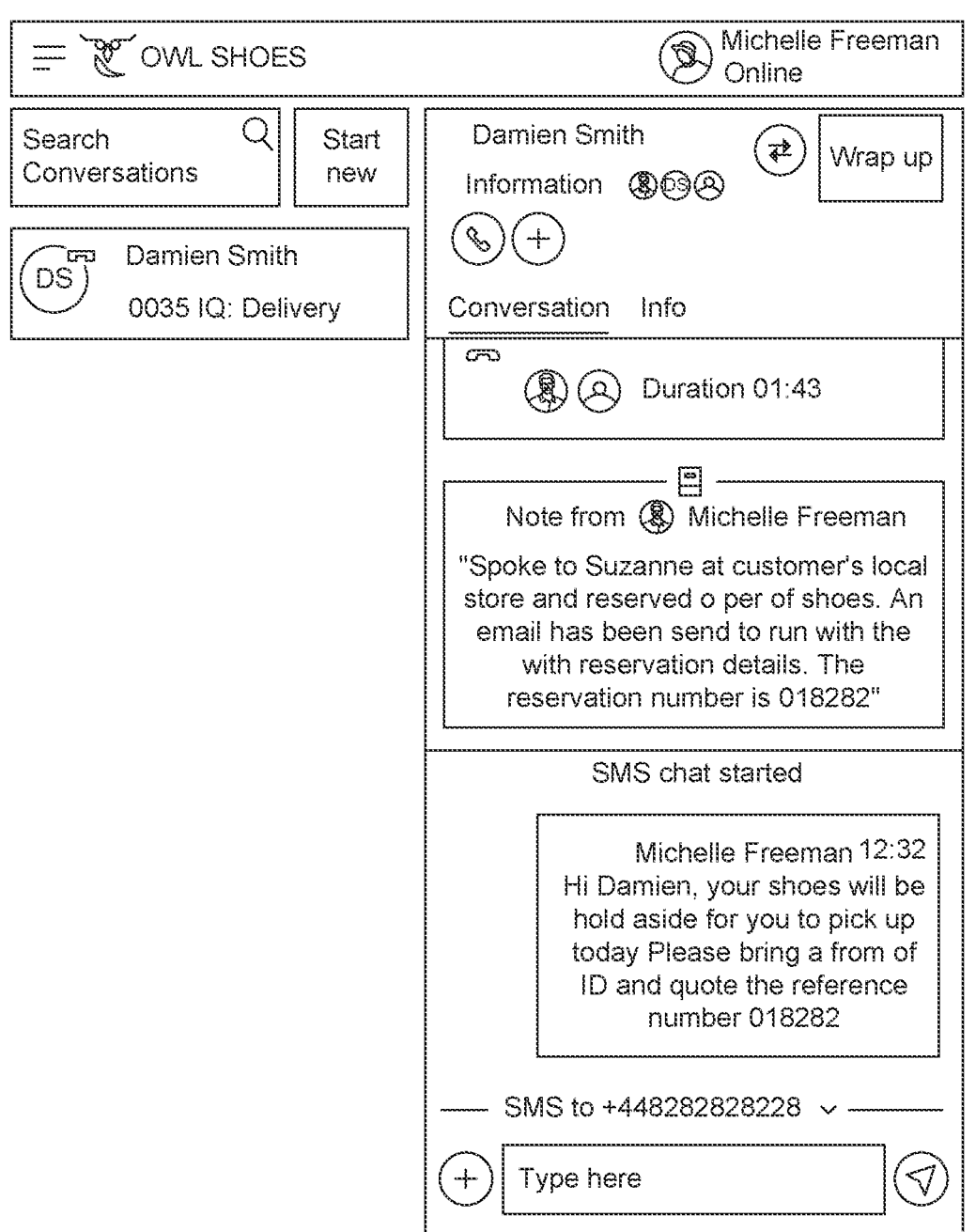

As depicted in FIGS. 51A and 51B, Michelle adds a quick note to the Interaction with the details of the reservation.

Agent: Outbound SMS to Confirm Reservation

Figure 52A:
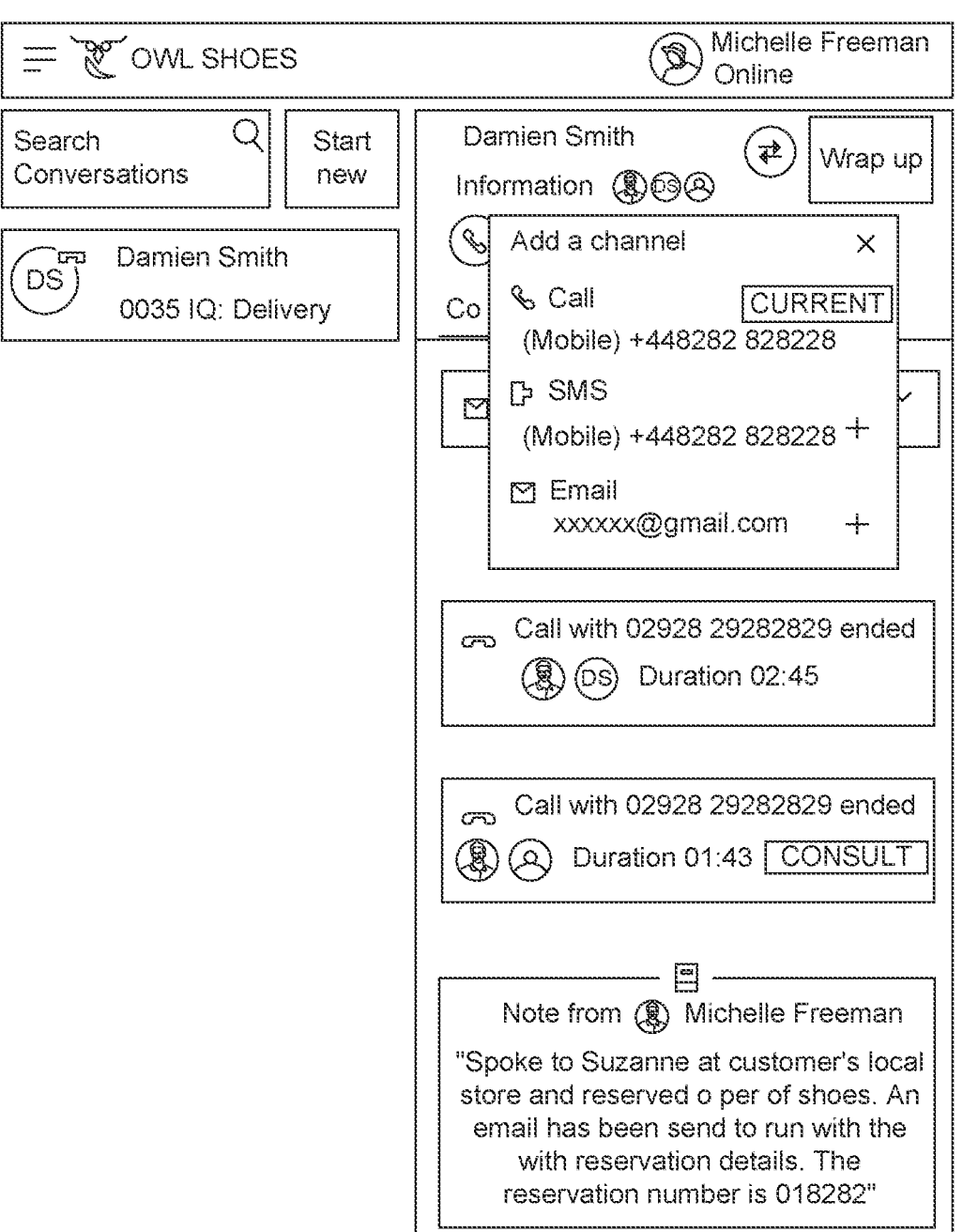
Figure 52B:
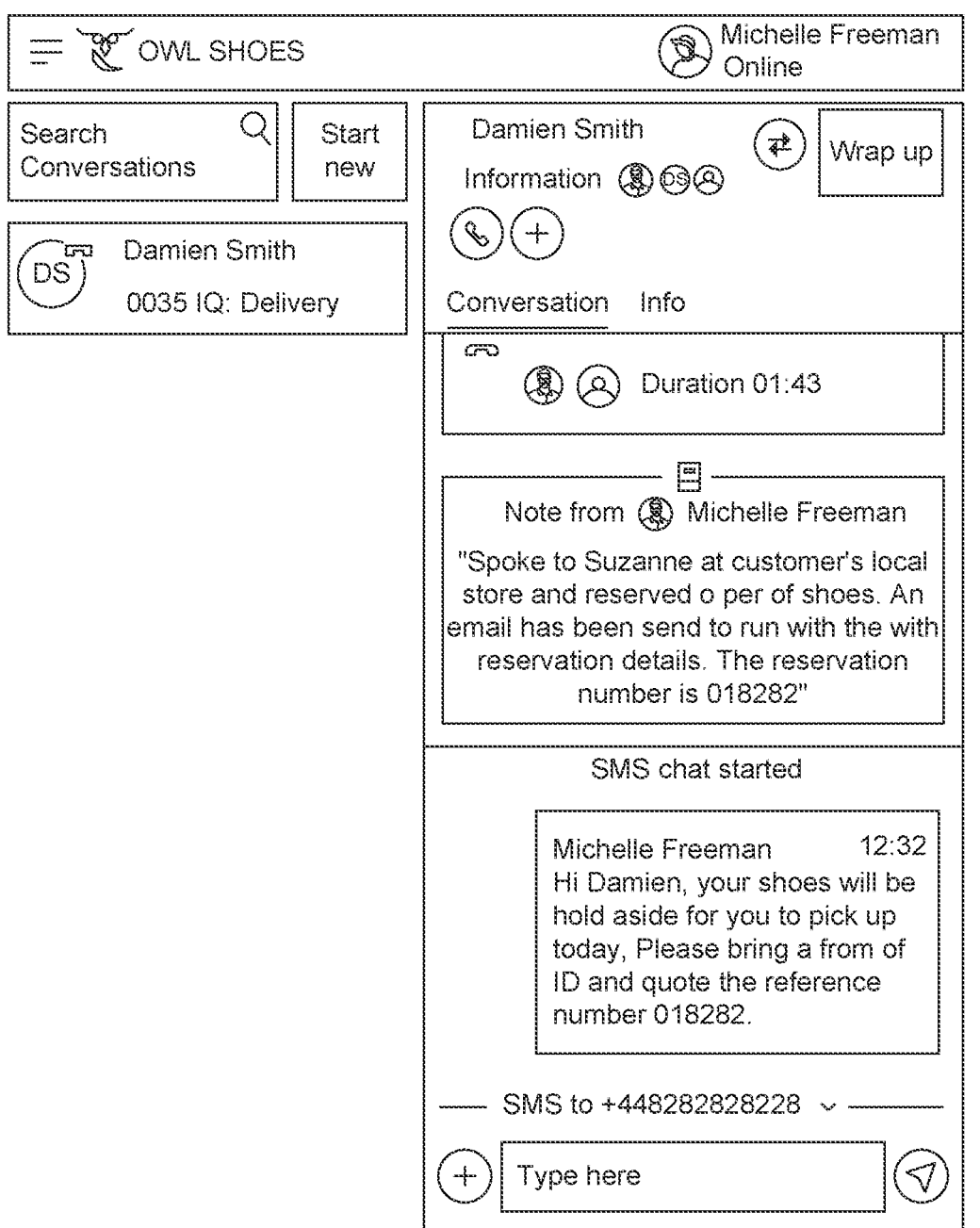

As depicted in FIGS. 52A and 52B, Michelle decides to SMS Damien to provide him with the reservation number for the in-store pickup. She adds an SMS channel to the existing conversation via the add channel option in the Agent Interface, selects the phone number, and shares the details of the store pickup with Damien. At the end, when Michelle is done she wraps-up the Interaction and enters a disposition code.

Supervisor: Real-Time Monitoring of Agents

[Note: Some of the business use cases outside contact center use cases might not have a supervisor or a manager fiction but they still have other operational and workflow needs to have visibility into real-time data.]

Supervisor Justine is partially responsible for the customer experience. For her role, Justine has been given access to a specific view that allows her to see what her team is actually doing. This view provides Justine complete details of what each of her team members are doing at that moment in time. The view gives access to the following data.

Presence/Status information showing whether an agent is online and what status (Available, Break, Meeting) they have set themselves to. Status information is used to determine whether an agent can receive additional Interactions;

All active Interactions per user, including transfers;

Duration details for each Interaction/Channel; and/or

Monitoring & Coaching Capabilities

The information in the Teams view as described below, gives Justine the insights required to manage her team. Not only will she be able to see when an agent might have difficulty addressing a customer question, she can also listen and coach an agent directly from within the application in real-time or at some point after the interaction has ended.

Figure 53A:
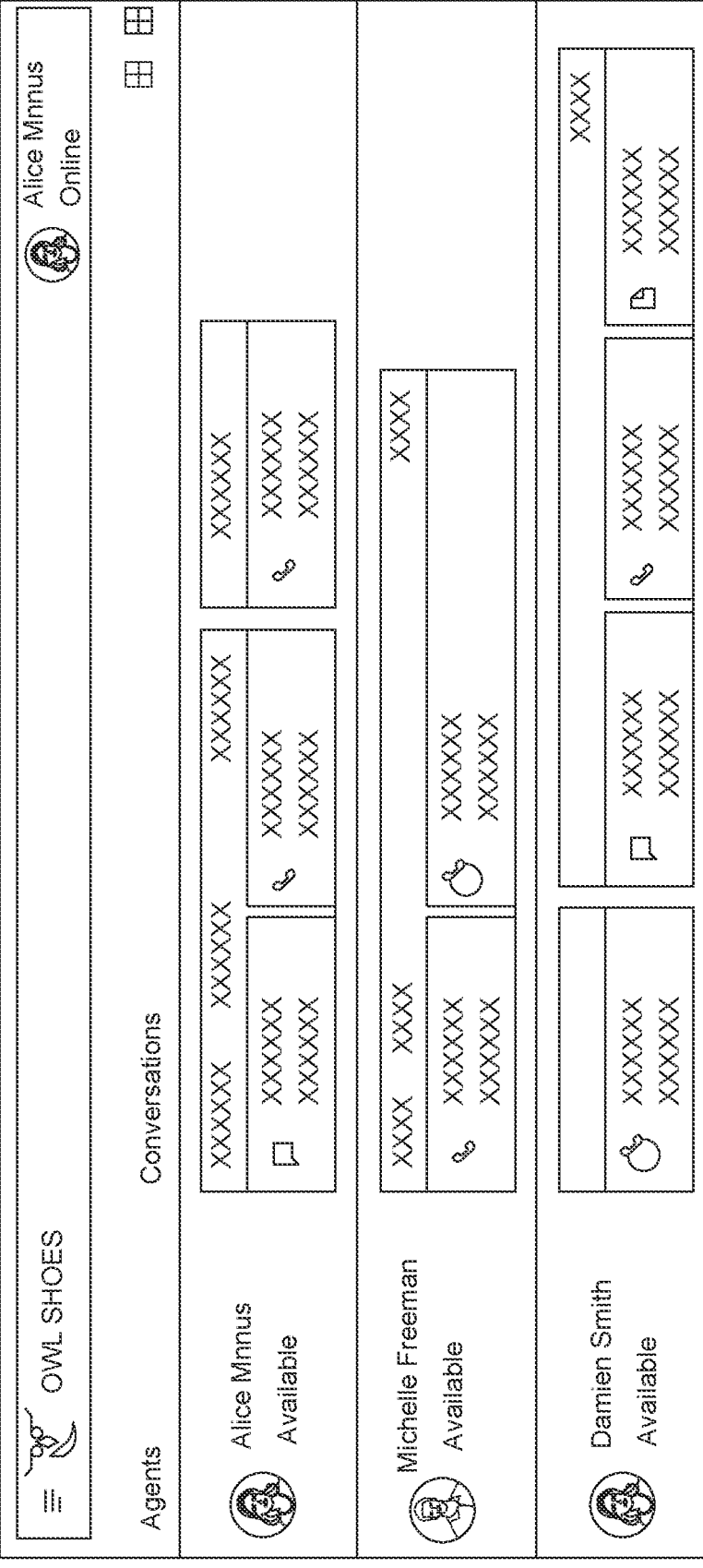
Figure 53B:
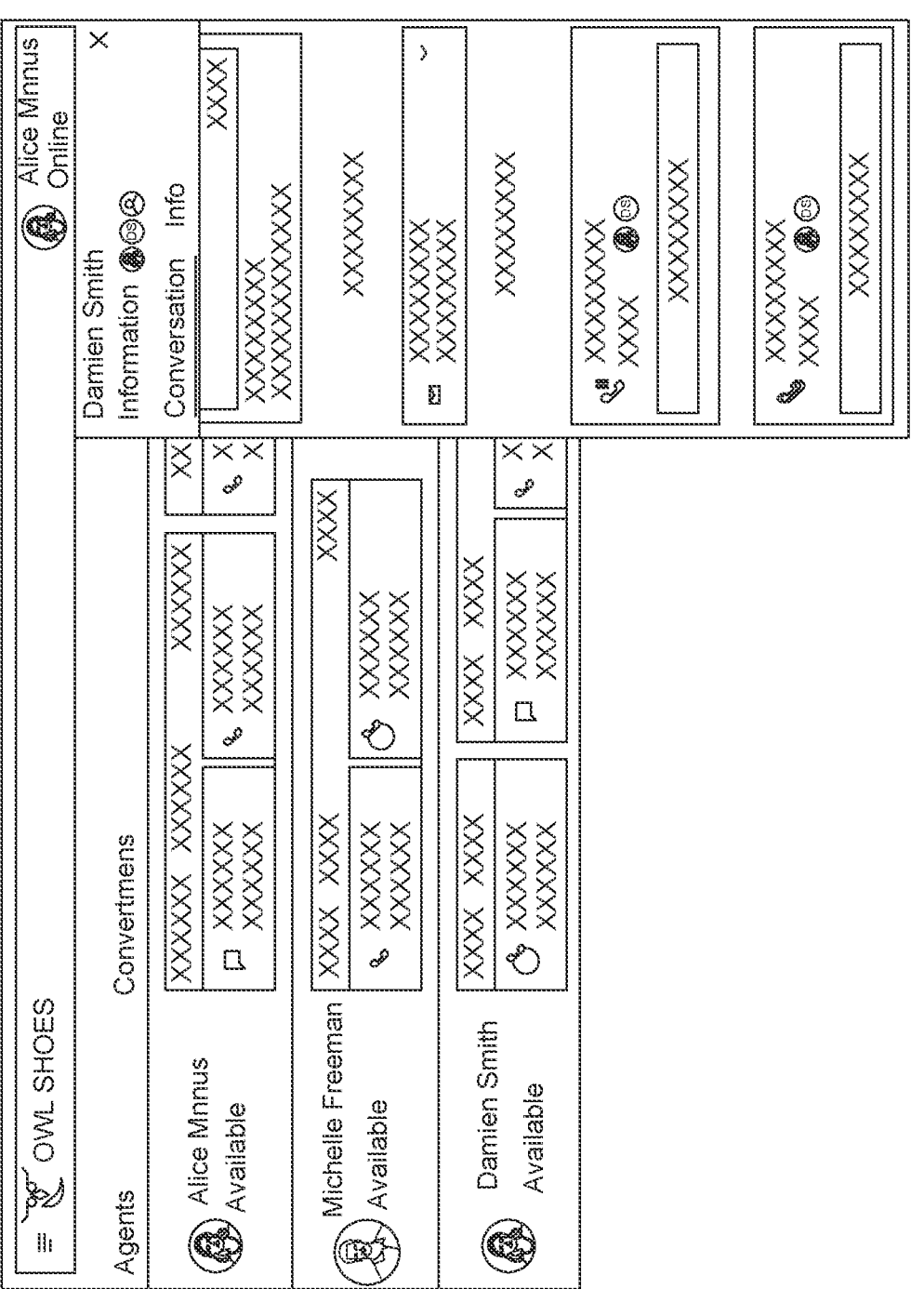

More specifically, in the mock-up depicted in FIGS. 53A and 53B, looking at Michelle will give you a sense of what Justine sees while Michelle was connected with the Store while Damien was waiting on hold. Justine can get access to listen or monitor the interaction which provides her with all the details.

Supervisor: Queue Views

As mentioned before, Justine is also partially responsible for the customer experience and therefore has a specific Queue View which gives her insight into all ongoing Interactions in the contact center (or part of the contact center).

As incoming traffic gets routed through various queues, the Queue Summary as shown below provides her a real-time view into the number of interactions currently waiting, the longest waiting interaction, and Service Level details.

Figure 54:
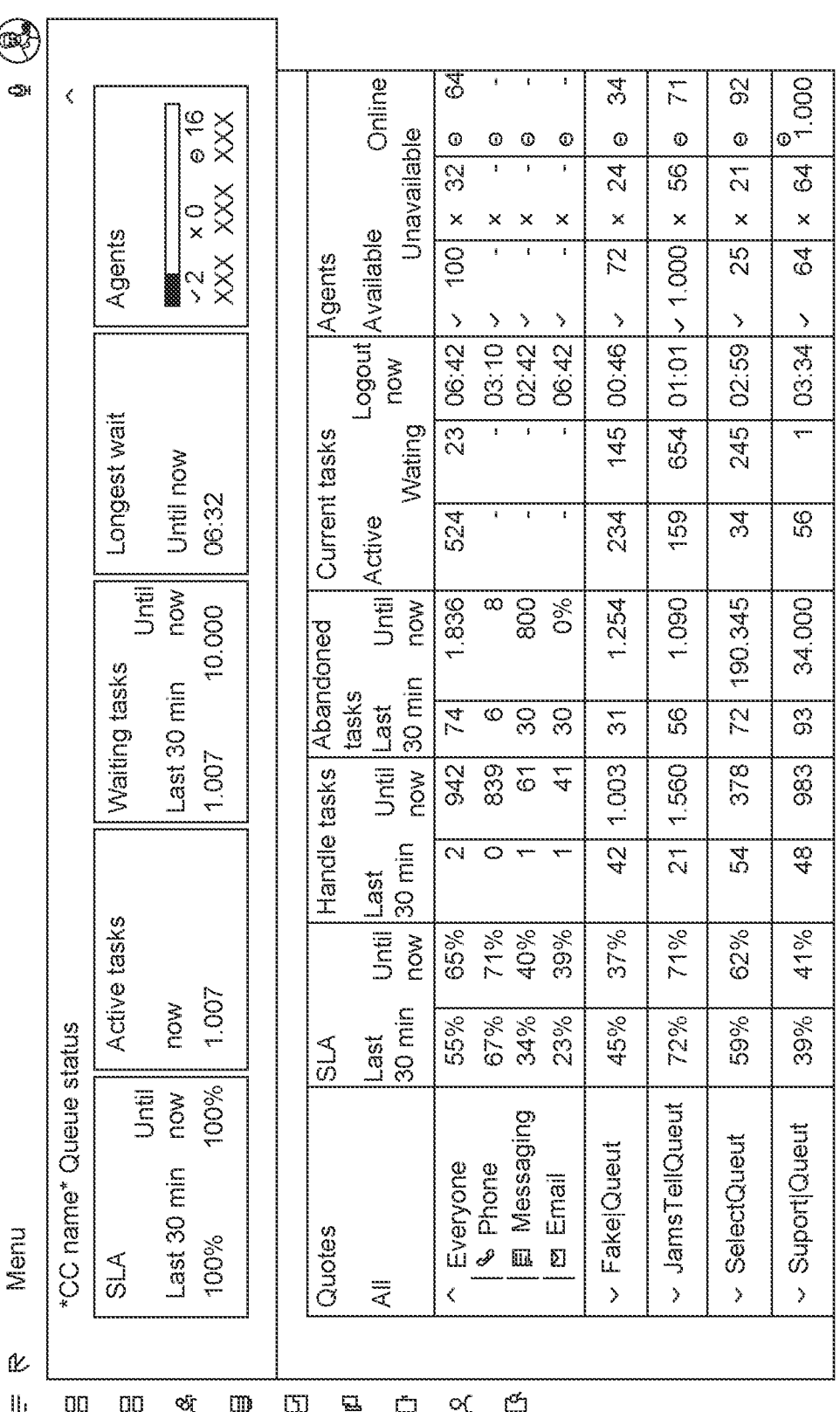

As depicted in FIG. 54, the Service Level information reveals how each of the communication channels per queue are performing. For example, the service level of 71% shown for Phone under the Everyone Queue in the image below, indicates that 71% of the Phone Interactions have been answered within the configured wait time. As Justine knows that 80% is their end of day goal, she knows she needs to keep an eye on this queue and the users that are working this queue and potentially take remedial action to ensure that this number increases to reach the 80% goal for the day.

Justine has different views that allow her to look at data from all angles, a high level view of queue performance as shown above or a view that gives access to more detailed information related to a specific queue. Additional views are available to show real-time information related to:

Queue Detail View;

Skills based View;

DNIS (Dialed Number) Performance; and/or

Disposition Codes

All the above views are providing Justine and her colleagues insight into what is happening, the performance of the contact center overall and to address issues and potential problems as quickly as possible. The data shown on any of these real-time views should be up to date <3 seconds after the event took place.

Developer Experience

Although the Interactions developer experience is still emerging, a primary goal is to provide a cohesive environment for frontend and backend developers to add and extend the use cases described earlier. Both agent and supervisor functionality will be available for creating bespoke applications and workflows.

Developers will interact with Interactions in the following ways.

At the system's UI layer, to modify how the default system components are displayed to end users;

At the SDK layer, so implementing applications (such as a front-end or a customer-developed application) can display Interactions with a custom user interface;

Through event triggers, to receive notifications about lifecycle events within an Interaction; and/or Through a REST API, to create new Interactions, manage Channels and Participants, and initiate communications.

While Interactions will expose standard concepts in a Communications Infrastructure (like sending a message), developers will not engage through the core primitive communications APIs. To maintain cohesion in the Interactions Detail Record, Interactions will require developers to interact through a dedicated control plane.

Developers will also be able to add custom interaction types. These 'Custom Channels' may represent additional communications channels that are not natively integrated into the system, or they may be used for other work that may be routed to an agent.

Technology Partners are expected to use these same interfaces when integrating with Interactions. The event triggers, or some version of a live data stream, will be the primary interface for Workforce Management and Analytics partners.

Key Capabilities

Interaction Detail Records (IDR)

Behind Interactions sits a well-defined data model called an Interaction Detail Record (IDR). IDR is a representation of the Interactions from being created until closed. It is a cradle-to-grave view, highlighting who did what and when. Although IDR's may be defined to address specific contact center needs, they are not exclusively for Contact Centers. Any organization communicating with customers will have a set of requirements and measures they expect to get out of their communication platforms and IDR will address these requirements.

Each Interaction consists of participants that represent the parties in the interaction that contribute to the communication channel. Examples of participants are External (customer), User (e.g., agent), IVR, Queue. Bot, or System. Participants communicate using specific channels which are represented in the data model of Interactions. An interaction maintains a roster of one or more participants which each may be connected to one or more channels. With each state change, more granular segments demarcate noteworthy differences in each timespan, such as when the state of a voice channel goes from talking to on hold.

Segments are the atoms of an interaction. In example embodiments, the system may be configured to incrementally build a detailed record view in real/near-real-time as each segment occurs. Each segment contains a collection of attributes/dimensional data specific to that level of the detail record hierarchy (e.g., ANI/DNIS/email, state, queue id, team id, user id, direction, disposition code, disconnect reason, etc.). Each segment may intrinsically carry specific context and information to support very granular drill-down.

For example, the agent segments convey relevant identifiers (e.g., queue, user, interaction, and disposition codes), channel actions (e.g. when did the agent put the customer on hold), and state changes (e.g. when an interaction becomes inactive). Another example is the system participants such as ACD/queue. For these participants, segments may contain a record of the routing decisions employed in order to get the interaction routed to an agent (e.g., skills-based routing). As a final example, the IVR/bot participant can also include important context (e.g. id/version of the bot employed in that interaction and which conditional/control branches the customer traversed and when, etc.).

In summary, every participant in an interaction may play a particular role and generate unique segments that are captured in an IDR for storage and further analysis.

Figure 55:
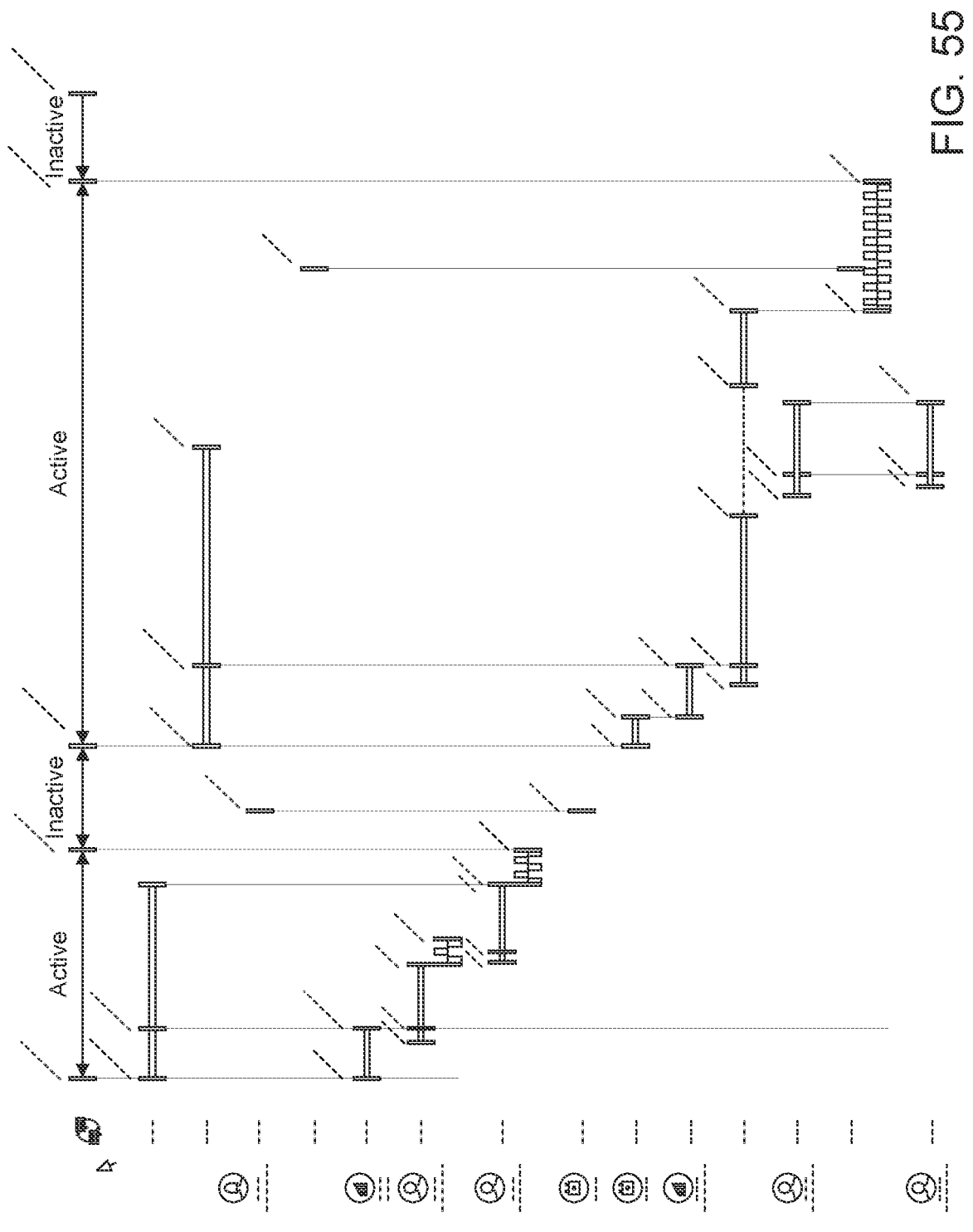

FIG. 55 depicts an example visual representation of the example Interaction from Damian to Owl Shoes.

Events

To support Interactions, a comprehensive set of events either coming from an Event Stream or 3rd party integrations may be provided to enable users to consume it from a single source. Events received about a channel are interpreted and metrics are derived from it. Let's look at a specific example, a customer who hangs up the phone. This single event can be interpreted differently and could result in it being counted against a different metric depending on the state of the Interaction. If the Interaction would be connected with an agent it would result in a normal finish/end of a voice call and result in this event being counted as such. On the other hand, if this Interaction was waiting in queue when the disconnect occurred it would result in counting it as an abandoned call.

Metrics & KPIs

Metrics are a defined set of measures that are derived from the various state changes that take place during an interaction (e.g. join/leave of certain participants, time duration between important milestones, etc.) These are distinct from KPIs which represent higher-level calculated success criteria/measures (e g, answer time is a metric whereas service level is a KPI derived from that metric).

An interaction may produce any number of metrics during its lifetime. These are derivable from detail records and are a different, numbers-centric view of the same underlying data. A metric's usefulness will also be enhanced by accompanying it with a collection of as much dimensional (attribute) data as possible when it is born just like in detail records. Example:

Metric ACD Wait Time;

Value: 40 seconds;

Timestamp: when this metric occurred; and/or

Dimensions: queueSid=123, skillSid=456, channelType=voice, interactionSid=abcdefg, etc.

Dimensions are used to scope a metric, handle time for a specific channel versus handle time for a participant.

There is a core set of metrics that may be expected in many basic contact center workflows. Given the number of metrics that can exist, a consistent set of types and naming conventions are key to make it easy to quickly understand what it is about.

(Timer): represent a duration of time in milliseconds. All timer metrics will be named starting with the letter 't' e.g. tHold for how long an agent put an interaction on hold;

(Counter): represent a count Start with the letter 'n' e.g. nHold for many times an agent put an interaction on hold; and/or (Observation) These are meant to be a numeric value representing the state of the world in that moment. Observations will start with the letter 'o'. e.g. oWaiting.

Metrics will be emitted born as soon as they are known. Nothing is buffered/held back (e.g. no waiting until the interaction has ended to start emitting things like answer time) and all data should be thought of as immutable. More than one metric can be emitted at the same time (e.g. both "hold time" and "number of holds" will change at the same time). Metrics within a given interaction can occur at any time and do not all need to all happen at once. You may even see more than one occurrence of the same metric within an interaction (e.g. if an agent puts the customer on hold three times, there would be three distinct occurrences of tHold to correspond to each instance the agent held the customer on a specific channel).

In this model it is obvious that a time for a specific segment is not accounted for until the segment itself has finished. For example, tHold would not be updated until the Hold Segment itself has closed. Metric values do not "heartbeat" on an ongoing basis—they come to fruition when they are complete and fully known.

Metrics and KPI's are exposed and used by customers in different ways: real-time vs historical, push vs pull Realtime Data An example use case is for users to show real-time information in specific dimensional views that present data based on for example Queues or Agents (several other dimensions available as well). This information presented in these dashboard will be used to operate the contact center and gives the Supervisors/Contact Center Managers insight into what is happening in real-time and supports them in making business decisions. Another key element of real-time data is the ability to use it for routing decisions. An example would be the ability to play a specific announcement if wait time is above a certain threshold or redirect traffic once a queue is overloaded. As these metrics are used to immediately react to changing circumstances it is important that these real-time metrics are updated at low latency (<3 s).

In order to provide the operations team with recent summary/trending metrics, the system may be configured to aggregate certain metrics. For example, the system may aggregate information pertaining to how many voice calls, chats, emails it has been receiving today and determine whether these volumes are comparable to what the system has usually been getting up until the current time (or a specified time).

The Queue Flow, as shown above, is just one example of a real-time view that will expose metrics used by the contact center operations team to make business decisions Other examples may include different views that expose metrics based on different dimensions. User View, Team View, Skills View, DNIS View are all examples of real-time views the system may be configured to drive off of this single set of data.

Historical Data

In order to support summary and trending data, the system may be configured to blend the worlds of realtime and historical data. By looking at what is happening right now in combination with what has happened recently the concepts start to overlap. The difference between realtime and historical data may be just the timeframe the system is configured to look at. This approach guarantees that calculations for real-time and historical metrics are done based on the exact same formulas ensuring data integrity between the 2 data sets Metrics can be aggregated based on different periods, hourly, daily, weekly, monthly or yearly basis and give users the tools needed to understand what is and has happened.

Dimensions will be used to slice the data by whatever angle a consumer wants to get the data. Whether a contact center manager is looking for just Queue data, Queue by Agent or Agent by Queue . . . all of these are available based on the IDR data set outlined above Routing Interactions In a Contact. Center, each communication is first classified, e g, in an IVR—'Press 1 for Sales, 2 for . . . '—and before an agent is assigned to handle an interaction. During the classification process, as much information as possible is gathered to get more context for the intent behind the communication. Once it has been classified, e.g. into Sales, Billing, or Support, that information is used by routing to find an agent who can handle the need with consideration for optimizing the customer experience and cost to the contact center.

In its simplest form—ACD routing—the longest waiting interaction is assigned to the longest waiting (idle) agent. If no agent is available, the interaction is placed into a queue, waiting for the next agent to become available.

With the Interactions available, priority can be given to Interactions based on criteria, such as high-value customer, repeat caller, etc. As part of the routing, Interactions with higher priority can then be assigned first, e.g., to reduce the wait time for the most valuable customers.

Today, the majority of Contact Centers have adopted some level of skills-based routing. For skills-based routing, agents are no longer just selected based on how long they have been idle. Agents are being assigned routing attributes, such as language skills, product knowledge skills, and function (sales, billing, support). With such information available for every agent, and the information available from classifying an interaction, routing logic can much more accurately determine and select the agent who is best suited to handle a given interaction.

What routing strategy Contact Centers employ can vary to a great degree; some will put a greater emphasis on reducing wait times for their customers, others will accept longer wait times to optimize the matching of an agent to an interaction based on skills or other attributes.

Routing of Interactions isn't limited to real-time channels such as Voice or Video. It is being utilized across all channels, synchronous and asynchronous, and also for non-communication channels, such as tickets, work-items, etc.

Comparing Interactions and Taskrouter

TaskRouter Tasks are a single touchpoint (transaction) centric primitive, that, once a Task has been created, is tied to the channel it was created on. The Task primitive is also overloaded in that it carries customer data, routing data, and media information all in a single entity.

Most importantly, many complex customer issues can only be resolved over multiple touchpoints, requiring a container for the history of those touchpoints and to connect them for a holistic view, until the customer issue has been addressed and resolved.

In today's Task-centric model, only touchpoints that require an agent will result in a Task that is then routed to an agent. And every such touchpoint will result in a new Task that isn't connected to previous Tasks that were created to address the customer's issue.

With Interactions, a new touchpoint will either result in a new Interaction or be associated with an existing interaction, offering a complete picture for the agent/associate/representative on the customer's issue and attempts to get it addressed and resolved.

In an omni-channel world, customers frequently start on one channel, and then move to another channel when that channel can better serve the customer's needs to get their issue resolved e.g. cobrowse. In a Task-centric world, that meant multiple Tasks that each required its own orchestrated handling. With Interactions, adding and orchestrating another channel is all available from the same Interaction, ensuring that agent, supervisor, and administrator, are presented with a holistic view of the customer's issues. Furthermore, Interactions greatly simplify the orchestration of all channels. Transfers on digital channels don't require spawning a new Task, instead, the entire Interaction can be transferred to another agent, regardless of the channel, and regardless of one or more channels being used at the same time.

Differences Between Interactions/Conversations

This section outlines the feature difference between Conversations, Interactions, and CEM. Let's look at the definitions first.

Interaction:

An interaction represents a single work item that needs to be processed. It represents a contact between an entity representative and a customer related to the same or a similar topic. Interactions are channel-agnostic and may represent voice, web chat, SMS, WhatsApp, Email and can multiple channels simultaneous. Interactions support multi-party conversations Conversations:

The Conversations API facilitates live message and file exchange between multiple participants on supported channels (SMS, MMS, Whatsapp, in-app chat). The API is explicitly focused on facilitating active communication. Conversations aspires to add e-mail support, provide search tools that enable discovery of ongoing and archived conversations, and to include non-message "events" in the timeline like "participant added to the thread."

CEM(Journey): As per the latest proposal

CEM Journey is about the customer life-cycle and total context of the customer incorporating all the communications throughout the life time. A journey would be one or more interactions as well as other, non-interaction data. This view of a customer lifecycle spanning over several specific encounters (interactions) can give broader context to an agent about the customer and be used to build UIs such as Nike's.

CEM (Context Store)

Context Store is the storage of messages, conversations, events, timelines, and the relationships between these items on a timeline. Interactions would add to the Context Store allowing customers to see journey information that includes Interaction and non-interaction data.

[Note: Interaction Detail Records are different from the context store in its near/real-time requirement, its structured data model and a defined start and end-time.]

To date, the biggest gaps identified between Interactions and Conversations with the current proposal are lack of following. See more details in the table below.

1. Real-time structured data,
2. Custom channels;
3. Invite Model;
4. Voice;
5. Permissions/RBAC; and/or
6. Defined end-time

| Feature | Interactions | Conversations |
|---|---|---|
| Contact Center API, Orchestrations | Interactions have support for common Customer engagement centric Actions/ Verbs. These operations are often complex, causing a domino chain of subsequent behaviors in the application. Some contact center customers might still have cc verbs. For example:: Warm/Cold Transfer External Transfer Listen Coach Monitor Barge Cherry Pick (Manual Assign) Interactions understands above verbs and translates them to channel specific actions. Interactions won't expose Channel specific SID's (no customer access to voice/chat/whatever specific SIDs). All control and programmability of media channels is done via Interactions | The Conversations API provides simplex operations (one AP call, one synchronous consequence) over the set of participants, the messages, and the metadata about any of the above. Interactions supports the specific application space, this is not what conversations will support. [Note:]For multi-step orchestration |
| Support for Voice channel | Interactions will support Voice channels through the use of Conference primitive | Conversations aspires to provide Events on the timeline of each conversation, to represent things like "call started" for example. Conversations will not be a control plane for any non-Messaging communication medium. |
| Contact Center Metrics | Interactions Detail Record (IDR) will provide an end-to-end view of a customer contact related to the same contact. This might include one or multiple touch-points across 1 or multiple | Conversations does (and aspires to do so further) provide data related to API limits, API utilization, and bill clarity. These are to support debugging of a new build, and subsequent application monitoring primarily. |

-continued

| Feature | Interactions | Conversations |
|---|---|---|
|  | channels all included into a single IDR Record. This single IDR record is used as the single source for all metric calculations both in real-time and historical. All Standard Contact Center KPIs are derived and calculated based on the IDR. |  |
| Invite/ Routing Model | Interactions are offered to users (agents) when available and eligible to receive them. Users can accept/reject Interactions. Accepting an Interaction results in them becoming an active participant (added as a participant to the Interaction/Channel). Optionally Interactions can be offered to multiple agents at the same time (multi-alert) whereby the first agent to accept the Interaction will become an active participant. | Conversation has no offer model and the product has no intention to add this in the future. It does not provide a mechanism for a first-party participant (e.g. an agent in a browser) to reject. |
| Lifecycle | Interactions have a defined status "Active", "Inactive" and "Closed". Closed Interactions cannot be reopened again to avoid reporting problems. | Conversations have similar defined states as Interactions and the same "Closed" limitation applies. |
| Direction | Interaction supports specific directional attributes on how the Interaction got started. | In the Conversations API, there is no enduring notion of an "inbound" conversation or an "outbound" conversation. There is also no enduring notion of a conversation being "an e-mail conversation", for example, even if the active participant list makes that pragmatically clear. |
| Custom Channels | Interactions support "Custom" channels to allow routing of any type of work. An example of a custom channel would be the creation and routing of a 'Zendesk'. The creation of a ticket in a 3rd party system could trigger the creation of an Interaction. An interaction is created to represent the ticket that needs to be worked on and get routed based on details coming from the ticket (Queue, Skills, etc). Once the agent has accepted the Interaction they can see the details of the ticket (embedded or screenpop) and can potentially use additional channels like voice to reach the customer. | Conversations intends to support Events for noting non-message activity (e.g. call started). Conversation also intends to support non-messaging channels. Today, the Conversations API supports neither of these. The timeline for either advancement is unclear. |
| Associated Resources | Interactions allow for linking of specific internal resources to an Interaction. Example of these resources are: Voice Recordings Chat Transcripts Voice Transcripts Screen Recordings Quality Management Data | Conversations data model doesn't have a place to capture this information. |

| Feature | Interactions | Conversations |
|---|---|---|
| | Survey Data<br>Pay Data<br>Video recording<br>Custom<br>Notes/Disposition<br>Codes | |
| Support for Participants without "active" channel | Each Interaction has 1 or more participants, each participant can have 0 or more channels.<br>A specific use case that requires 0 channels is After Call Work (ACW) whereby an agent has finished communicating over any channel while still active on the interaction. | A Conversations Participant always has exactly one channel, representing the way they are in contact with other participants at the moment. |
| RBAC Control | Access to Interactions are controlled by RBAC. For example, who is allowed to monitor a specific interaction. | Conversations has a role-based access model that governs the SDKs. These permissions and roles are assigned explicitly to Users, and do not consider any RBAC-related implications from the wider system environment. |
| After Call Work (ACW) | The Interaction data model allows for capturing important contact center data like After Call Work (ACW). ACW time is time an agent spends after they for example have finished a call but are finishing the previous Interaction. This time is accounted for as part of "Handle Time" and therefore needs to be captured correctly. | Conversations data model doesn't have a place to capture this information. |
| Multimedia | Interactions leverage Conversations for Multimedia support like photos, videos, and other file types seamlessly across supported channels | Conversations support Multimedia like photos, videos, and other file types across messaging channels. Adding media or an attachment to a Conversation always has a side-effect: that media is immediately delivered to all participants. |
| Classification | Classification is a process upon which an Interaction is being assigned context attributes, such as language, product category, etc., which are used for routing. | Conversations provides a schemaless "attributes" bucket. This is not searchable, but does appear in webhooks related to the object. |

Contact Center Personas

Contact centers are run and operated by agents, team leads, supervisors, Managers, administrators, and developers. The table below captures their top responsibilities and needs to make them successful. Additional personas in the contact center do exist (e.g., Quality Manager, Quality Evaluator, Resource Planner, Training Manager, etc.) but these persons profiles have not been created yet.

| Persona | Responsibilities | Top Needs |
|---|---|---|
| Agent (e.g., "Andy") | First line of support for helping customers. To perform their job, Andy usually requires multiple applications that include contact center console, CRM, and a knowledge base. | Right information at the right time<br>Guidance on solving customer issues<br>Easy way of escalating or consulting team lead or supervisor<br>Real time visibility of agents' work and channel |
| Team Lead | Tammy is a subject matter | |

-continued

| Persona | Responsibilities | Top Needs |
|---|---|---|
| (e.g., "Tammy") | expert who helps supervisors de-escalate cases, and monitors and trains and coaches agents. | traffic<br>Agent monitoring tools to proactively find ways of managing escalations and agent stress levels<br>Easily communicate with agents |
| Supervisor (e.g., "Suri") | Suri manages contact center resources which include agents, queues, workload, and training. Suri is responsible for meeting the goals of his contact center. | Real time visibility of agents' work and channel traffic<br>Manage queues to spread traffic to all agents<br>Easily communicate with agents and external departments<br>Reviews and evaluates performance of groups of agents (Teams). |
| Manager | Conny is responsible for | Measures and drives |

-continued

| Persona | Responsibilities | Top Needs |
| --- | --- | --- |
| (e.g., "Conny") | increasing contact center efficiency, quality, and margins | contact center to meet defined KPI's Evaluates and reviews overall contact center performance. Digs into historical data to understand patterns and make decisions to streamline the operation. |
| Administrator (e.g., "Adam") | Operation lead for the platform - not just the contact center application but all services and application required to run the entire contact center | Clear and comprehensive documentation Technical support Close collaboration with supervisors and operations |
| Engineer (e.g., "Felicity") | | |

Operating Contact Centers

This section introduces a high level view of what a contact center is, how it operates and the various personas involved to achieve smooth operation. It is important to understand various aspects of operating a contact center to better understand the features that are required. If you are familiar with contact centers operations and prominent features, you can skip this section.

Figure 56:
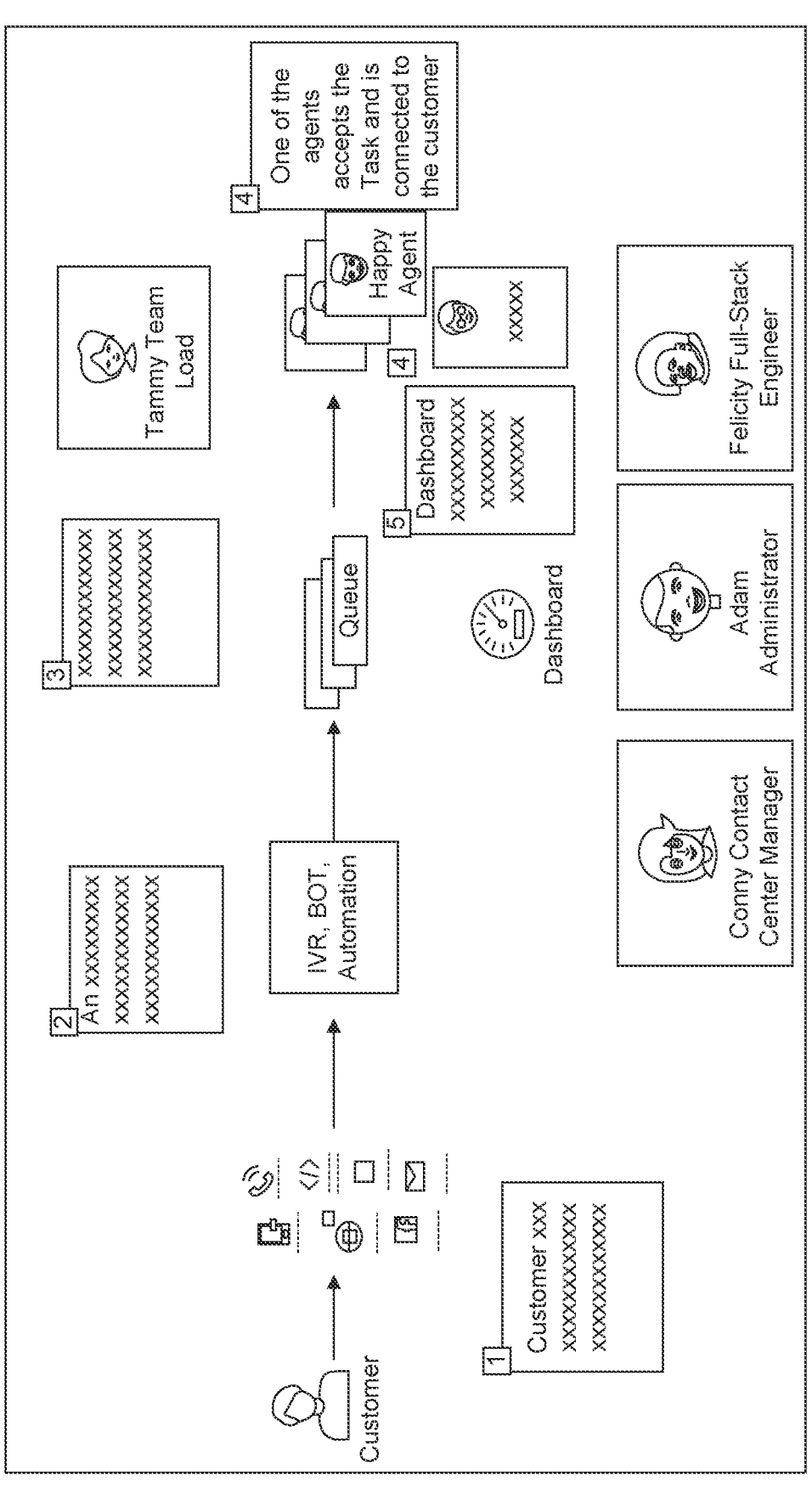
FIG. 56 is a block diagram depicting a contact center.

Contact centers are typically the first point of contact for customer inquiries. Prior to the advent of the internet and the digital revolution, contact centers were only reachable by phone. Today however, other channels that include SMS, Whatsapp, and Email are a common way of reaching the entity Making these channels available allows the contact center to run more efficiently and provide a differentiated customer experience. FIG. 56 depicts an example contact center.

Contact Center Integration

Contact center applications almost never run standalone. They are often deployed along with 3rd party applications and integrations all of which are designed to maximize efficiency.

For example, a Contact center integrates with a Workforce Management (WFM) solution vendor to gain insights into which and when agents are needed to maximize contact center operation efficiency.

Other needs include the ability to integrate with back office reporting applications that tie an entity's customers with all the communication history.

Glossary of Terms

ACD—An automatic call distributor (ACD) is a system that distributes work (interactions) to a specific set of agents based on availability, utilization, skills and other routing criteria. An ACD uses a rule based configurable strategy that dictates how interactions are matched with the right users in an organization. An ACD has a built-in queuing mechanism in case there are no users available to handle the work that needs to be assigned.

ACW—After Call Work is the period that an agent may spend on activities after handling a customer request. ACW may be configured to a maximum duration for an agent to complete this work or a contact center may completely omit ACW so agents can immediately attend other requests.

ANI—Automatic Number Identification is the caller ID of the caller placing the call Business—A for-profit or non-profit organization that will deploy the system to deliver customer engagement solutions to their end-customers. Businesses are a type of entity. Entities may also be referred to as a Customer or user in some places.

Customer—An end user calling an entity to get help.

Agent—usually an agent within the contact center, but may also refer to a "business representative," "entity representative," "representative" or "associate" or any personnel that is designated to have an interaction with a customer.

Disposition Code—Disposition Codes, also known as wrap-up codes or activity codes, are labels applied to interactions in a contact center to categorize or describe an interaction. Contact center agents provide a disposition code at the end of their work on a specific Interaction to indicate type, reason, or outcome for the Interaction. Disposition Codes data is exposed through real-time and historical data and is used by a contact center to make well-informed decisions.

DNIS—Dialed Number Identification Service. It's a service that helps the call receiver identify the number that the caller dialed.

Handle time—Handle time or average handle is an important contact center KPI that reflects the average length of time to handle a customer request.

Omni-channel—Omni-channel is about providing a consistent and contextual experience across one or multiple customer touch points Omni-channel creates a seamless cross channel, customer centric approach to communication with an organization.

Interaction—An interaction is a single work record for all the ongoing conversations over one or multiple channels between an entity representative or a system and the end customer, data needed from different systems/applications to support the topic or from other entity backend operations that can bring information to help provide personalized, contextual customer engagement. Flex interactions will allow entities to build structured, directed communication workflows with capability to address reporting and audit needs. It will support all digital channels including email as asynchronous channels through Twilio unified omni-channel Conversations API model. Flex interactions will also support custom channels allowing entities to route any piece of work in an organisation while providing context and a holistic view of each and every touch point for a customer.

Interaction Detail Record (IDR)—An IDR is a representation of the Interactions from being created until closed. It is a cradle-to-grave view, highlighting who did what and when Workflows A Workflow describes a process to complete a repetitive task and contains Blocks. A Block can either be a Compound or Core Block. Compound Blocks can contain any number of other Compound Block and/or Core Blocks. In example embodiments, Core Blocks are atomic in that they cannot be broken into smaller pieces within a Workflow.

In example embodiments, each Core Block is an individual instruction within a Composer's Workflow. These primitives may be used as building blocks for Compound Blocks that will be created for Low Code editors or custom customer code. Note, in example embodiments, Core Blocks are treated no differently codewise from Compound Blocks. The logical distinction between the two types of Blocks may be for conversation clarity. Core Blocks are "ideally" the smallest instruction possible (e.g., an instruction that can't be decomposed into smaller blocks). The system must correctly identify the smallest instructions as we will limit the number of Core Blocks that can be executed within a single Workflow.

Compound Blocks are logically distinguishable from core blocks in that they may be made up of other blocks. For example, Compound blocks can be made up of other compounds and/or core blocks.

Workflows/Flows Workflows contain a series of blocks that are necessary to complete a customer task. For example, a customer might want a Workflow that connects end customers making incoming calls to the last known representative they've spoken to. Customers can accomplish this task by setting up a workflow. In example embodiments, workflows may be definitions (e.g., JSON definitions) with a predefined set of blocks to execute on a given trigger. Also, Workflows differ from Blocks in that Workflows may have one or more triggers and/or one or more global contexts.

Figure 57:
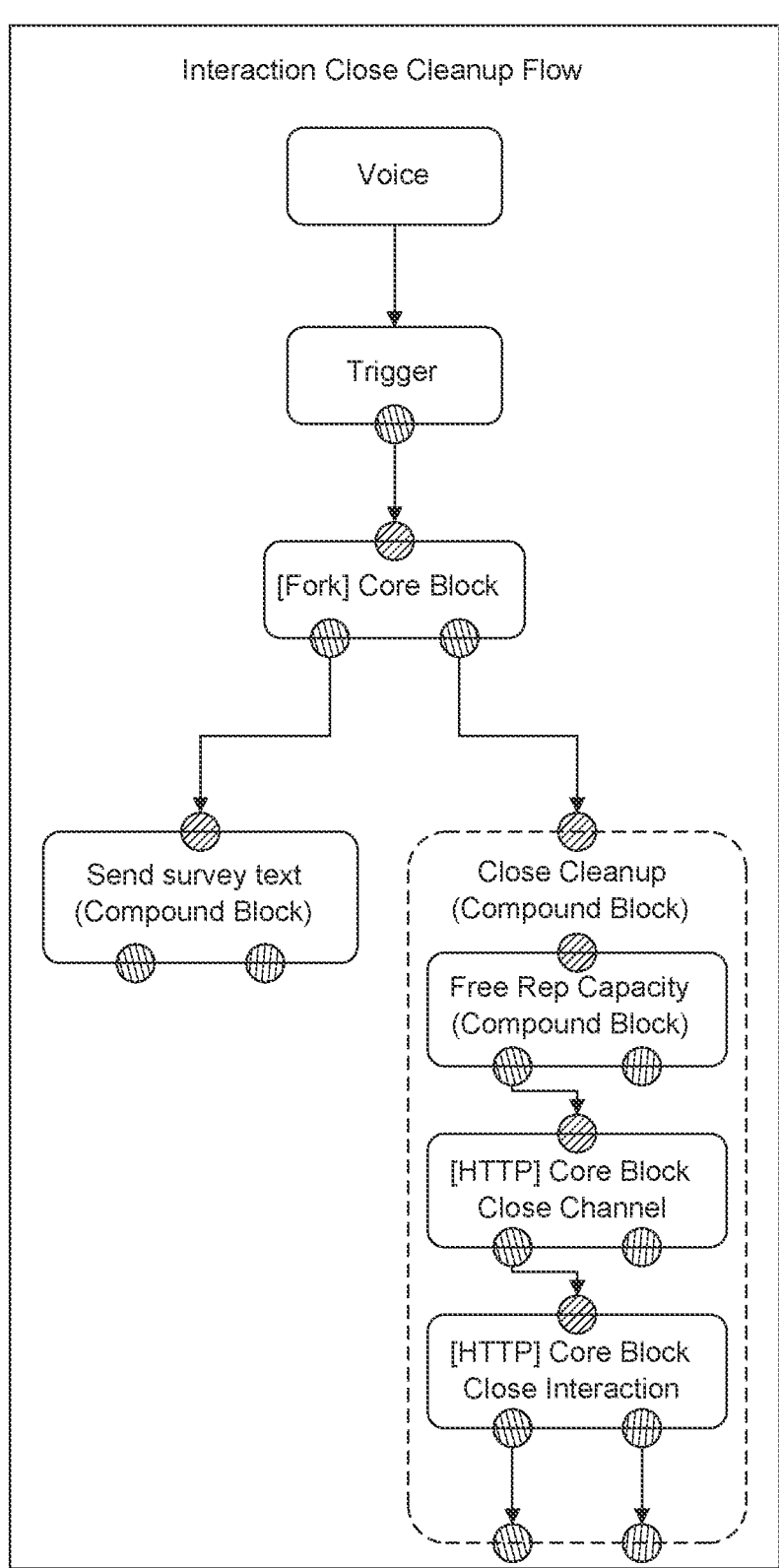
FIG. 57 is a block diagram illustrating workflow that includes a compound block for a workflow for cleaning up an interaction when the interaction is closed.

FIG. 57 is a block diagram illustrating workflow that includes a compound block for a workflow for cleaning up an interaction when the interaction is closed. In example embodiments, a communication (e.g., a voice communication) is analyzed for a trigger. Detection of the trigger initiates a core block of the workflow. The Core block has a fork. At a first branch of the fork (e.g., at a first compound block), survey text may be sent. At a second branch of the fork (e.g., at a second compound block, alternative steps may be performed for cleaning up the interaction when it is closed, including sub-steps for freeing capacity (e.g., a third compound block), closing a channel (e.g., a second core block), and/or closing the interaction (e.g., a third cord block).

Figure 58:
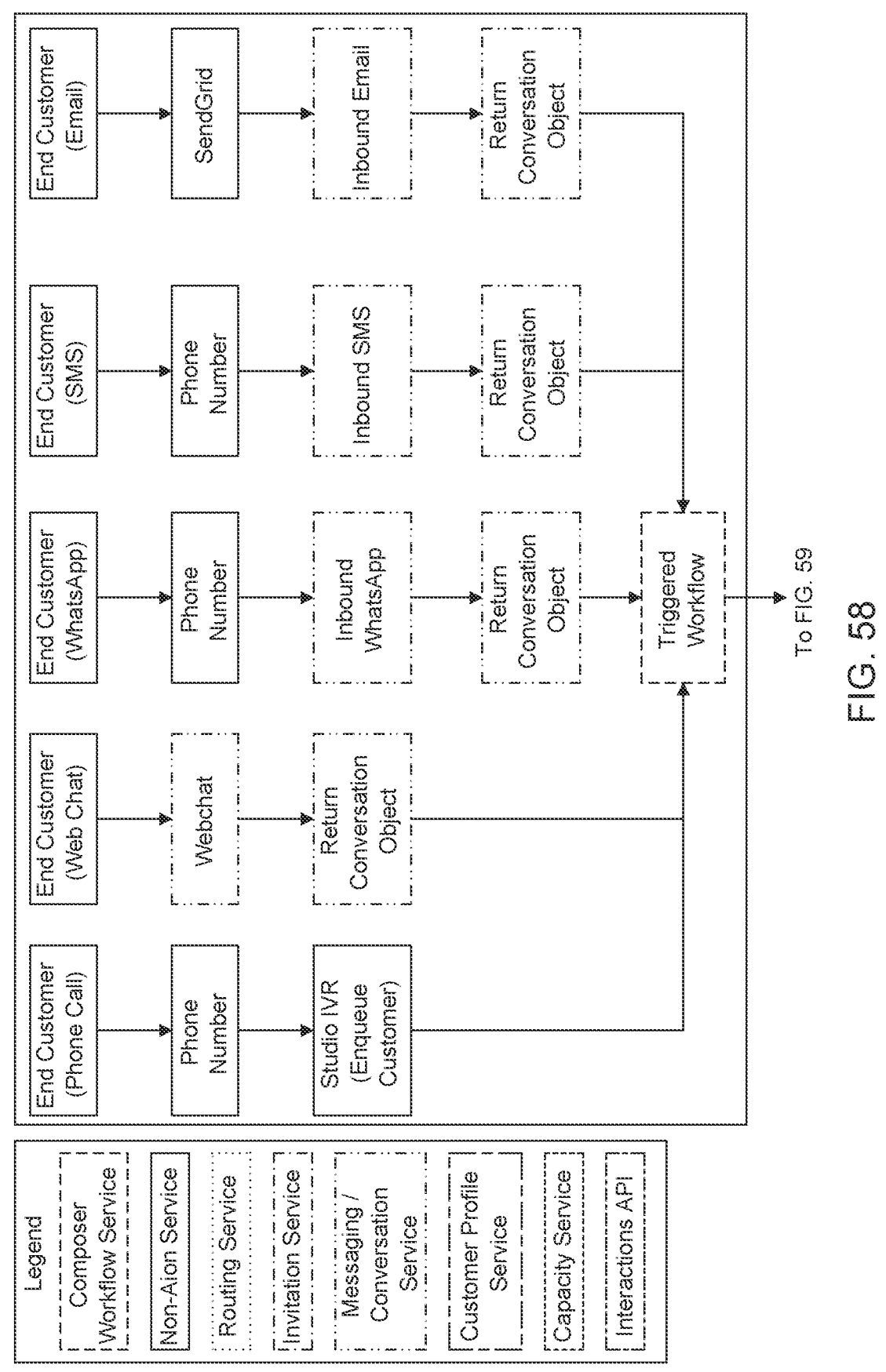
FIGS. 58-60 are block diagrams illustrating an example of how end customer interfaces may interact with services of the system to trigger a workflow.
Figure 59:
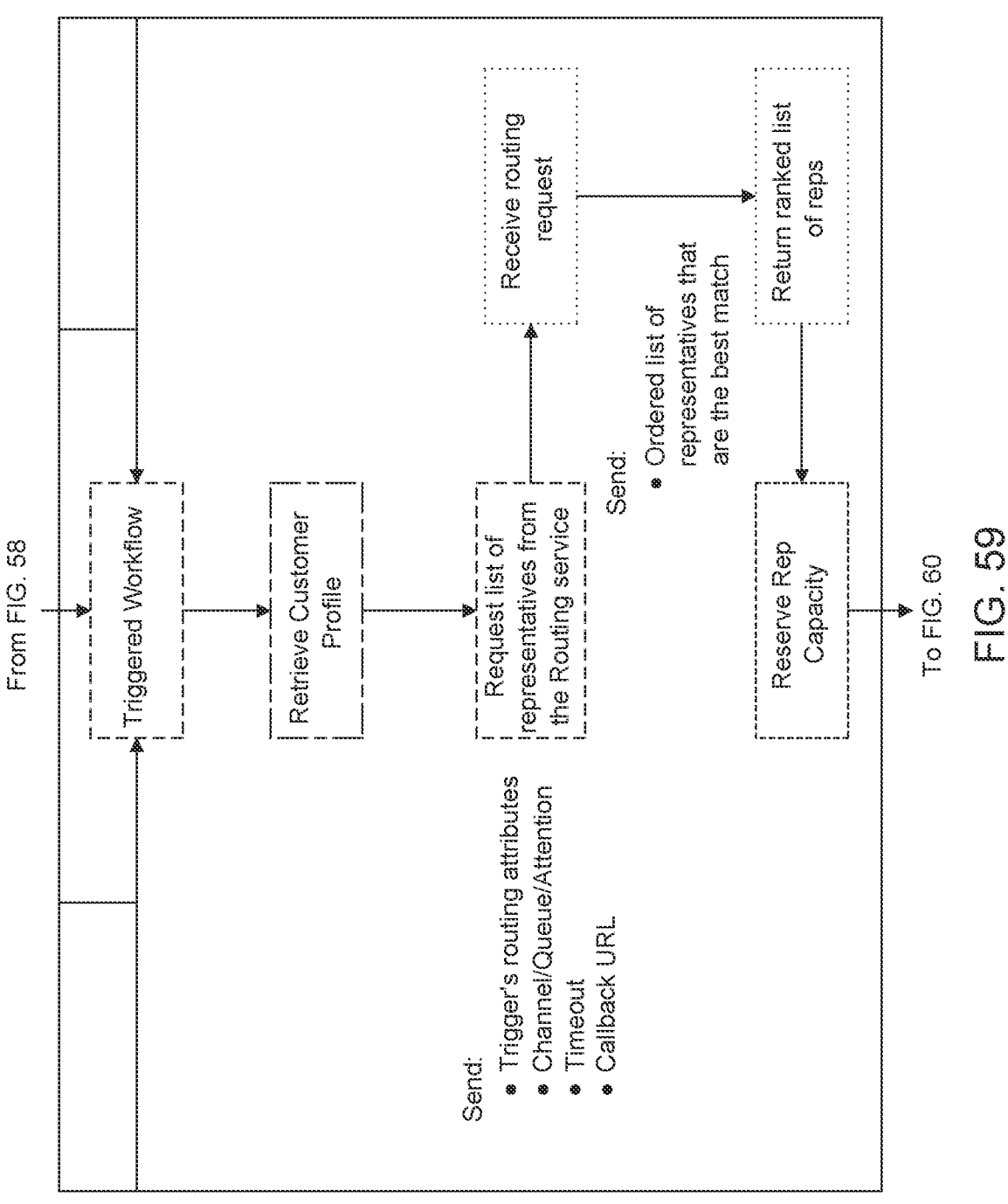
Figure 60:
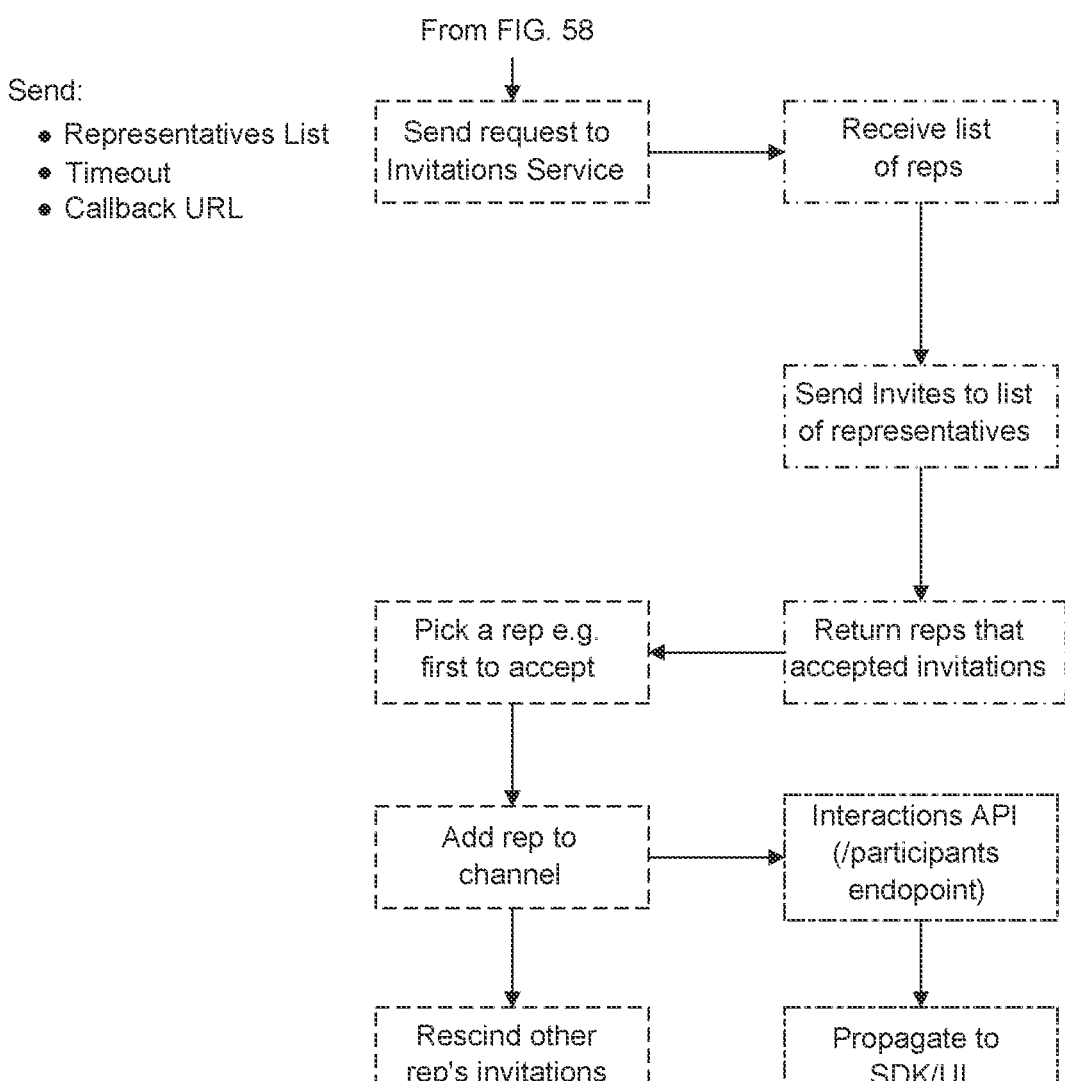

FIGS. 58-60 are block diagrams illustrating an example of how end customer interfaces may interact with services of the system to trigger a workflow. The depicted services include one or more composer workflow services, external (e.g., non-system or custom services), routing services, invitation services, message and/or conversation services, customer profile services, capacity, services, and interactions services, as indicated by the legend, each of which may include one or more APIs. As indicated, a workflow is triggered based on data objects associated with one or more communications with the end customer over one or more channels (e.g., phone call, web chat, WhatsApp, SMS, and/or email channels). A profile of the end customer is retrieved. A request for a list of representatives is sent to the routing service. The request may include one or more data items related to routing attributes, channels, queues, attention, timeouts, or values of other parameters, as described herein. A routing request is received. A ranked list of representatives is returned, such as an ordered list of representatives that are the best match, as described herein A representative's capacity is reserved. A request is sent to an invitation service. The request may include a representatives list, a timeout, and a callback URL. A list of representatives is received Invitations are sent to one or more representatives in the list of representatives. A list of representatives that accepted the invitations are returned. A representative is selected from the list of representatives that accepted the invitations (e.g., the first representative to accept). Invitations sent to other representatives are rescinded. The selected representatives is added to a channel. The interactions API is invoked (e.g., at a participants endpoint) Data relating to the interaction is propagated to a user via the SDK and/or a user interface.

In example embodiments, Blocks are the building blocks of a Flow They can be either core (e.g., most fundamental/ primitive/unit of operation) or compound (e.g., built from other core/compound blocks). In the context of the system's execution engine, core blocks may be actual code (in Temporal land, Activities). In contrast, compound blocks may be provided as a domain-specific language (DSL) library that is interpreted and executed one core block (Activity) at a time.

FIG. 61 is an example code listing of an example block definition. In example embodiments, each block may have a version number. When a customer (or a Compound Block) uses a Block, the customer may specify the version. This allows the system to modify/update a Block without breaking existing Flows. In example embodiments, Core Blocks are the underlying set of primitives that Flows and Compound Blocks will combine to provide users with easy-to-use functionality. These core blocks may be flexible enough to cover any use case customers want to create within their workflows. In example embodiments, a block in the executing status cannot be interrupted by an external event (e.g., hanging up by an end use cannot immediately terminate a block that is currently running).

In example embodiments, data (e.g., JSON data) may be added (e.g., via a Set Variable block) to the "global" shared execution context that other Blocks can use. In example embodiments, the storage size of an execution context may be limited (e.g., via a setting controlled by an administrator).

FIG. 62 is an example code listing of a set variables block that can be used to increment a counter or concatenate two strings.

FIG. 63 is an example code listing of an if/else conditional block that can be used to control a flow of execution based on conditional criteria (e.g., is no agent was found, execute block 2; otherwise, execute block 3).

FIG. 64 is an example code listing of a core HTTP library for making https request. In example embodiments, an HTTP call may be made to some service and parameters passed with that call. This block may have default retries (e.g., with backoff, retry count, etc.), that are configurable. This enables users to call one or more services (e.g., a scheduler service) and/or one or more external services (e.g., a customer built homegrown service). In example embodiments, all HTTP requests are signed using a verification service (e.g., id-sign-verify-service). In example embodiments, for synchronous calls, the system may add Global and Individual Block timeouts.

FIG. 65A is an example code listing of a block for splitting a current execution flow into two execution flows for parallel execution.

FIG. 65B is an example code listing of a block for combining two parallel executions. In example embodiments, the system waits for two events to occur before executing this block.

FIG. 66 is an example code listing of a block for waiting for an incoming webhook. In example embodiments, execution is paused until a new webhook comes in. Example calling an IVR system and waiting for the customer to select all of the appropriate information before continuing to the next step of the flow.

One or more of the above core blocks can be used to build one or more widgets or blocks as simple blocks (e.g., JSON blocks). The type of these blocks may be a compound type (e.g., "com.twilio.blocks.compound"). In example embodiments, the system may provide one or more data stores, which may serve as a playground for building new compound blocks, and an API for fetching the available blocks. In example embodiments, one or more core block definitions may be provided for deploying an application (e.g., via a JSON that is bundled with a JAR file).

Figure 67:
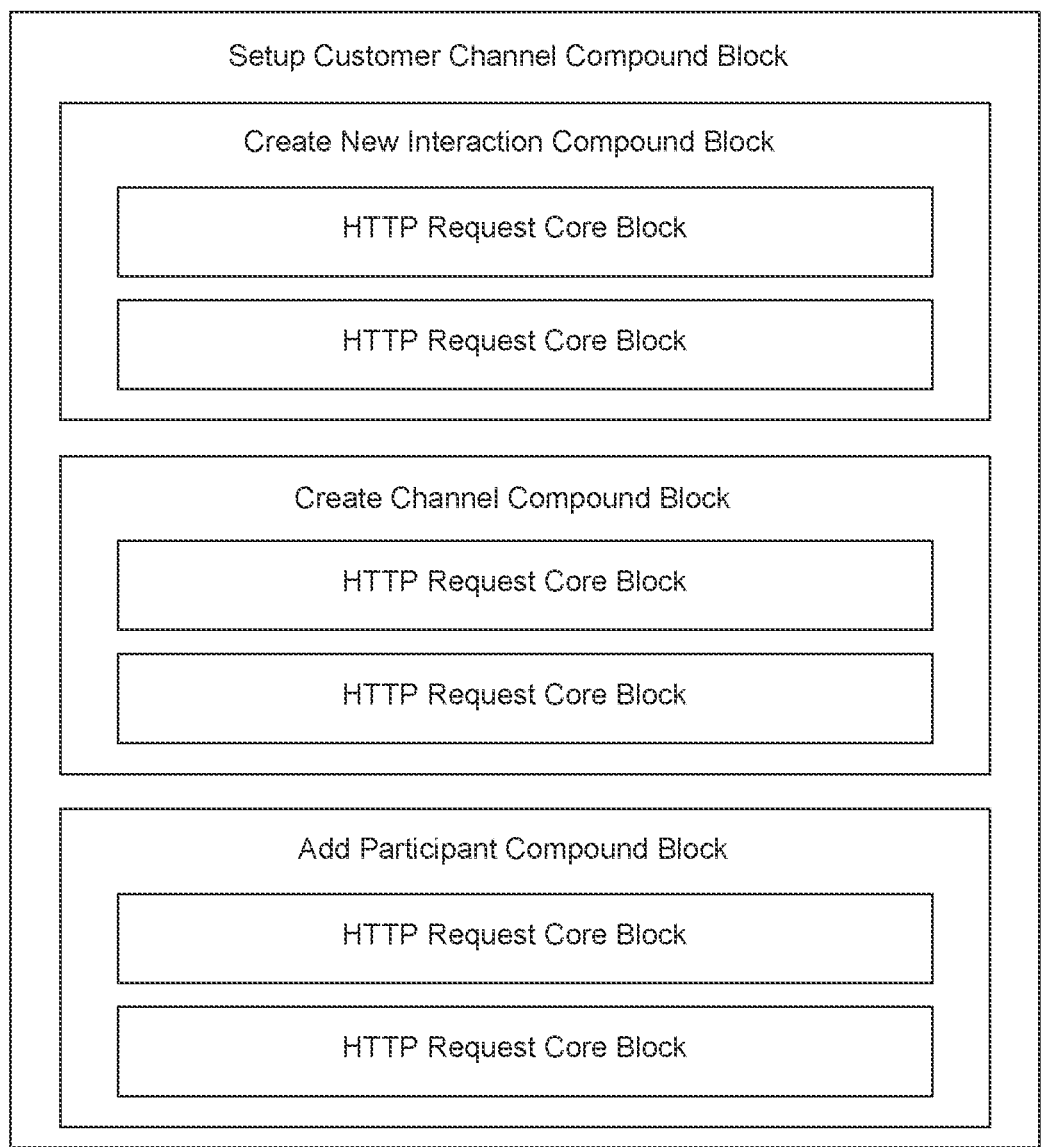
FIG. 67 is an example code listing of a compound block for setting up a customer channel.

FIG. 67 is an example code listing of a compound block for setting up a customer channel. The compound block is made up of one or more core blocks and/or one or more additional compound blocks, including a compound block for creating a new interaction, a compound block for creating a channel, and/or a compound block for adding a participant. Each of the compound blocks may include one or more core blocks, such as one or more HTTP Request core blocks.

FIG. 68 is an example code listing of a block for a for-loop. It takes an array in. It will iterate through each item one by one and sets its context as the next entry. It provides two outputs, one for processing the next entry, and one for when there is no data left. This block can be used for both doing a forEach (for example, cancel all reservations) and for-break (find the first item that matches a condition). Note that for-loop is sequential and cannot be done in parallel.

FIG. 69 is an example code listing of a block for creating an interaction and an interaction channel. An interaction is creating (e.g., using the Interactions API). An interaction channel is creating (e.g., using the Channels API). In example embodiments, a callback URL is passed in (e.g., via a create-channel input). In incoming webhook is invoked when a channel becomes active. Both the interaction and the channel objects are created and returned.

FIG. 70 is an example code listing for a flow definition.

Figure 71:
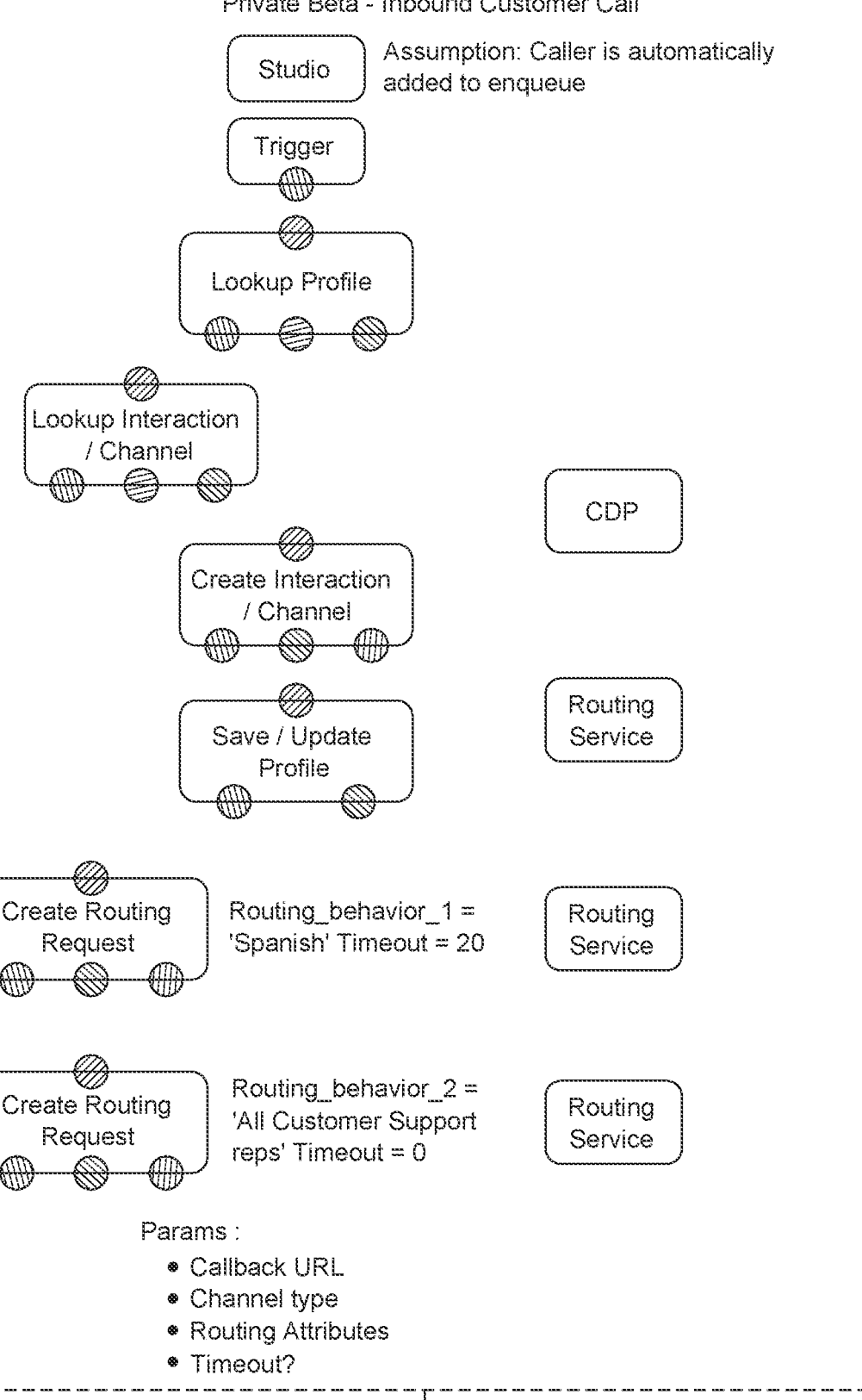
FIG. 71 is a block diagram of a custom flow for handling an inbound communication (e.g., a customer call).
Figure 71:
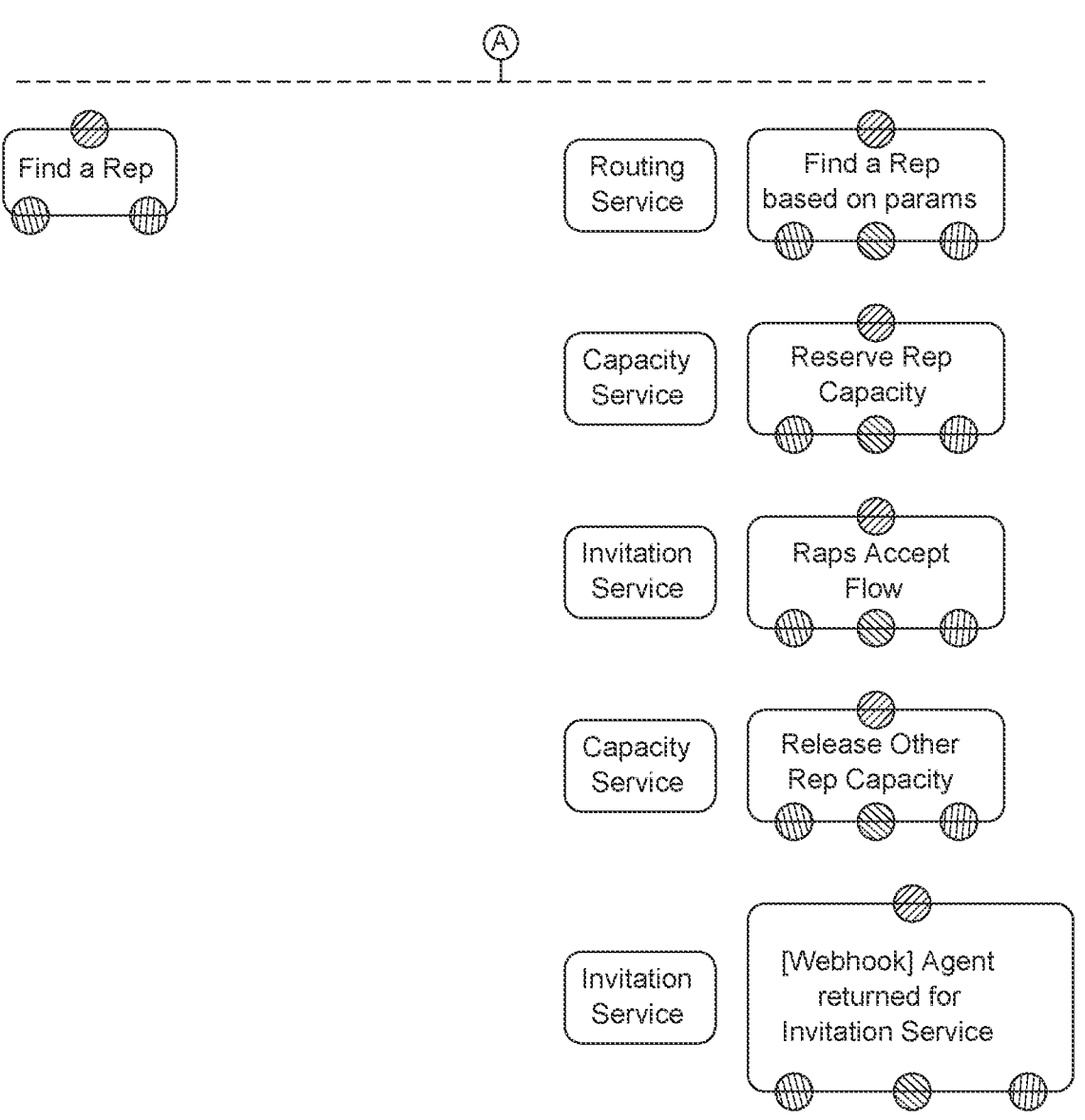

FIG. 71 is a block diagram of a custom flow for handling an inbound communication (e.g., a customer call). The caller (e.g., an end customer) is added to a queue. A trigger is detected that causes the flow to be invoked. A profile of the customer is looked up. An interaction and/or channel is looked up or created. The profile is saved or updated. Additional steps may be performed, as indicated.

FIG. 72 is an example code listing of a custom flow for handling the incoming communication depicted in FIG. 71.

Figure 73:
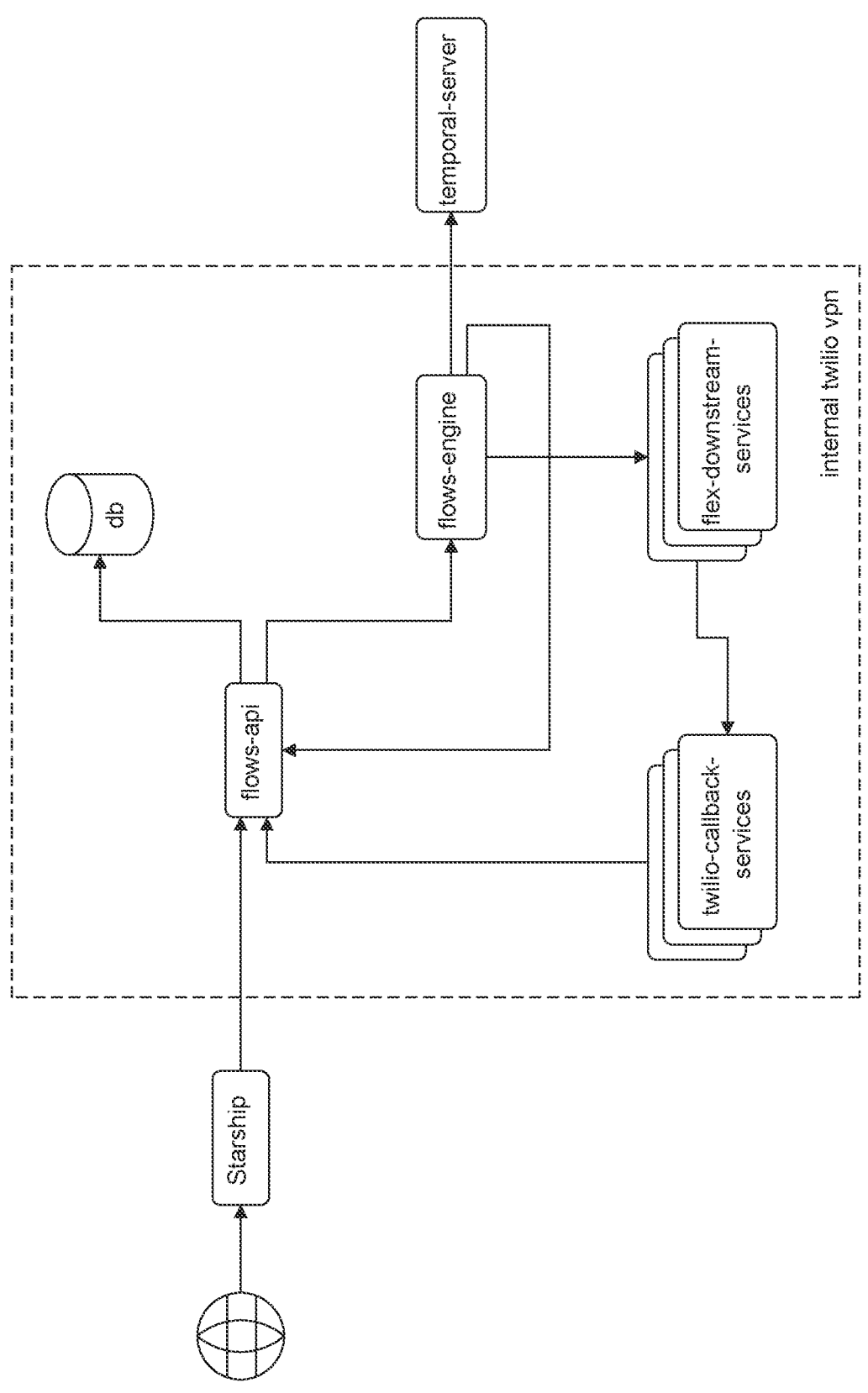
FIG. 73 is a block diagram illustrating an example workflow architecture.

FIG. 73 is a block diagram illustrating an example workflow architecture. In example embodiments, the architecture includes an API layer that performs create, read, update, and delete (CRUD) operations. In addition to handling API endpoints for creating and managing a Flow definition, the API layer may also be the entry point for executing a Flow.

When a Flow is executed, the API layer may be called, which may then call the flow engine. The engine may be in charge of reading the DSL (e.g., of a JSON definition) and invoking each block. A Temporal-server may be used to actually run the execution code and persist the state of the flow.

The API layer may be used to execute the engine. Upon hitting the API (either to create a new execution or a POST to the instance of an execution), the current context and the parameters from the request may be passed to the engine. The engine, using temporal, may hydrate to its current state, execute the next step and return the updated context to the API. The API may persist in this context and responds back up to the caller.

The Flows API may include an API gateway service. It may perform the CRUD operations for creating and managing Flows. It may also act as the gateway for executing a flow, continuing a flow, persisting its context, etc.

To create a new execution, a POST/Flows/FPxxx/Executions is created. This can be done via the API. Phone numbers may be configured to respond to an incoming call/message/conversation, etc. The execution API may be synchronous. For asynchronous calls (e.g., waiting for an event listener to fire), flows-engine may provide the execution instance URL to the said callback service and then go to sleep. When an event is fired, the callback service may make an HTTP call to the instance URL and the flows engine may respond and perform the next task.

Each callback URL may include a token as a query parameter. This token is used to identify which widget the flow is currently running at. This token approach callback may be provided because parallel/fork flows require the system to know which branch/widget the system needs to execute.

Setting the callback URI, may be automatically handled by the flows engine; therefore, this is not something the user or end customer would have to worry about.

FIG. 74 is a code listing of blocks for managing an execution context. In example embodiments, executions may be set to persist for a configurable maximum number of days (e.g., 7 days). In example embodiments, execution expiry may be configured to be greater than the defined maximum (e.g., on a per-account basis).

In example embodiments, each block may be provided with execution context at the start of its execution. It will then be adding new data into the context that needs to be persisted.

Compound blocks are made from other compound blocks and core blocks. Each core block will read the current context before execution and then store its own updated context back into the database. In other words, if compound block A has core-block-a and core-block-b, the core-block-a will get the latest context right before execution, then save the updated context, and core-block-b will then get the latest context, etc. Note: in example embodiments, the execution context will NOT be re-read during a block's execution.

The system supports parallel executions. So there might be two (or more) blocks executing without having access to each other's context. For example, block-a starts at Time 0 and finishes at Time 5. Block-b starts at Time 1. As a result, block-b will not have the context from block-a execution.

Context writes may use an optimizing lock strategy to prevent race conditions. In example embodiments, each core block context needs to be individually saved; the customer view of the context data provides a simple view that includes the context of the compound block (which may be an aggregate and summary of the nested compound/core blocks) as well as detailed view (that includes each individual block); and/or a history of the mutation of the context can be replayed back so the system can see how the context was modified as the flow was executed.

In some instances, flow execution may need to pause for an event to occur. In example embodiments, this can either be a Kafka event (for example, a programmable-router request is asynchronous) or an event taken by the customer/agent (for example, the customer may provide some additional details before the system continues.

In example embodiments, the flows-engine service may be synchronous. In example embodiments, another system can listen to these events and then call the flows engine to execute the next step once the event is fired. Some alternatives exist. For example, a Kafka events callback URL can be used. All Flex DP Kafka events can have an optional callback-url parameter. The flex-dp Kafka processor can listen to all Kafka topics (or maybe a list of topics that the system can provide), and if the consumed records contain the callback-url field, then it can use the callback-service to invoke and pass the record. The flow engine may then provide its callback-url to the downstream service when making a request. This alternative is advantageous for several reasons, including No additional datastore is required to "subscribe" to a Kafka-event callback; No additional logic is required for knowing which Kafka event is to fire the subscribed callback url.

As another example, a workflows-owned service may be used. This may be a service owned by the Flows engine that listens to all relevant Kafka topics. The system may provide an API that the flows engine can subscribe to a particular record for a callback url. In example embodiments, an additional data store for storing the callback-url is provided. The system may provide custom logic to determine which event requires the callback-url to be fired. The system may be configured to continuously update this service as new Kafka topics are created.

FIG. 75 is a table describing example APIs (e.g., both public and private) that may be serviced for the Flows service. In example embodiments, every action (e.g., adding/removing blocks, renaming, publishing, etc.) will result in a revision bump. The FlowStatus is Draft (e.g., Unpublished changes) or Published (e.g., Published changes). The latest Published by DateCreated field is considered the "active" Flow.

The list of endpoints includes the following:
GET/Flows Returns a List of available Flows
POST/Flows: Creates a new Flow.
GET/Flows/{FlowIdentifier}: Gets an instance of the Flow. The FlowIdentifier can be the Sid or the Unique-Name.
POST/Flows/{FlowIdentifier}: Updates the Flow. This can be a FriendlyName update, a Definition update, or Publishing.
GET/Flows/{FlowIdentifier}/Revisions: Returns a paginated List of Revision instances.
GET/Flows/{FlowIdentifier}/Revisions/{RevisionNumber}: Returns a particular Revision of the Flow
DELETE/Flows/{FlowIdentifier} Deletes the instance of the Flow. Flow can only be deleted if no active Executions are running.

FIG. 76 is a table describing example APIs for encapsulating the execution of a particular flow. The ExecutionStatus enun is defined as including the following:
Active: Currently running execution;
Parked: Execution is currently awaiting for an event to continue to next step; and/or
Ended: Execution has ended.
And the EndReason enum is defined as including the following:
Timedout: Execution did not complete in allowed time;
Failed: Execution completed in a failed state;
Completed: Execution successfully completed; and/or
Stopped: Execution was force terminated (e.g., via a rest API call).

The available list of endpoints includes the following:
GET/Flows/{FlowsIdentifer}/Executions: Returns a list of Executions;
POST/Flows/{FlowsIdentifer}/Executions: Creates a new execution;
GET/Flows/{FlowsIdentifer}/Executions/{Execution-Sid}: Returns an instance of the Execution;
POST/Flows/{FlowsIdentifer}/Executions/{ExecutionSid}?Token=exyyy: Propagates the execution to the next step (This is used for Flows that are awaiting a webhook callback. The Token is used to determine the step the Execution is parked on. The system may need a token because, if there are forks and each branch is separately and awaiting a callback, the system otherwise wouldn't know which on branch to continue the execution.);

DELETE/Flows/{FlowIdentifier}/Executions/{ExecutionSid}: Force terminates an Execution; and/or
GET/Flows/{FlowIdentifier}/Executions/{ExecutionSid}/Context: Returns the current complete Context of the execution.

FIG. 77 is a table describing example APIs for tracking execution steps and/or progression of a Flow.

StepCount may be auto incremented and may be used for the execution order of individual steps. In the case of parallel execution, the left node may get the first step count. For the subsequent, the StartDate may be used to denote which step gets a priority. For example, consider that the system has a fork (BF), the left branch has block-left-1 (BL1) and block-left-2 (BL2), the right branch has block-right-1 (BR1) and block-right-2 (BR2). Here is a corresponding flow:
sta ts at T0 an en s at T1.
1 sta ts at T1 an en s at T3.
2 sta ts at T3 an en s at T7.
1 sta ts at T1 an en s at T2
2 sta ts at T2 an en s at T4.
The steps associated will therefore be:
tep 1
tep 2=>BL1
tep 3 1
tep 4 2
tep 2
The BlockId is the unique identifier of each block from the FlowVersion Definition. Each compound block would have its nested block context defined here as well. For example, if the Definition has a compound block called block-a and this block has two compound blocks, block-a1 (and this has 2 core blocks, block-a1a and block-a1b) and block-a2 (and this has 2 core blocks, block-a2a and block-a2b), then we will have all the following context lines
-a
-a1
-a1a
-a1b
-a2
-a2a
-a2b
The available list of endpoints includes the following:
GET/Flows/{FlowsIdentifer}/Executions/{ExecutionSid}/Steps: Returns a paginated List of Steps, sorted by the step order; and/or
GET/Flows/{FlowsIdentifer}/Executions/{ExecutionSid}/Steps/{StepSid|StepCount}: Returns the given Step. (The identifier can either be a Sid or a count.)

FIG. 78 is a table that describes example information for a composer flow.

FIG. 79 is a table that describes example information for executions.

In example embodiments, configurable workflow rate limits thresholds may be set (e.g., by a developer or administrator), including one or more of the following threshold values:
Max TTL for an individual step (overrides customer defined global limits),
Global max TTL (per flow); E.g., max 10 s active execution time for any step;
Max TTL for a specific flow (overrides customer defined global limits)
Global max TTL (per flow); E.g., flows that started over 90 days ago will be automatically deleted,
Max number of Core Blocks (per flow); E.g., max of 500 core blocks inside any flow;

Max number of Core Block executions (per flow); E.g. If we had a max of 1,000 Core Block executions then a single Core Block can hit that limit if it was looped 1,000 times;

Max "active" execution Blocks (per customer),

Maximum number of blocks that can be (currently) executing in parallel for a single customer; and/or Max number of API requests per minute.

Example Mobile Device

Figure 80:
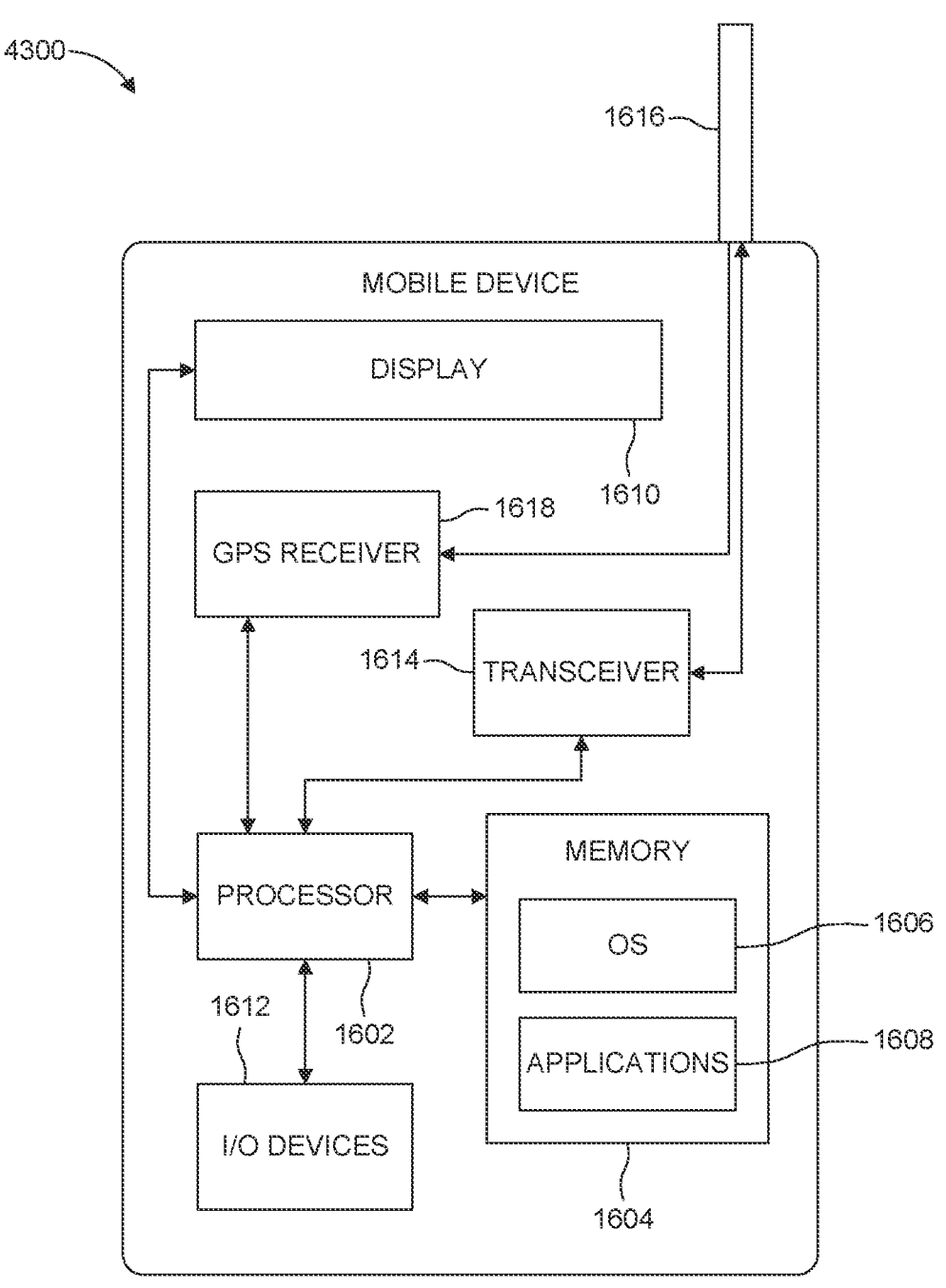
FIG. 80 is a block diagram of an example mobile device, according to an example embodiment.

FIG. 80 is a block diagram illustrating a mobile device 4300, according to an example embodiment. The mobile device 4300 can include a processor 1602. The processor 1602 can be any of a variety of different types of commercially available processors suitable for mobile devices 4300 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 4300. Further, in some configurations, a GPS receiver 1618 can also make use of the antenna 1616 to receive GPS signals.

Modules, Components and Logic

Certain embodiments are described herein as including logic or a number of components, modules, or mechanisms Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 81:
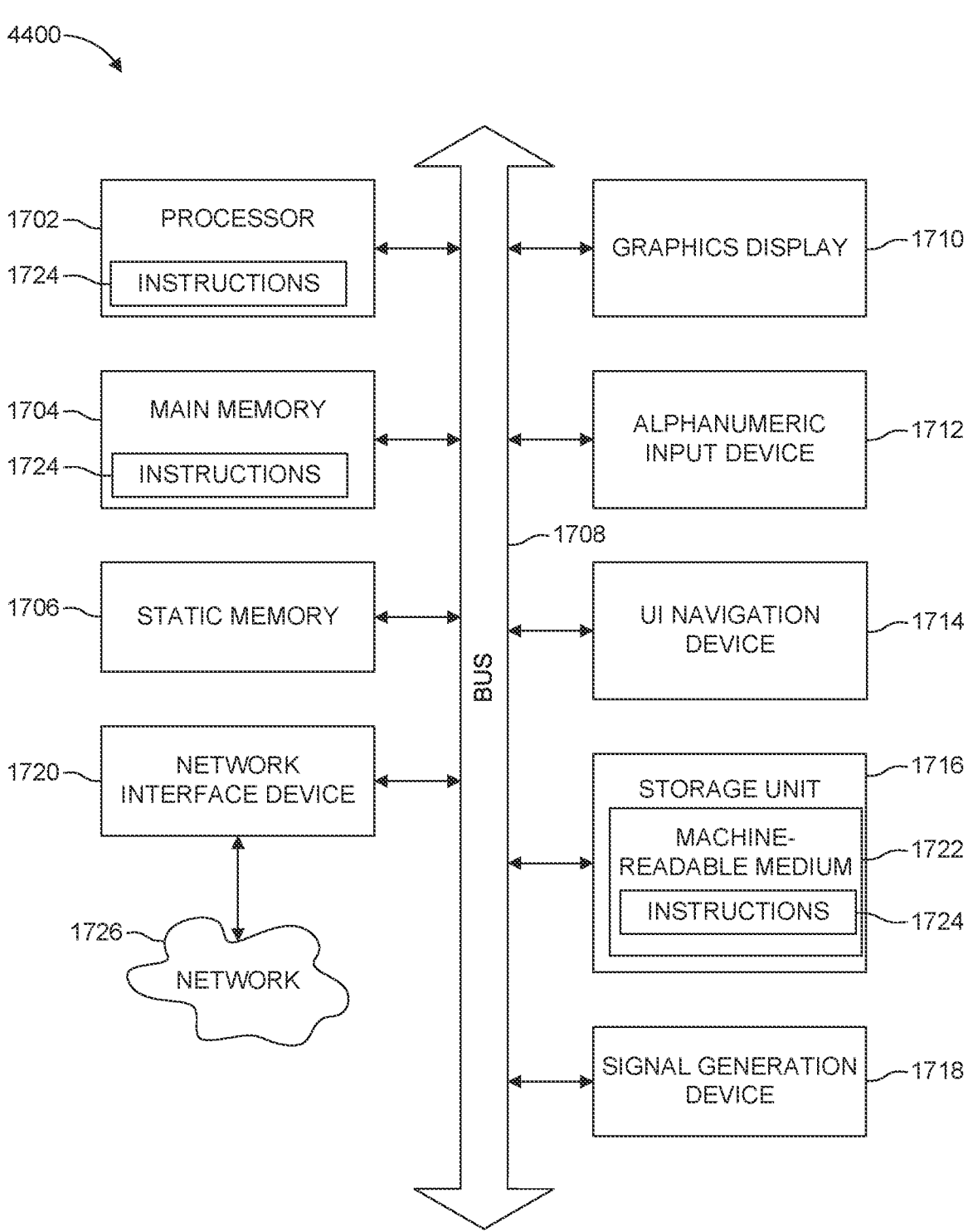
FIG. 81 is a block diagram of machine in the example form of a computer system within which instructions for causing the machine to perform any one or more of the methodologies discussed herein may be executed.

FIG. 81 is a block diagram of an example computer system 4400 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 4400 includes a processor 1702 (e.g., a central processing unit (CPU), a graphics processing unit (GPU) or both), a main memory 1704 and a static memory 1706, which communicate with each other via a bus 1708. The computer system 4400 may further include a graphics display unit 1710 (e.g., a liquid crystal display (LCD) or a cathode ray tube (CRT)) The computer system 4400 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 4400, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM). Electrically Erasable Programmable Read-Only Memory (EEPROM), and flash memory devices; magnetic disks such as internal hard disks and removable disks; magneto-optical disks; and CD-ROM and DVD-ROM disks Transmission Medium The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:

one or more computer processors;

one or more computer memories; and a set of instructions incorporated into the one or more computer memories, the set of instructions configuring the one or more computer processors to perform operations, the operations comprising:

providing access to an API for processing a routing request, associated with an interaction, specific to one of a plurality of channel types in a customer engagement environment, the API including a handler for the routing request, the handler including parameters for specifying a user-defined routing attribute, an interaction state, a channel-specific attribute, and a proficiency for the user-defined routing attribute, the proficiency indicating a minimum value that an agent must satisfy with respect to the user-defined routing attribute, where the parameters are determined and updated by real time monitoring of the interaction, wherein (i) the interaction comprises a persistent construct controllable by a user or system to transition between multiple states including active, inactive, and closed states, (ii) the interaction is associated with multiple communication channels, and (iii) the interaction comprises a real time and historic log of conversations and events of the interaction;

receiving the user-defined routing attribute, the interaction state, the channel-specific attribute, and the proficiency via the parameters of the handler;

recommending the agent in the customer engagement environment to invite to a channel of the channel type associated with the routing request, the recommending based on a matching of the agent to the user-defined routing attribute, the interaction state, the channel-specific attribute, and the proficiency corresponding to the user-defined routing attribute; and transmitting an invitation to the recommended agent to join the channel of the channel type, wherein the agent can accept or decline the invitation.

2. The system of claim 1, wherein the user-defined routing attribute is added to an object representing an interaction associated with the routing request in response to an invocation of a handler that is called upon creation of an instance of the object.

3. The system of claim 1, wherein the matching of the agent to the user-defined routing attribute is based on a determination that the user-defined routing attribute is the same as an additional user-defined routing attribute and a determination that proficiency has a specified relationship with an additional proficiency, the additional user-defined routing attribute and the additional proficiency being associated with the agent.

4. The system of claim 3, wherein the specified relationship is included in a parameter for specifying the proficiency.

5. The system of claim 1, wherein the user-defined routing attribute pertains to a language, product knowledge, or function associated with the agent.

6. The system of claim 1, wherein the handler further includes a parameter for specifying a priority; and the operations further comprise receiving the priority via the parameters for the handler and prioritizing the recommending of the agent with respect to other routing requests based on the priority.

7. The system of claim 6, wherein the priority is assigned based on a determination of a value of a customer associated with the routing request.

8. A method comprising:

providing access to an API for processing a routing request, associated with an interaction, specific to one of a plurality of channel types in a customer engagement environment, the API including a handler for the routing request, the handler including parameters for specifying a user-defined routing attribute, an interaction state, a channel-specific attribute, and a proficiency for the user-defined routing attribute, the proficiency indicating a minimum value that an agent must satisfy with respect to the user-defined routing attribute, where the parameters are determined and updated by real time monitoring of the interaction, wherein (i) the interaction comprises a persistent construct controllable by a user or system to transition between multiple states including active, inactive, and closed states, (ii) the interaction is associated with multiple communication channels, and (iii) the interaction comprises a real time and historic log of conversations and events of the interaction;

receiving the user-defined routing attribute, the interaction state, the channel-specific attribute, and the proficiency via the parameters of the handler;

recommending the agent in the customer engagement environment to invite to a channel of the channel type associated with the routing request, the recommending based on a matching of the agent to the user-defined routing attribute, the interaction state, the channel-specific attribute, and the proficiency corresponding to the user-defined routing attribute; and transmitting an invitation to the recommended agent to join the channel of the channel type, wherein the agent can accept or decline the invitation.

9. The method of claim 8, wherein the user-defined routing attribute is added to an object representing an interaction associated with the routing request in response to an invocation of a handler that is called upon creation of an instance of the object.

10. The method of claim 8, wherein the matching of the agent to the user-defined routing attribute is based on a determination that the user-defined routing attribute is the same as an additional user-defined routing attribute and a determination that proficiency has a specified relationship with an additional proficiency, the additional user-defined routing attribute and the additional proficiency being associated with the agent.

11. The method of claim 10, wherein the specified relationship is included in a parameter for specifying the proficiency.

12. The method of claim 8, wherein the user-defined routing attribute pertains to a language, product knowledge, or function associated with the agent.

13. The method of claim 8, wherein the handler further includes a parameter for specifying a priority; and the method further comprises receiving the priority via the parameters for the handler and prioritizing the recommending of the agent with respect to other routing requests based on the priority.

14. The method of claim 13, wherein the priority is assigned based on a determination of a value of a customer associated with the routing request.

15. A non-transitory computer-readable storage medium storing a set of instructions that, when executed by one or more computer processors, causes the one or more computer processors to perform operations, the operations comprising:

providing access to an API for processing a routing request, associated with an interaction, specific to one of a plurality of channel types in a customer engagement environment, the API including a handler for the routing request, the handler including parameters for specifying a user-defined routing attribute, an interaction state, a channel-specific attribute, and a proficiency for the user-defined routing attribute, the proficiency indicating a minimum value that an agent must satisfy with respect to the user-defined routing attribute, where the parameters are determined and updated by real time monitoring of the interaction, wherein (i) the interaction comprises a persistent construct controllable by a user or system to transition between multiple states including active, inactive, and closed states, (ii) the interaction is associated with multiple communication channels, and (iii) the interaction comprises a real time and historic log of conversations and events of the interaction;

receiving the user-defined routing attribute, the interaction state, the channel-specific attribute, and the proficiency via the parameters of the handler;

recommending the agent in the customer engagement environment to invite to a channel of the channel type associated with the routing request, the recommending based on a matching of the agent to the user-defined routing attribute, the interaction state, the channel-specific attribute, and the proficiency corresponding to the user-defined routing attribute; and transmitting an invitation to the recommended agent to join the channel of the channel type, wherein the agent can accept or decline the invitation.

16. The non-transitory computer-readable storage medium of claim 15, wherein the user-defined routing attribute is added to an object representing an interaction associated with the routing request in response to an invocation of a handler that is called upon creation of an instance of the object.

17. The non-transitory computer-readable storage medium of claim 15, wherein the matching of the agent to the user-defined routing attribute is based on a determination that the user-defined routing attribute is the same as an additional user-defined routing attribute and a determination that proficiency has a specified relationship with an additional proficiency, the additional user-defined routing attribute and the additional proficiency being associated with the agent.

18. The non-transitory computer-readable storage medium of claim 17, wherein the specified relationship is included in a parameter for specifying the proficiency.

19. The non-transitory computer-readable storage medium of claim 15, wherein the user-defined routing attribute pertains to a language, product knowledge, or function associated with the agent.

20. The non-transitory computer-readable storage medium of claim 15, wherein the handler further includes a parameter for specifying a priority; and the operations further comprise receiving the priority via the parameters for the handler and prioritizing the recommending of the agent with respect to other routing requests based on the priority.

* * * * *